United States Patent
Unagami et al.

(10) Patent No.: US 9,898,620 B2
(45) Date of Patent: Feb. 20, 2018

(54) INFORMATION MANAGEMENT METHOD AND INFORMATION MANAGEMENT SYSTEM

(71) Applicant: Panasonic Corporation, Osaka (JP)

(72) Inventors: Yuji Unagami, Osaka (JP); Motoji Ohmori, Osaka (JP); Hideo Umetani, Osaka (JP); Michiko Sasagawa, Osaka (JP); Kazunori Isogai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 14/368,048

(22) PCT Filed: Sep. 18, 2013

(86) PCT No.: PCT/JP2013/005509
§ 371 (c)(1),
(2) Date: Jun. 23, 2014

(87) PCT Pub. No.: WO2014/050027
PCT Pub. Date: Apr. 3, 2014

(65) Prior Publication Data
US 2014/0325592 A1  Oct. 30, 2014

Related U.S. Application Data

(60) Provisional application No. 61/706,910, filed on Sep. 28, 2012, provisional application No. 61/720,429, filed on Oct. 31, 2012.

(51) Int. Cl.
*G06F 21/62* (2013.01)
*G06Q 30/02* (2012.01)

(52) U.S. Cl.
CPC ......... *G06F 21/6254* (2013.01); *G06Q 30/02* (2013.01); *G06F 2221/2101* (2013.01)

(58) Field of Classification Search
CPC ........ G06F 21/6254; G06F 2221/2101; G06Q 30/02; H04L 63/20; H04L 63/102
(Continued)

(56) References Cited

U.S. PATENT DOCUMENTS 6,050,924 A * 4/2000 Shea ...................... A63B 22/00
                                                     482/57
8,365,213 B1 * 1/2013 Orlowski ........... G06Q 30/0251
                                                     725/13
(Continued)

FOREIGN PATENT DOCUMENTS

JP    2002-32453    1/2002
JP    2005-332087   12/2005
(Continued)

OTHER PUBLICATIONS

International Search Report dated Dec. 10, 2013 in corresponding International Application No. PCT/JP2013/005509.

*Primary Examiner* — Michael Pyzocha
(74) *Attorney, Agent, or Firm* — Wenderoth, Lind & Ponack, L.L.P.

(57) ABSTRACT

An information management method includes: receiving, from a manufacturer server via a network, device history information indicating a history of an operation of a device used by a first user and first anonymized user information generated by anonymizing, according to a predetermined rule, first user information including attribute information which allows identification of the first user; receiving, from a service provider server different from the manufacturer server via the network, service history information indicating a history of service used by a second user and second anonymized user information generated by anonymizing, (Continued)

according to the predetermined rule, second user information including attribute information which allows identification of the second user; and associating the device history information and the service history information and managing them as composite information, when the first anonymized user information and the second anonymized user information are determined to be identical or similar.

15 Claims, 46 Drawing Sheets

(58) Field of Classification Search
    USPC .............................................................. 726/1
    See application file for complete search history.

(56)         References Cited

U.S. PATENT DOCUMENTS

| | | | | |
|---|---|---|---|---|
| 2003/0188171 | A1* | 10/2003 | DeCenzo | H04H 60/33 713/185 |
| 2008/0147684 | A1* | 6/2008 | Sadovsky | G06Q 10/10 |
| 2010/0161492 | A1* | 6/2010 | Harvey | G06Q 10/0639 705/50 |
| 2010/0312577 | A1* | 12/2010 | Goodnow | G06F 19/322 705/2 |
| 2011/0015969 | A1* | 1/2011 | Loeb | G06Q 10/00 705/7.29 |
| 2011/0246273 | A1* | 10/2011 | Yarvis | G06Q 30/02 705/14.19 |
| 2011/0288907 | A1* | 11/2011 | Harvey | G06Q 10/0639 705/7.29 |
| 2011/0314502 | A1* | 12/2011 | Levy | H04N 7/106 725/46 |
| 2012/0131030 | A1* | 5/2012 | Miyakawa | G06F 17/30979 707/758 |
| 2013/0080721 | A1* | 3/2013 | Tomiyama | G06F 3/0644 711/161 |
| 2013/0152215 | A1* | 6/2013 | Khosravy | G06Q 50/10 726/28 |
| 2013/0185804 | A1* | 7/2013 | Biswas | G06F 21/577 726/26 |
| 2013/0203038 | A1* | 8/2013 | Kumar | G09B 7/00 434/362 |
| 2013/0227225 | A1* | 8/2013 | Oliver | G06F 21/316 711/154 |
| 2013/0239226 | A1* | 9/2013 | Miyakawa | G06F 21/6254 726/26 |
| 2013/0297387 | A1* | 11/2013 | Michael | G08G 1/0112 705/13 |
| 2015/0058328 | A1* | 2/2015 | Fu | G06F 17/30241 707/723 |

FOREIGN PATENT DOCUMENTS

JP      2009-159317     7/2009
JP      2012-118878     6/2012

* cited by examiner

| Item | Fitness service | Weight control service | Insurance service |
|---|---|---|---|
| Name | Deleted | Deleted | Deleted |
| Address | City | Prefecture | City |
| Birth date | Year | Year | Date |
| Gender | Included | Included | Included |
| Mail address | Deleted | Deleted | Deleted |
| Hobby | Deleted | Deleted | Included |

| User ID | Personal information (user information) |
|---|---|
| ID11 | Name: Miki Yamada<br>Address: 3-10 Fukushima-ku, Osaka<br>Birth date: October 5, 1980<br>Gender: Female<br>Mail address: yamada@aaa.com<br>Hobby: aerobics |
| ID12 | Name: Jiro Sato<br>Address: 1-19 Minato-ku, Tokyo<br>Birth date: March 3, 1990<br>Gender: Male<br>Mail address: sato@aaa.com<br>Hobby: reading |
| ... | .. |

FIG. 17

| Device ID | Device history ID |
|---|---|
| Body composition analyzer | Household electric device history DB IDA1 |
| TV | Household electric device history DB IDA2 |
| Activity meter | Household electric device history DB IDA3 |
| | |

FIG. 18

| DB ID | User ID | Household electric device history information sorted by user ID |
|---|---|---|
| IDA1 | ID11 | 2012.1.1: Weight, 55 kg; Body fat percentage, 18%<br>2012.1.3: Weight, 56 kg; Body fat percentage, 19%<br>.... |
| | ID12 | 2011.12.30: Weight, 80 kg; Body fat percentage, 22%<br>2012.1.3: Weight, 82 kg; Body fat percentage, 22%<br>.... |
| IDA2 | ID11 | 2012.1.1: 18:00, drama; 20:00, news<br>2012.1.3: 10:00, animation; 13:00, drama<br>.... |
| | ID12 | |
| ... | .. | |

FIG. 20

| Category | Service proposal information DB |
|---|---|
| Weight control | Service proposal information DB IDS1 |
| Recommended program | Service proposal information DB IDS2 |
| | |

FIG. 21

| Service proposal information DB ID | Proposal information |
|---|---|
| IDS1 | Program for males in their thirties<br>Program for females in their thirties<br>. . . . |
| IDS2 | Program recommendable for cartoon enthusiast<br>Program recommendable for those who like sports<br>. . . . |
| | |

| User ID | Personal information (user information) |
|---------|------------------------------------------|
| ID21 | Name: Miki Yamada<br>Address: 3-10 Fukushima-ku, Osaka<br>Birth date: October 5, 1980<br>Gender: Female<br>Mail address: yamada@aaa.com<br>Hobby: aerobics |
| ID22 | Name: Goro Kato<br>Address: 1-19 Chuo-ku, Chiba<br>Birth date: June 1, 1975<br>Gender: Male<br>Mail address: kato@bbb.com<br>Hobby: marathon |
| ... | .. |

| User ID | Provided service for user ID |
|---------|------------------------------|
| ID21 | 2011.12.28: 2 sets of aerobic exercise with no running, 30-minute running, advice<br>2012.1.3: 1 set of advanced aerobic exercise, 30-minute exercise bike<br>... |
| ID22 | 2012.1.3 1: 60-minute running, 60-minute exercise bike<br>... |
| ... | .. |

FIG. 35

| User ID | Personal information | Service provider ID to which proivision of device histories is permitted |
|---|---|---|
| ID11 | Name: Miki Yamada<br>Address: 3-10 Fukushima-ku, Osaka<br>Birth date: October 5, 1980<br>Gender: Female<br>Mail address: yamada@aaa.com<br>Hobby: aerobics | SP1(Fitness center A)<br>SP2(Cooking school B) |
| ID12 | Name: Jiro Sato<br>Address: 1-19 Minato-ku, Tokyo<br>Birth date: March 3, 1990<br>Gender: Male<br>Mail address: sato@aaa.com<br>Hobby: reading | SP3<br>SP4 |
| ... | ... | |

FIG. 46

| Device ID | Device history DB ID | Period of history provided in one time | Limit of number of transmissions |
|---|---|---|---|
| Body composition analyzer | Household electric device history DB IDA1 | 1 week | 2 times |
| TV | Household electric device history DB IDA2 | 1 month | 2 times |
| Activity meter | Household electric device history DB IDA3 | 1 week | 4 times |
| | | | |

INFORMATION MANAGEMENT METHOD AND INFORMATION MANAGEMENT SYSTEM

TECHNICAL FIELD

The present invention relates to an information management method and an information management system.

BACKGROUND ART

In recent years, household electric appliances and audiovisual apparatuses have been connected to a network, and various types of history information (what is called lifelog information, such as a user's use history of an electric appliance or television viewing history) are collected therefrom into the cloud. This creates an expectation that services utilizing the lifelog information collected in the cloud are provided. For example, there has been an expectation that such lifelog information collected in the cloud is utilized for provision of services in cooperation with a service provider, such as a personalized service appropriate for a life style of each user or a market analysis service wherein statistical information is used.

However, since the lifelog information involves privacy of each user, personal information included in the lifelog information should not be provided to third parties without permission from the user.

In view of this, there is proposed a method in which a service provider provides users with a service with security for anonymity of the users against the service provider (see Patent Literature (PTL) 1). In the method proposed in PTL 1, an online transaction service is provided to anonymous users.

CITATION LIST

Patent Literature

[PTL 1] Japanese Unexamined Patent Application Publication No.

SUMMARY OF INVENTION

However, there is a problem with the above-described conventional method that it is impossible to verify that a service provided to a user is appropriate for the user. In other words, it is impossible for a service provider to check whether a user to whom the service provider is providing a service is a right user or a wrong user. Thus, the service provider may fail to provide the user with an appropriate service.

Conceived to address the above-described problem, the present invention has an object of providing an information management method and an information management system which enable providing each user with an appropriate service with security for anonymity of the users.

In order to achieve the above-described object, an information management method according to an aspect of the present invention is provided which is executed by an information management apparatus which manages information and includes: receiving, from a first server via a network, device history information and first anonymized user information, the device history information indicating a history of an operation of a device used by a first user, and the first anonymized user information being generated by anonymizing, according to a predetermined rule, first user information including attribute information which allows identification of the first user; receiving, from a second server, via the network, service history information and second anonymized user information, the service history information indicating a history of service used by a second user, the second anonymized user information being generated by anonymizing, according to the predetermined rule, second user information including attribute information which allows identification of the second user, and the second server being different from the first server; and associating the device history information and the service history information with each other and managing, as composite information, the device history information and the service history information associated with each other, when the first anonymized user information and the second anonymized user information are determined to be identical or similar.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The information management method and so on according to the present invention enable providing each user with an appropriate service and securing anonymity of the users in the provision of the service.

BRIEF DESCRIPTION OF DRAWINGS

FIG. 17 shows an example of an ID list of a device history DB according to Embodiment 2.

FIG. 18 shows an example of data recorded in a household electric device history DB according to Embodiment 2.

FIG. 20 shows an exemplary structure of a proposal information DB.

FIG. 21 shows an example of data stored in a proposal service information DB.

FIG. 35 shows an exemplary structure of a personal information DB according to Embodiment 3.

FIG. 46 shows an example of a list of provided data sets of device history information.

DETAILED DESCRIPTION OF INVENTION

Figure 1:
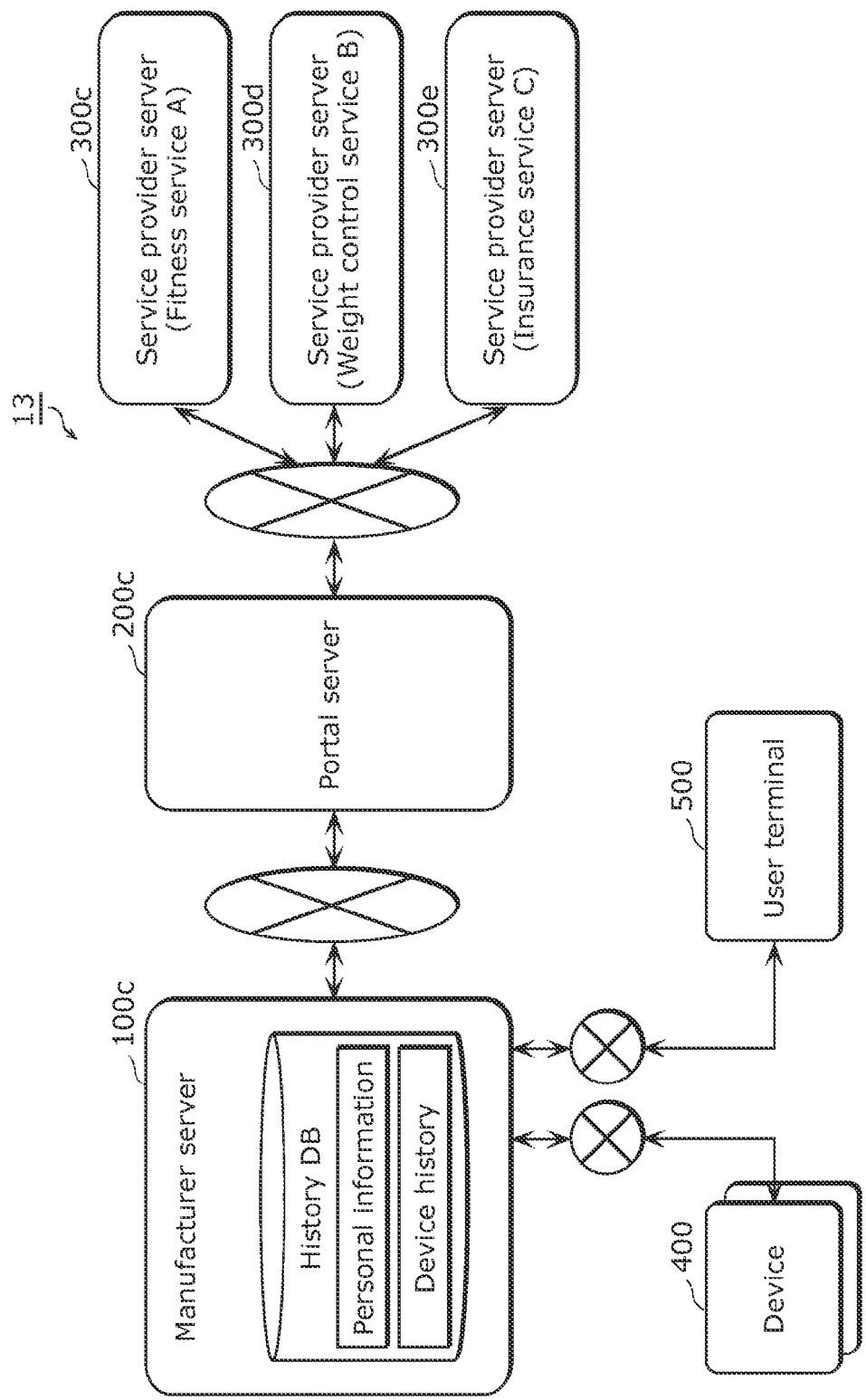
FIG. 1 shows an exemplary overall configuration of an information management system according to Embodiment 1.

In order to achieve the above-described object, an information management method according to an aspect of the present invention is provided which is executed by an information management apparatus which manages information and includes: receiving, from a first server via a network, device history information and first anonymized user information, the device history information indicating a history of an operation of a device used by a first user, and the first anonymized user information being generated by anonymizing, according to a predetermined rule, first user information including attribute information which allows identification of the first user; receiving, from a second server, via the network, service history information and second anonymized user information, the service history information indicating a history of service used by a second user, the second anonymized user information being generated by anonymizing, according to the predetermined rule, second user information including attribute information which allows identification of the second user, and the second server being different from the first server; and associating the device history information and the service history information with each other and managing, as composite information, the device history information and the service history information associated with each other, when the first anonymized user information and the second anonymized user information are determined to be identical or similar.

With this configuration, the users are provided with appropriate services with security for anonymity of the users.

More specifically, the first server, the information management apparatus, and the second server can interface with each other using the user information anonymized according to the predetermined rule (anonymization rule). This allows the information management apparatus to associate a device history of a user and a service history of the user or of a user similar to the user with each other and manage the device history and the service history as composite information. Thus, by using the composite information, the information management apparatus can provide proposal service information to an appropriate user. The first server and the second server provide the information management apparatus with anonymized user information such that users are not identified from the user information. The information management apparatus thus provides an information management method by which proposal information is generated for a user using composite information with security for privacy of the user.

In another example, the predetermined rule may be determined based on a combination of a type of the operation indicated by the device history information stored in the first server and a type of the service indicated by the service history information stored in the second server. For example, the predetermined rule specifies an attribute information item to be deleted or abstracted among one or more items of the attribute information included in the first user information and the second user information.

In another example, the first anonymized user information may include, as an item of the attribute information, at least one of a gender, an age, an age range, an address, and an occupation of the first user, and the second anonymized user information includes, as an item of the attribute information, at least one of a gender, an age, an age range, an address, and an occupation of the second user.

Proposal information to a user depends on details of a service history and a device which the user uses. If an item of attribute information in user information allows identification of a user, the item of attribute information is deleted or abstracted. If an item of attribute information in user information does not allow identification of a user, whether or not to delete or abstract the item of attribute information may be determined based on a combination of a type of the service and a type of the operation. In this information management method, proposal information more appropriate for the user can be generated using composite information.

For example, proposal information indicating a proposal of service to the first user may be generated based on the composite information, and the generated proposal information may be provided to the first user via the first server.

For example, the proposal information may include a control program for controlling the device.

For example, proposal information indicating a proposal of service to the second user may be generated based on the composite information, and the generated proposal information may be provided to the second user via the first server.

For example, the first user and the second user may be the same user, or the first user and the second user may be different users.

For example, the service history information may be information including a history of health management service which includes medical care and is used by the second user.

For example, the service history information may be information including a history of educational service used by the second user.

For example, the service history information may be information including a history of transportation service used by the second user.

Furthermore, the information management method may further include transmitting the predetermined rule to the first server and the second server via the network.

In order to achieve the above-described object, an information management system according to an aspect of the present invention is provided which includes: an information management apparatus which manages information; a first server which stores device history information indicating a history of an operation of a device used by a first user and first user information including attribute information which allows identification of the first user; and a second server which stores service history information indicating a history of service used by a second user and second user information including attribute information which allows identification of the second user, wherein the information management apparatus: receives, from a first server via a network, the device history information and first anonymized user information which is generated by anonymizing, according to a predetermined rule, the first user information; receives, from a second server via the network, the service history information and second anonymized user information which is generated by anonymizing, according to the predetermined rule, the second user information; and when the information management apparatus determines that the first anonymized user information and the second anonymized user information are identical or similar, the information management apparatus associates the device history information and the service history information with each other and manages, as composite information, the device history information and the service history information associated with each other.

For example, the information management apparatus may further transmit the predetermined rule to the first server and the second server via the network, the first server may generate the first anonymized user information from the first user information by anonymizing, according to the predetermined rule, the first user information stored in the first server, and transmit the device history information stored in the first server and the generated first anonymized user information to the information management apparatus, and the second server may generate the second anonymized user information from the second user information by anonymizing, according to the predetermined rule, the second user information stored in the second server, and transmit the service history information stored in the second server and the generated second anonymized user information to the information management apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The following describes an information management method and an information management system according to an aspect of the present invention, with reference to the drawings.

Each of the embodiments described below shows a specific example of the present invention. The values, configurations, materials, constituent elements, layout and connection of the constituent elements, steps, and the order of the steps in the embodiments are given not for limiting the present invention but merely for illustrative purposes only. Among the constituent elements in the following embodiments, constituent elements not recited in any one of the independent claims defining the most generic part of the inventive concept are described as optional constituent elements.

Embodiment 1

1. System Configuration

The following describes an information management system 13 according to Embodiment 1 with reference to drawings.

1.1 Overall Configuration of the Information Management System 13

FIG. 1 shows an exemplary overall configuration of an information management system according to Embodiment 1. The information management system 13 includes a manufacturer server 100*c*, a portal server 200*c*, service provider servers 300*c* to 300*e*, devices 400, and a user terminal 500.

Examples of the devices 400 include a television set, a body composition analyzer, a treadmill, an exercise bike, and a pedal electric cycle. The devices 400 are manufactured by a manufacturer which uses the manufacturer server 100*c* and collects a device history from the devices 400. The user terminal 500 is, for example, a personal computer or a mobile terminal such as a mobile phone.

1.2 Configuration of the Manufacturer Server 100*c*

Figure 2:
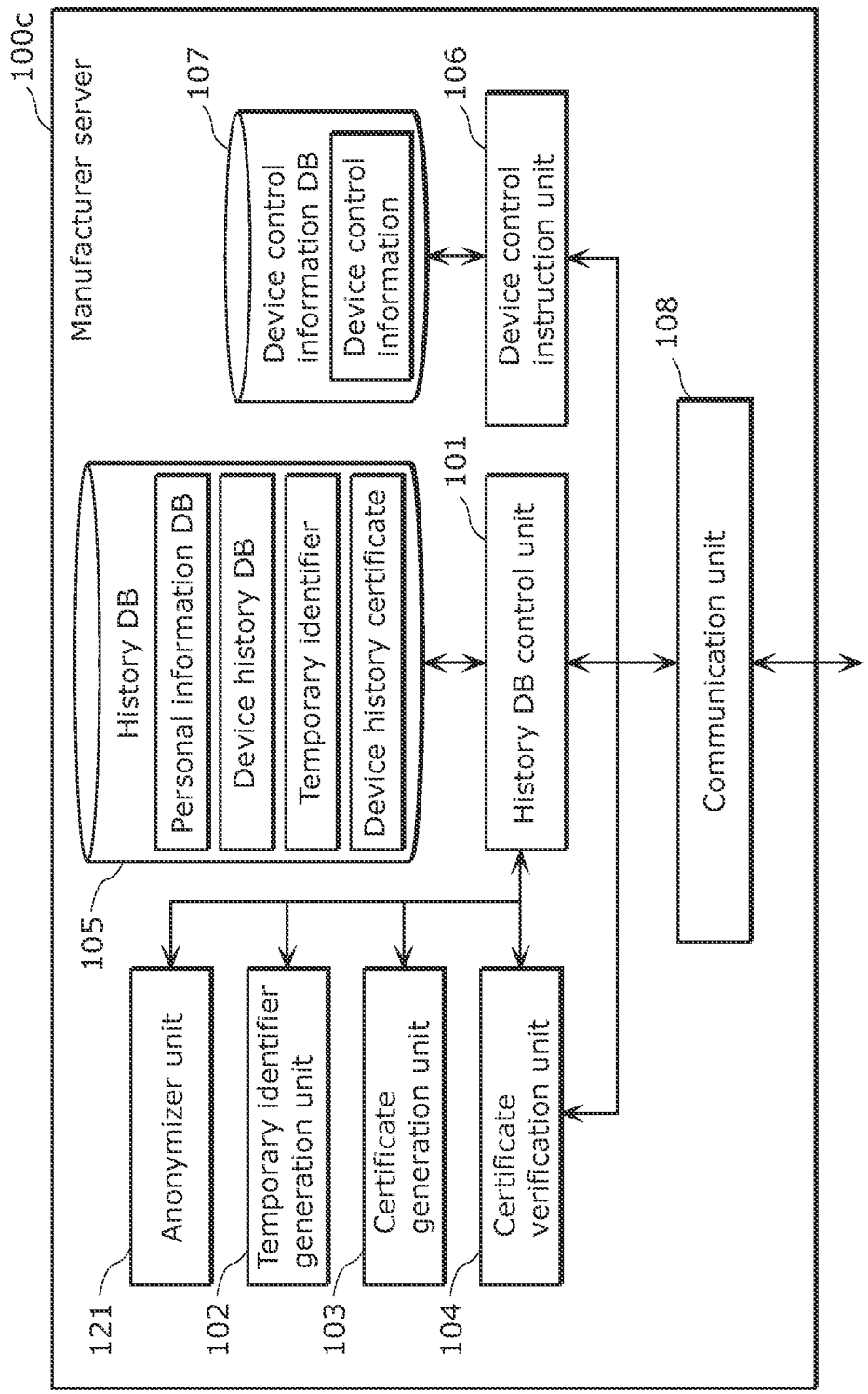
FIG. 2 is a block diagram illustrating an exemplary configuration of the manufacturer server according to Embodiment 1.

FIG. 2 is a block diagram illustrating an exemplary configuration of the manufacturer server 100*c* according to Embodiment 1. The manufacturer server 100*c* is an example of a first server, and includes a history DB control unit 101, a temporary identifier generation unit 102, a certificate generation unit 103, a certificate verification unit 104, a history DB 105, a device control instruction unit 106, a device control information DB 107, a communication unit 108, and an anonymizer unit 121.

The anonymizer unit 121 anonymizes a relevant item of user information stored in personal information DB, according to an anonymization rule (predetermined rule) delivered from the portal server 200*c* to the communication unit 108. The user information is personal information from which a user can be identified, and includes attribute information which allows the identification of a user.

The history DB control unit 101 controls the history DB 105 to manage personal information of a user (user information), a device history (device history information), a temporary identifier, and a device history certificate. The device history indicates an operation history of the devices 400 used by the user. The temporary identifier corresponds to a record of personal information of the user (user information) and a record of the device history.

For example, when providing (transmitting) a device history to the portal server 200*c*, the history DB control unit 101 requests the temporary identifier generation unit 102 to generate a temporary identifier corresponding to a user ID, and requests the anonymizer unit 121 to anonymize, according to an anonymization rule (predetermined rule) received from the portal server 200*c*, relevant user information (personal information of a relevant user) included in personal information DB.

For example, upon receiving a user ID and a temporary identifier from the temporary identifier generation unit 102 and an anonymized record of user information (anonymized user information) from the anonymizer unit 121, the history DB control unit 101 associates the user ID and the temporary identifier in the history DB 105 and requests the certificate generation unit 103 to generate a signature which associates the temporary identifier, the anonymized user information, and the device history.

In the managing, for example, the history DB control unit 101 associates a device history certificate received by the certificate generation unit 103 with a user ID and a temporary identifier corresponding to the device history certificate. When verification of a proposal information certificate by the certificate verification unit 104 is successful, the history DB control unit 101 receives proposal information which indicates a proposal of service to a user, and requests the device control instruction unit 106 to control a device according to the proposal information. Upon receiving device control information from the device control instruction unit 106, the history DB control unit 101 provides the device control information to a relevant user indicated by the user ID associated with the temporary identifier.

The temporary identifier generation unit 102 generates a temporary identifier corresponding to a user ID.

For example, the temporary identifier generation unit 102 generates a temporary identifier from a user ID upon receiving a request from the history DB control unit 101. The temporary identifier may be generated using any method by which the temporary identifier and a user ID are uniquely associated. For example, each temporary identifier may be randomly generated. Alternatively, a temporary identifier may be generated as a result of encryption of a user ID using a given encryption key or as a result of calculation using a one-way function with a user ID. The temporary identifier may include information which does not allow identification of personal information of a user. For example, a temporary identifier may include the gender or the age range of a user.

Figure 3:
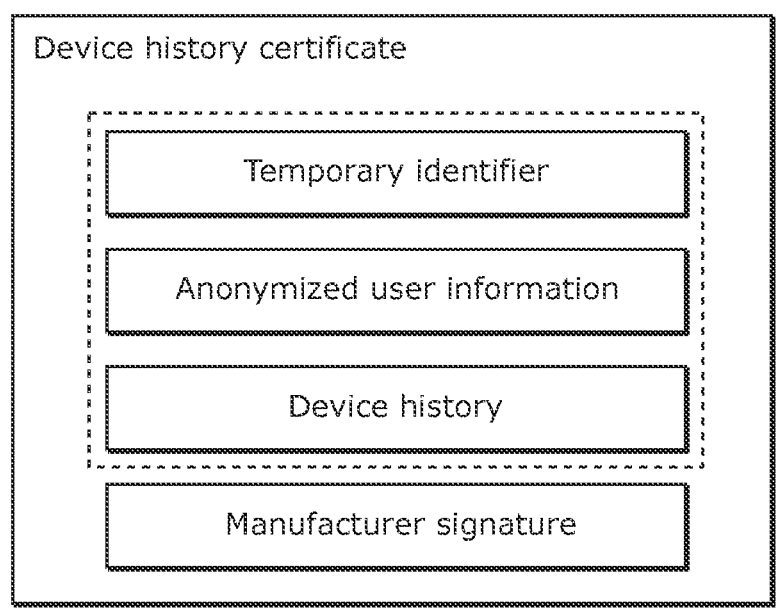
FIG. 3 shows an exemplary structure of a device history certificate according to Embodiment 1.

The certificate generation unit 103 generates a device history certificate upon receiving a temporary identifier, a device history, and anonymized user information from the history DB control unit 101. FIG. 3 shows an exemplary structure of the device history certificate according to Embodiment 1. As shown in FIG. 3, the device history certificate is a certificate associating a temporary identifier, anonymized user information, and a device history, and is marked with a signature (manufacturer signature) generated for the temporary identifier, the anonymized user information, and the device history using a signature generation key (not shown) held in the certificate generation unit 103.

After generating a device history certificate, the certificate generation unit 103 transmits the device history certificate and a public key certificate (not shown) including a signature verification key corresponding to the signature generation key. The public key certificate is a certificate of a signature verification key and issued with a signature by a certification authority (not shown in the diagram of the overall configuration). Alternatively, the signature may be generated for a hash value of a value of a combination of a temporary identifier and a device history.

The certificate verification unit 104 receives a proposal information certificate and a public key certificate including a signature verification key from the portal server 200*c* via the communication unit 108, and then verifies the signatures. In the verification of a signature of the proposal information certificate, first the certificate verification unit 104 verifies a portal server signature against a device history certificate and proposal information. When the verification of the portal server signature is successful, the certificate verification unit 104 then verifies a manufacturer server signature of the device history certificate. Only when both the verification of the portal server signature and the verification of the manufacturer server are successful, the certificate verification unit 104 verifies that the proposal information certificate is valid. When the proposal information certificate is valid, the certificate verification unit 104 transmits the temporary identifier, the anonymized user information, and the proposal information to the history DB control unit 101.

The history DB 105 contains a personal information DB, a device history DB, a temporary identifier, and a device history certificate. The personal information DB stores user information including, as items of attribute information, information which is data of basic profiles of users, such as names and addresses. The device history DB stores an operation history of the device 400 such as a household electric device of a user (for example, an operation history of a television channel) or a user's data obtained by the device 400 (for example, a history of a user's weight obtained by a body composition analyzer).

Upon receiving a request for control of a device from the history DB control unit 101, the device control instruction unit 106 searches the device control information DB 107 for a record of device control information for a corresponding one of the devices 400, and transmits the record of the device control information to the history DB control unit 101. The device control information is information including a control program for control of the device 400. For example, the device control information may include a control program for control of operation speed and time of a treadmill or a control program for control of assistance power of a pedal electric cycle. In short, the device control information may include any information on control of a device.

The device control information DB 107 stores device control information of the devices 400.

The communication unit 108 communicates with the portal server 200c, the devices 400, and the user terminal 500. The communication unit 108 uses Secure Socket Layer (SSL) for the communication with the portal server 200c and the user terminal 500. The communication unit 108 stores a certificate necessary for the communication using SSL. The communication unit 108 receives a rule for anonymization (predetermined rule) from the portal server 200c. The rule for anonymization (predetermined rule) specifies an attribute information item to be deleted or abstracted among items of attribute information included in user information in the personal information DB.

As described above, the manufacturer server 100c stores a device history and first user information. The device history indicates an operation history of the devices 400 used by the first user. The first user information includes attribute information which allows identification of the first user. The manufacturer server 100c generates first anonymized user information by anonymizing the first user information according to a predetermined rule (anonymization rule), and transmits the device history and the first anonymized user information to the portal server 200c.

1.3 Configuration of the Portal Server 200c

Figure 4:
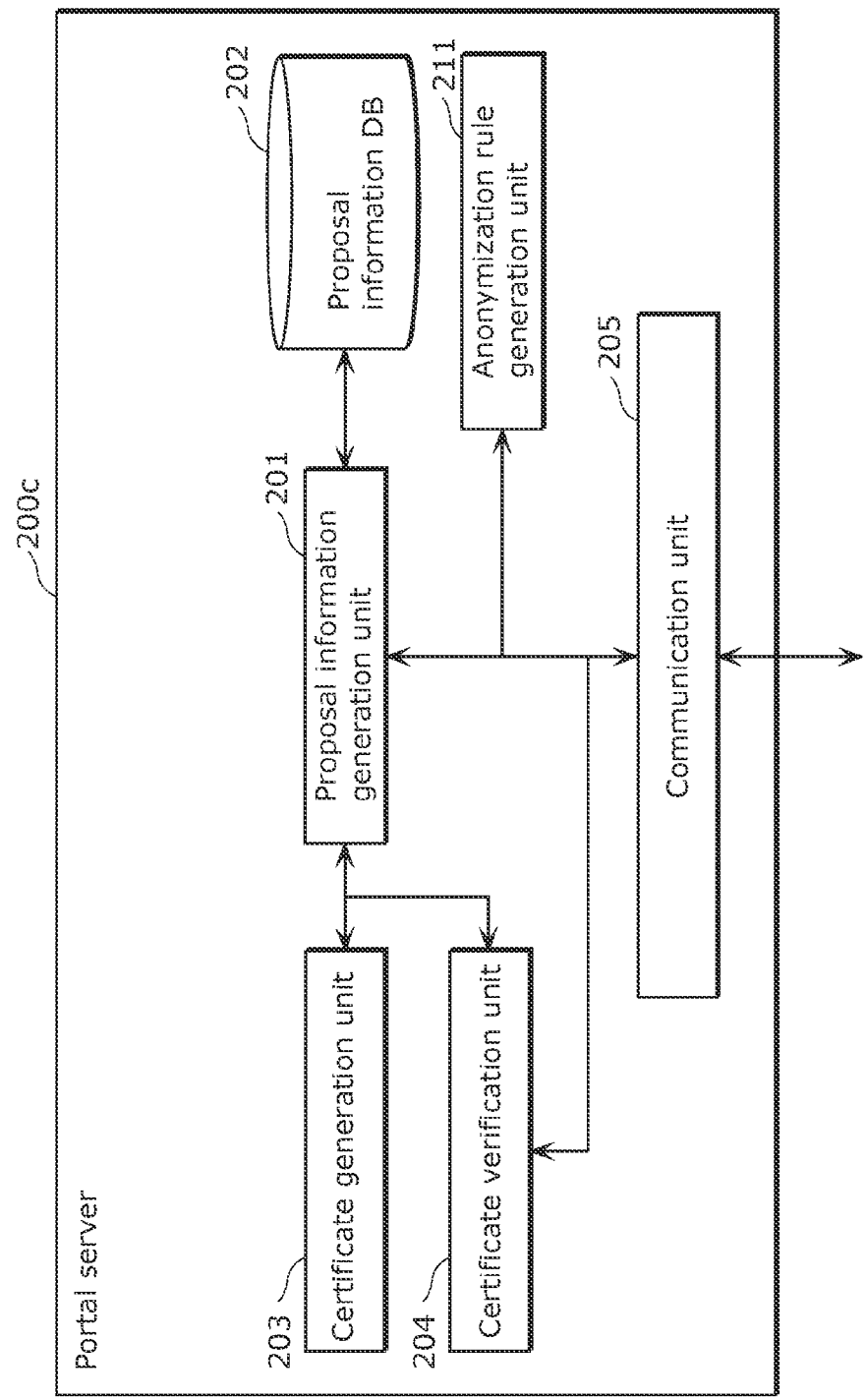
FIG. 4 is a block diagram illustrating an exemplary configuration of a portal server according to Embodiment 1.

FIG. 4 is a block diagram illustrating an exemplary configuration of the portal server 200c according to Embodiment 1. The portal server 200c is an example of an information management apparatus which manages information, and includes a proposal information generation unit 201, a proposal information DB 202, a certificate generation unit 203, a certificate verification unit 204, a communication unit 205, and an anonymization rule generation unit 211.

In order to obtain information necessary to generate proposal information, the anonymization rule generation unit 211 generates an anonymization rule (predetermined rule) for anonymization of user information (personal information) stored in the manufacturer server 100c or the service provider server 300c. The proposal information indicates a proposal of service to a user. As described above, the anonymization rule specifies an attribute information item to be deleted or abstracted among items of attribute information included in user information (personal information of a user). The anonymization rule generation unit 211 determines whether or not each item of the attribute information is to be deleted or abstracted, based on a combination of the type of an operation indicated by the device history stored in the manufacturer server 100c and the type of a service indicated by the service history stored in the service provider server 300c. This is because proposal information to a user depends on details of service history and a device which the user uses. If an item of attribute information in user information allows identification of a user, the item of attribute information needs to be deleted or abstracted. If an item of attribute information in user information does not allow identification of a user, the anonymization rule generation unit 211 determines whether or not to delete or abstract the item of attribute information based on a combination of a type of the service and a type of the operation.

Figures 5, 6:
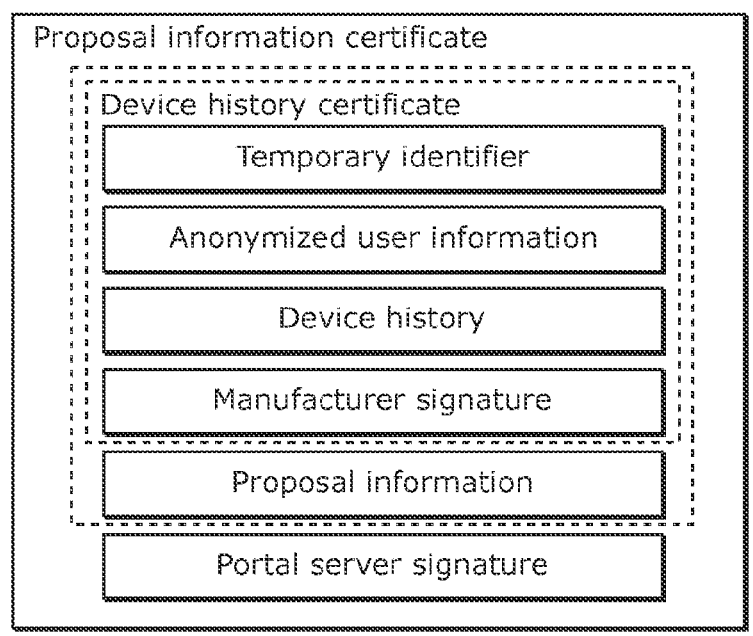
FIG. 5 shows an example of anonymization rules according to Embodiment 1.
FIG. 6 shows an exemplary structure of a proposal information certificate according to Embodiment 1.

FIG. 5 shows an example of anonymization rules according to Embodiment 1. The anonymization rules shown in FIG. 5 are to be applied in a case where proposal information is generated from history information from the manufacturer server 100c and service history information from a fitness service.

More specifically, the anonymization rule shown in FIG. 5 specifies that the item of "Name" is to be deleted, and the item of "Address" is abstracted to the name of city by omitting further details of the address. The item of "Birth date" is abstracted to year by omitting month and day. The item of "Gender" is provided as it is, and the item of "Mail address" and the item of "Hobby" are deleted.

Thus, the anonymization rule specifies attribute information items to be deleted or abstracted among items of attribute information included in user information (personal information of a user), and specifies that at least one of the items of "Gender", "Age", "Age range", "Address", and "Occupation" is to be included, as an item of attribute information, in anonymized user attribute information. In this manner, part of items of attribute information included in user information (personal information) stored in the servers are deleted or abstracted so that resulting anonymized user attribute information does not allow identification of a user but does allow generation of proposal information.

The proposal information generation unit 201 generates proposal information based on a device history and a service history associated with each other to be managed as composite information. The proposal information indicates a proposal of service to a first user. Then, the proposal information generation unit 201 provides the generated proposal information to a user via the manufacturer server 100c.

More specifically, the proposal information generation unit 201 generates proposal information for a user based on a device history included in a device history certificate received from the manufacturer server 100c, a service history received from the service provider server 300c or others, and proposal information stored in the proposal information DB 202. For example, the proposal information generation unit 201 generates proposal information based on a temporary identifier, anonymized user information, and a device history received from the manufacturer server 100c and a temporary identifier, anonymized user information, and service information received from the service provider server 300c or others. The proposal information generation unit 201 also stores the generated proposal information in the proposal information DB.

After generating the proposal information, the proposal information generation unit 201 requests the certificate generation unit 203 to generate a proposal information certificate from the device history certificate and the proposal information. Upon receiving a proposal information certificate from the certificate generation unit 203, the proposal information generation unit 201 transmits the proposal information certificate to the manufacturer server 100c.

The proposal information DB 202 stores the proposal information provided to a user.

Upon receiving proposal information and a device history certificate from the certificate generation unit 201, the certificate generation unit 203 generates a proposal information certificate. FIG. 6 shows an exemplary structure of the proposal information certificate according to Embodiment 1. The proposal information certificate shown in FIG. 6 is a certificate associating a device history certificate and proposal information, and is marked with a portal server signature, which is a signature generated using a signature generation key (not shown) held in the certificate generation unit 203.

After generating a proposal information certificate, the certificate generation unit 203 transmits the proposal information certificate and a public key certificate (not shown) including a signature verification key corresponding to the signature generation key. The public key certificate is a certificate of a signature verification key and issued with a signature by a certification authority (not shown in the diagram of the overall configuration). Alternatively, the signature may be generated for a hash value of a value of a combination of a device history certificate and proposal information.

The certificate verification unit 204 receives a device history certificate and a public key certificate including and a signature verification key from the manufacturer server 100c via the communication unit 205, and then verifies the signature. In the verification of a signature of the device history certificate, the certificate verification unit 204 verifies a manufacturer server signature against a temporary identifier, anonymized user information, and a device history included in the device history certificate. When the manufacturer server signature is valid, the certificate verification unit 204 transmits the temporary identifier, the anonymized user information, and the device history to the proposal information generation unit 201.

The communication unit 205 communicates with the manufacturer server 100c, the service provider server 300c, and others. The communication unit 205 uses SSL for communication with the manufacturer server 100c, the service provider server 300c, and others. The communication unit 205 stores a certificate necessary for the communication using SSL. The communication unit 205 transmits an anonymization rule (predetermined rule) generated by the anonymization rule generation unit 211 to the manufacturer server 100c, the service provider server 300c, and others via a network.

As described above, the portal server 200c receives, from the manufacturer server 100c via a network, a device history and a first anonymized user information generated by anonymizing, according to an anonymization rule, first user information including attribute information which allows identification of a first user. The portal server 200c receives, from the service provider server 300c via a network, a service history and a second anonymized user information generated by anonymizing, according to an anonymization rule, second user information including attribute information which allows identification of a second user. When the portal server 200c determines that the first anonymized user information and the second anonymized user information are identical or similar, the portal server 200c associates the device history of the first user and the service history of the second user, who is identical or similar to the first user, and manages, as composite information, the device history and the service history associated with each other. Then, the portal server 200c generates proposal information based on data of the composite information, and provides the generated proposal information to the first user via the manufacturer server 100c. The proposal information indicates a proposal of service to the first user.

The route for providing a user with proposal information by the portal server 200c is not limited to the above-described route via the manufacturer server 100c. When the user terminal 500 is connected via a network not to the manufacturer server 100c but to the service provider server 300c, proposal information may be provided to the second user via the service provider server 300c.

1.4 Configuration of the Service Provider Server 300c

Figure 7:
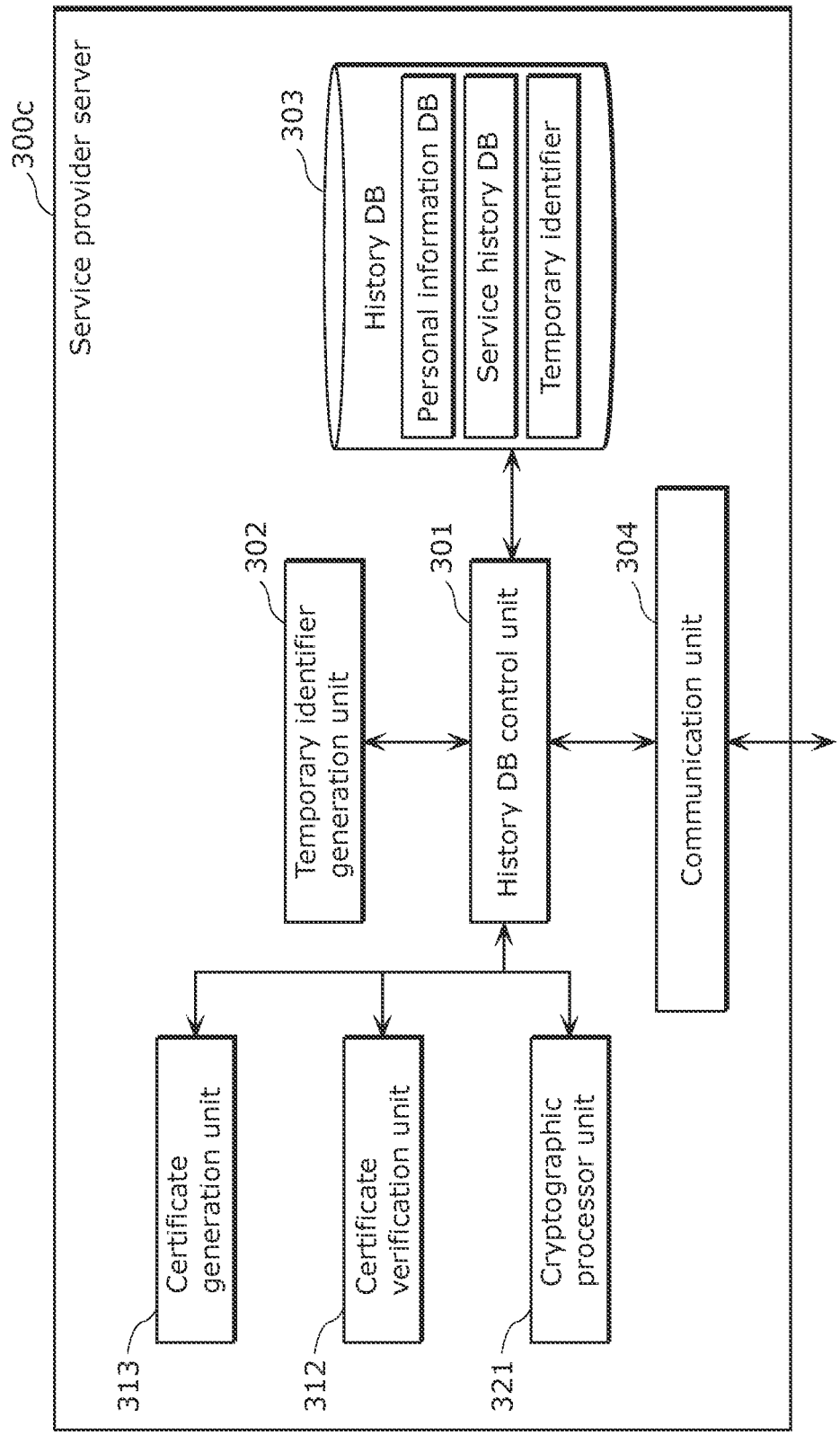
FIG. 7 is a block diagram illustrating an exemplary configuration of a service provider server according to Embodiment 1.

FIG. 7 is a block diagram illustrating an exemplary configuration of the service provider server 300c according to Embodiment 1. The service provider servers 300d and 300e have a configuration in common with the service provider server 300c, and therefore the following describes only the service provider server 300c.

The service provider server 300c is an example of the second server, and includes a history DB control unit 301, a temporary identifier generation unit 302, a history DB 303, a communication unit 304, a certificate verification unit 312, a certificate generation unit 313, and an anonymizer unit 321.

The anonymizer unit 321 anonymizes a relevant item of user information stored in personal information DB, according to an anonymization rule (predetermined rule) delivered from the portal server 200c to the communication unit 304.

The history DB control unit 301 controls the history DB 303 to manage personal information of a user (user information), a service history, and a temporary identifier. The service history indicates history of services provided to a user. The temporary identifier corresponds to a record of personal information of a user (user information) and a record of the service history. In this example, the service history indicates a history of fitness services provided to a user. For example, a record of the service history indicates that a user is provided with a service of training by a set of advanced aerobic exercise and a 30-minute exercise bike on the day of Z of the month of Y in the year of XXX.

For example, when providing (transmitting) a service history to the portal server 200c, the history DB control unit 301 requests the temporary identifier generation unit 302 to generate a temporary identifier corresponding to a user ID, and requests the anonymizer unit 321 to anonymize, according to an anonymization rule (predetermined rule) delivered from the portal server 200c, relevant user information (personal information of a relevant user) included in personal information DB.

For example, upon receiving a user ID and a temporary identifier from the temporary identifier generation unit 302 and an anonymized record of user information (anonymized user information) from the anonymizer unit 321, the history DB control unit 301 associates the user ID and the temporary identifier in the history DB 303 and manages the temporary identifier, the anonymized user information, and a service history associated with each other. The history DB control unit 301 transmits the temporary identifier, the anonymized user information, and the service history as service history information to the portal server 200.

The temporary identifier generation unit 302 generates a temporary identifier corresponding to a user ID. For example, the temporary identifier generation unit 302 generates a temporary identifier from a user ID upon receiving a request from the history DB control unit 301. A temporary identifier may be generated using any method by which the temporary identifier and a user ID are uniquely associated. For example, each temporary identifier may be randomly generated. Alternatively, a temporary identifier may be generated as a result of encryption of a user ID using a given encryption key or as a result of calculation using a one-way function with a user ID. The temporary identifier may include information which does not allow identification of personal information of a user. For example, a temporary identifier may include the gender or the age range of a user.

Figure 8:
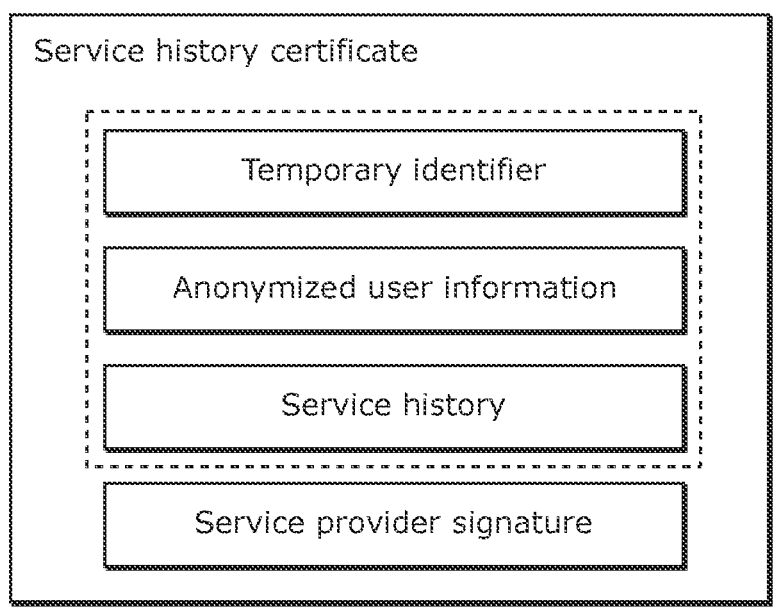
FIG. 8 shows an exemplary structure of a service history certificate.
Figure 9:
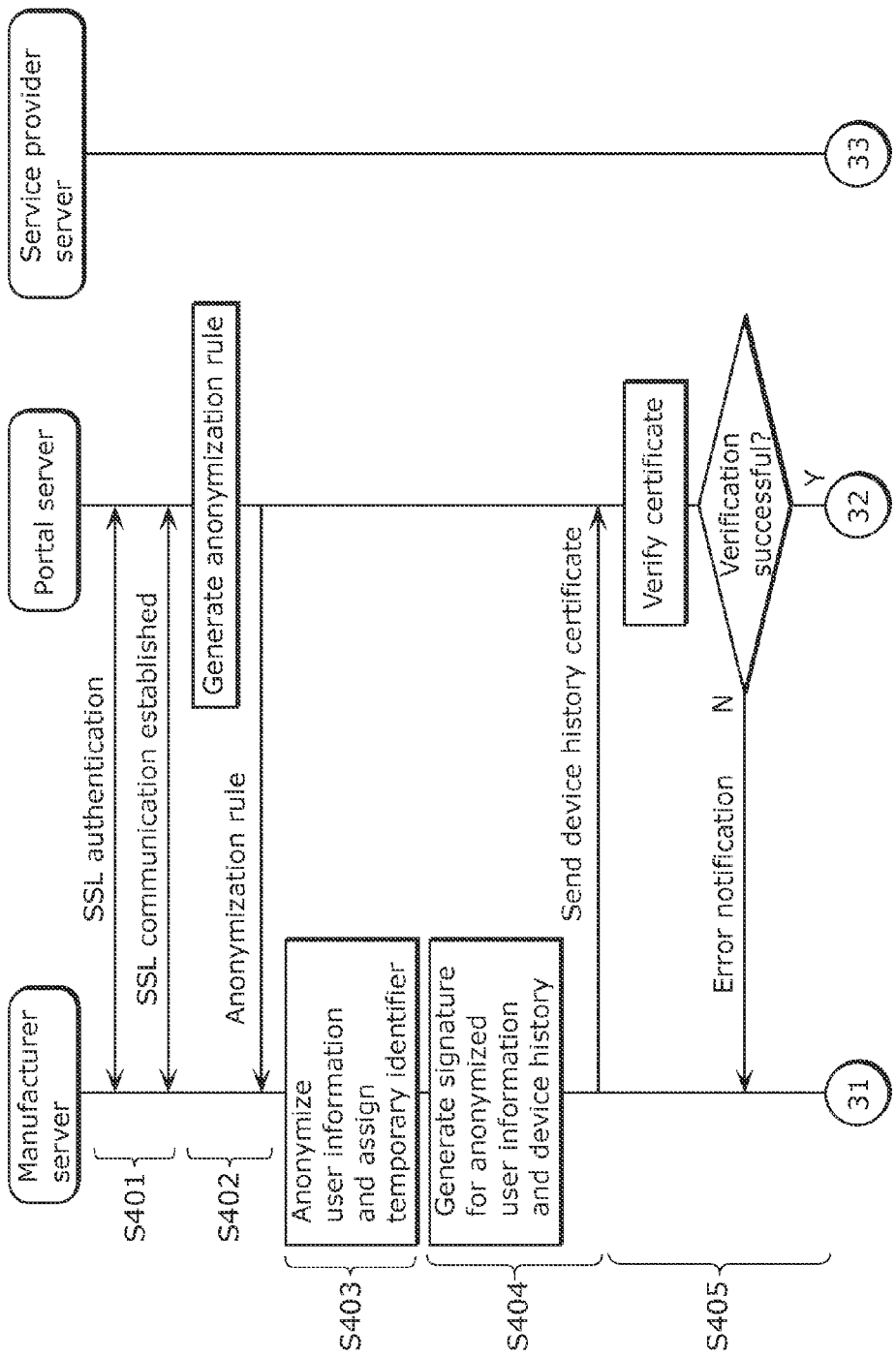
FIG. 9 is a sequence diagram illustrating processing for providing a user with proposal information by the portal server.
Figure 10:
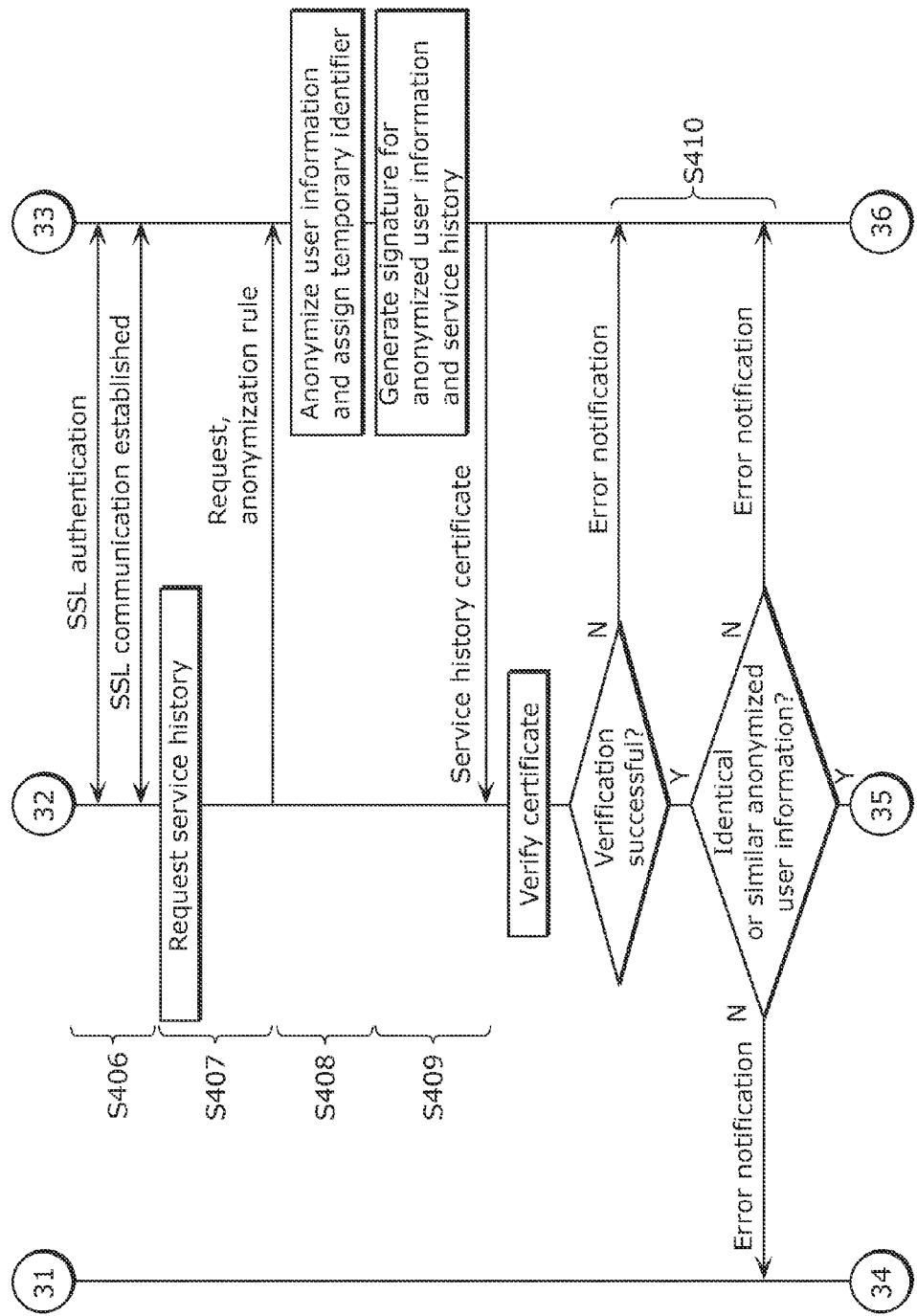
FIG. 10 is a sequence diagram illustrating processing for providing a user with proposal information by the portal server.
Figure 11:
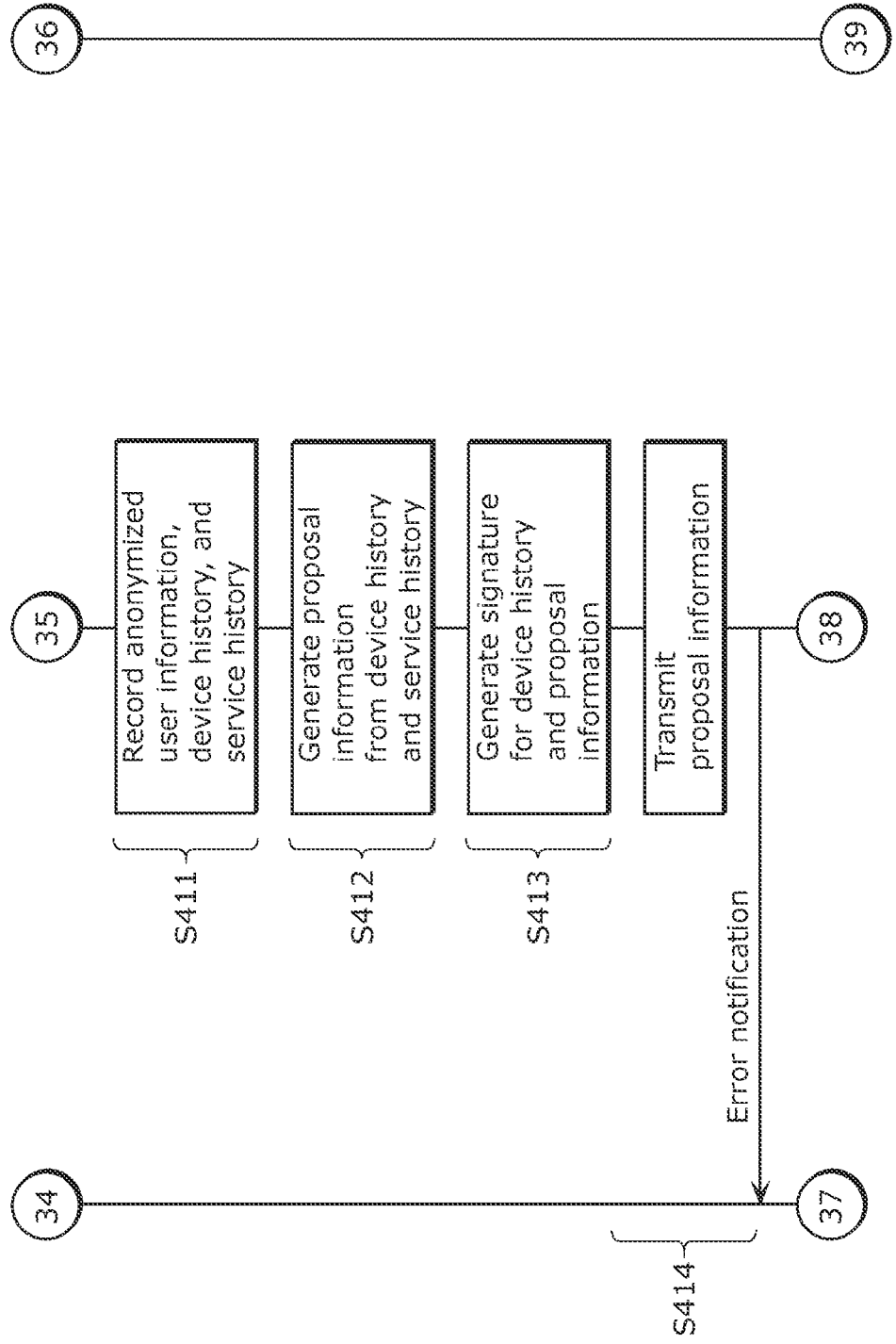
FIG. 11 is a sequence diagram illustrating processing for providing a user with proposal information by the portal server.
Figure 12:
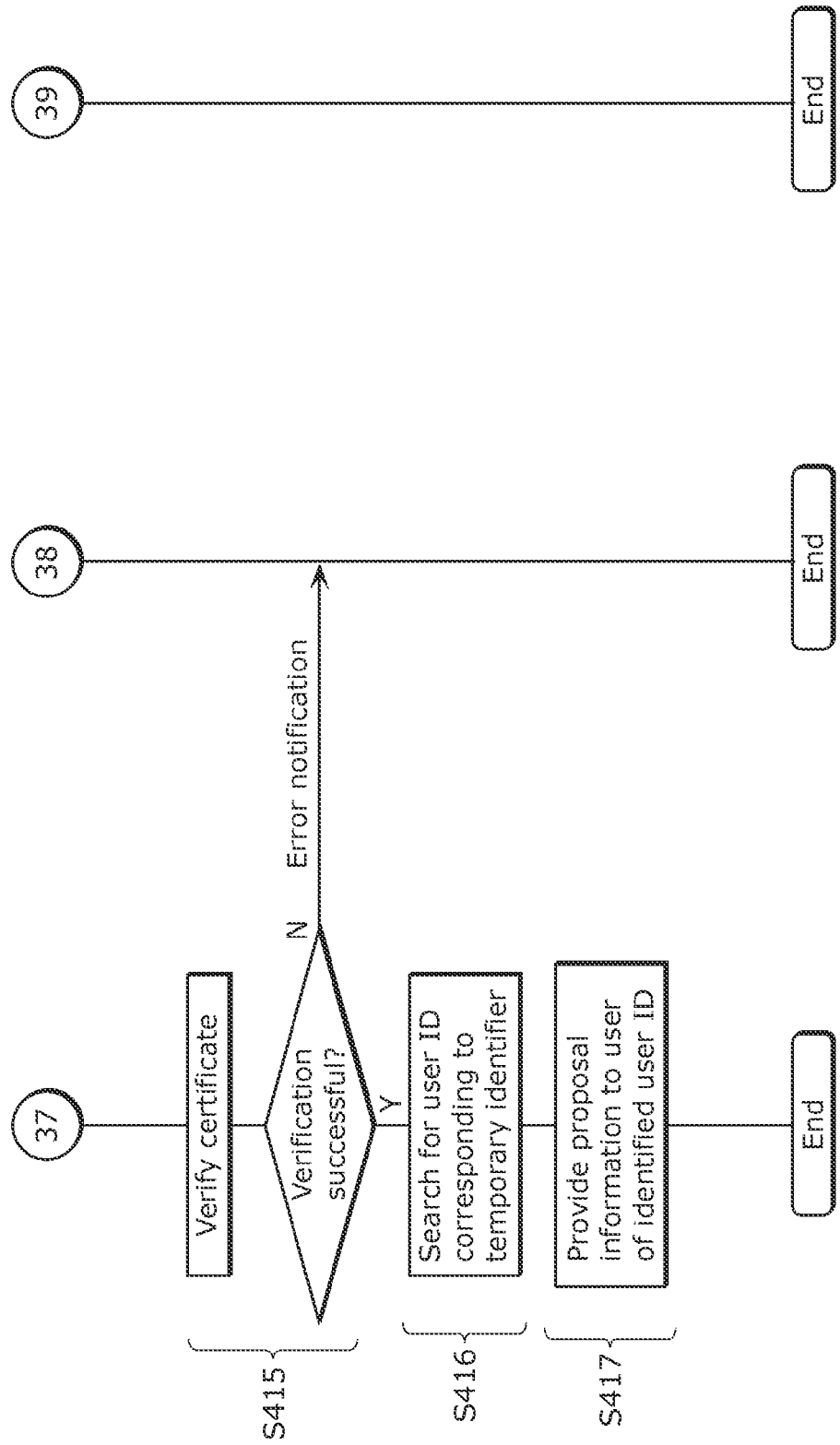
FIG. 12 is a sequence diagram illustrating processing for providing a user with proposal information by the portal server.

The certificate generation unit 313 generates a service history certificate upon receiving a temporary identifier, a device history, and anonymized user information from the history DB control unit 301. FIG. 8 shows an exemplary structure of the service history certificate. The service history certificate is a certificate associating a temporary identifier, anonymized user information, and a service history, and is marked with a signature (service provider signature) generated for the temporary identifier, anonymized user information, and service history using a signature generation key (not shown) held in the certificate generation unit 313.

After generating a service history certificate, the certificate generation unit 313 transmits the service history certificate and a public key certificate (not shown) including a signature verification key corresponding to the signature generation key.

The certificate verification unit 312 receives a proposal information certificate and a public key certificate including a signature verification key from the portal server 200c via the communication unit 304, and then verifies the signatures. The certificate verification unit 312 is similar to the certificate verification unit 104, and therefore description thereof is omitted.

The history DB 303 contains a personal information DB, a service history DB, and a temporary identifier. The personal information DB stores user information including, as items of attribute information, information which is data of basic profiles of users, such as names and addresses. The service history DB includes histories of services provided to users.

The communication unit 304 communicates with the portal server 200c. The communication unit 304 communicates with the portal server 200c using Secure Socket Layer (SSL). The communication unit 304 stores a certificate necessary for the communication using SSL. The communication unit 304 receives a rule for anonymization (predetermined rule) from portal server 200c.

As described above, the service provider server 300c stores a service history and second user information. The service history indicates a history of services provided to the second user. The second user information includes attribute information which allows identification of the second user. The service provider server 300c generates second anonymized user information from the second user information by anonymizing the attribute information included in the second user information according to a predetermined rule (anonymization rule), and transmits the service history and the second anonymized user information to the portal server 200c.

1.5 Operation of the Information Management System 13

Operation of the information management system 13 includes the following processing.

(1) Processing for registration of a user in the manufacturer server 100c by the user via the user terminal 500

(2) Processing for registration of a household electric device in the manufacturer server 100c by the user (3) Processing for uploading a household electric device history information from the device 400 of the user to a device history DB (4) Processing for providing the user with proposal information by the portal server 200

The Processing (1) to Processing (3) are described later in the section of Embodiment 2, and therefore description thereof is omitted in Embodiment 1.

1.5.1 Processing for Providing the User with Proposal Information by the Portal Server 200

FIG. 9 to FIG. 12 are sequence diagrams illustrating processing for providing a user with proposal information by the portal server 200. The providing of proposal information is performed either periodically or non-periodically.

In S401, an encrypted communication channel is established between the manufacturer server 100c and the portal server 200c using SSL authentication.

Next, in S402, the portal server 200c generates an anonymization rule and transmits the anonymization rule to the manufacturer server 100c.

Next, in S403, the manufacturer server 100c anonymizes personal information of a user (user information) according to the anonymization rule, and generates a temporary identifier from the user ID of the user.

Next, in S404, the manufacturer server 100c generates a signature (manufacturer signature) for the temporary identifier, anonymized user information, and a device history, and thereby generates a device history certificate as shown in FIG. 3. Then, the manufacturer server 100c transmits the device history certificate and a public key certificate to the portal server 200c.

Next, in S405, the portal server 200c receives the device history certificate and the public key certificate from the manufacturer server 100c and verifies these certificates. When the verification of the certificates fails, the portal server 200c notifies the manufacturer server 100c of an error.

Next, when the verification of the device history certificate is successful, in S406, the portal server 200c establishes an encrypted communication channel to, for example, the service provider server 300c using SSL authentication.

Next, in S407, the portal server 200c transmits a request and the anonymization rule to the service provider server 300c in order to request the service provider server 300c for a service history relevant to the device history information.

Next, in S408, upon receiving, from the portal server 200c, the request for service information and the anonymization rule, the service provider server 300c anonymizes personal information of a user (user information) according to the anonymization rule, and generates a temporary identifier from the user ID of the user.

Next, in S409, the service provider server 300c generates a signature for the temporary identifier, anonymized user information, and service history, and generates a service history certificate as shown in FIG. 8. Then, the service provider server 300c transmits the service history certificate and a public key certificate to the portal server 200c.

Next, in S410, the portal server 200c receives the service history certificate and public key certificate from the service provider server 300c and verifies these certificates. When the verification of the certificates fails, the portal server 200c notifies the service provider server 300c of an error.

Furthermore, the portal server 200 checks whether the device history certificate and service history certificate have been anonymized according to the anonymization rule. When the anonymized user information is neither identical nor similar, the portal server 200 notifies the manufacturer server 100c and the service provider server 300c of an error.

Next, in S411, the portal server 200c records the device history certificate received from the manufacturer server 100c and the service history certificate received from the service provider server 300c.

Next, in S412, the portal server 200c generates proposal information based on the device history in the device history certificate and the service history and the anonymized user information in the service history certificate.

Next, in S413, the portal server 200c generates a signature for the generated proposal information and the device history certificate, and thereby generates a proposal information certificate as shown in FIG. 6.

Next, in S414, the portal server 200c transmits the proposal information certificate to the manufacturer server 100c.

Next, in S415, the manufacturer server 100c verifies the proposal information certificate. When the verification of the proposal information certificate fails, the manufacturer server 100c notifies the portal server 200c of an error.

Next, in S416, when the verification of the proposal information certificate by the manufacturer server 100c is successful, the manufacturer server 100c searches the history DB 105 for a device history certificate with reference to the device history certificate included in the proposal information certificate. Then, the manufacturer server 100c searches for a user ID corresponding to the temporary identifier included in the device history certificate searched out, and identifies the user ID as the user ID of a user to whom the proposal information is to be provided.

Next, in S417, the manufacturer server 100c provides the proposal information to the user indicated by the identified user ID. When the proposal information includes control information of any of the devices 400, the manufacturer server 100c notifies the user terminal 500 of the presence of the device control information, and further transmits the control information when the user terminal 500 sends back OK in return to the notification. When the proposal information does not include control information of any of the devices 400, the manufacturer server 100c transmits the proposal information to the user terminal 500.

1.6 Advantageous Effects

In Embodiment 1, use of user information anonymized according to an anonymization rule provided by the portal server 200c allows the manufacturer server 100c, the portal server 200c, the service provider server 300c, and others to interface with each other, so that the portal server 200c may provide a user with proposal service information using a device history of the user and a service history of a user identical or similar to the user. The manufacturer server 100c, the service provider server 300c, and others provide the portal server 200c with user information which does not allow identification of a user and is anonymized such that the user information still enables generation of proposal service information. In other words, none of the manufacturer server 100c, service provider server, and others does not provide the portal server 200c with personal information of users. An information management method and an information management system thus provided are capable of generating proposal information with security for privacy of users.

With this, a user is required to enter personal information of the user (user information) only when the user registers in the manufacturer server 100c or the service provider server 300c. Thus, the user can obtain proposal information from the portal server 200c without providing personal information (user information) to the portal server 200c.

The manufacturer server 100c generates a proposal information certificate for a device history certificate provided by the manufacturer server 100c, and thereby enables detection of tampering of the device history certificate and wrong replacement of proposal information with proposal information which is based on device history information of another user.

The above-described example, where the service provider server 300c which provides a fitness service A and the portal server 200c interface with each other and the service history is information indicating a history of fitness services provided to a user, is not intended to be limiting. For example, when a service provider server 300d which provides a weight control service B or a service provider server 300e which provides an insurance service C interfaces with the portal server 200c, the service history is a history of the weight control service B or the insurance service C used by a user, respectively.

The service history is not limited to the above-described examples. The service history may be information indicating a history of other services used by a user, such as health management services including medical care, educational services, or transportation services used by a user.

Service history indicating educational services used by a user may include records of date and time when distance learning services are provided and contents of the distance learning services, for example.

In this case, for example, the service provider who provides educational services transmits (provides) a service history to the portal server 200c. The service history including records of history information indicating date and time when distance learning services were provided to a user or a user identical or similar to the user. The manufacturer server 100c transmits, to the portal server 200c, a device history and a first anonymized user. The device history includes records of viewing history indicating contents of programs which the users viewed, for example. With this, the portal server 200c provides proposal information to propose educational services related to what the user is interested in, based on the service history, device history, and others receive from the manufacturer server 100c Embodiment 2

2. System Configuration

The following describes an information management system 10 according to Embodiment 2 with reference to drawings.

2.1 Overall Configuration of the Information Management System 10

Figure 13:
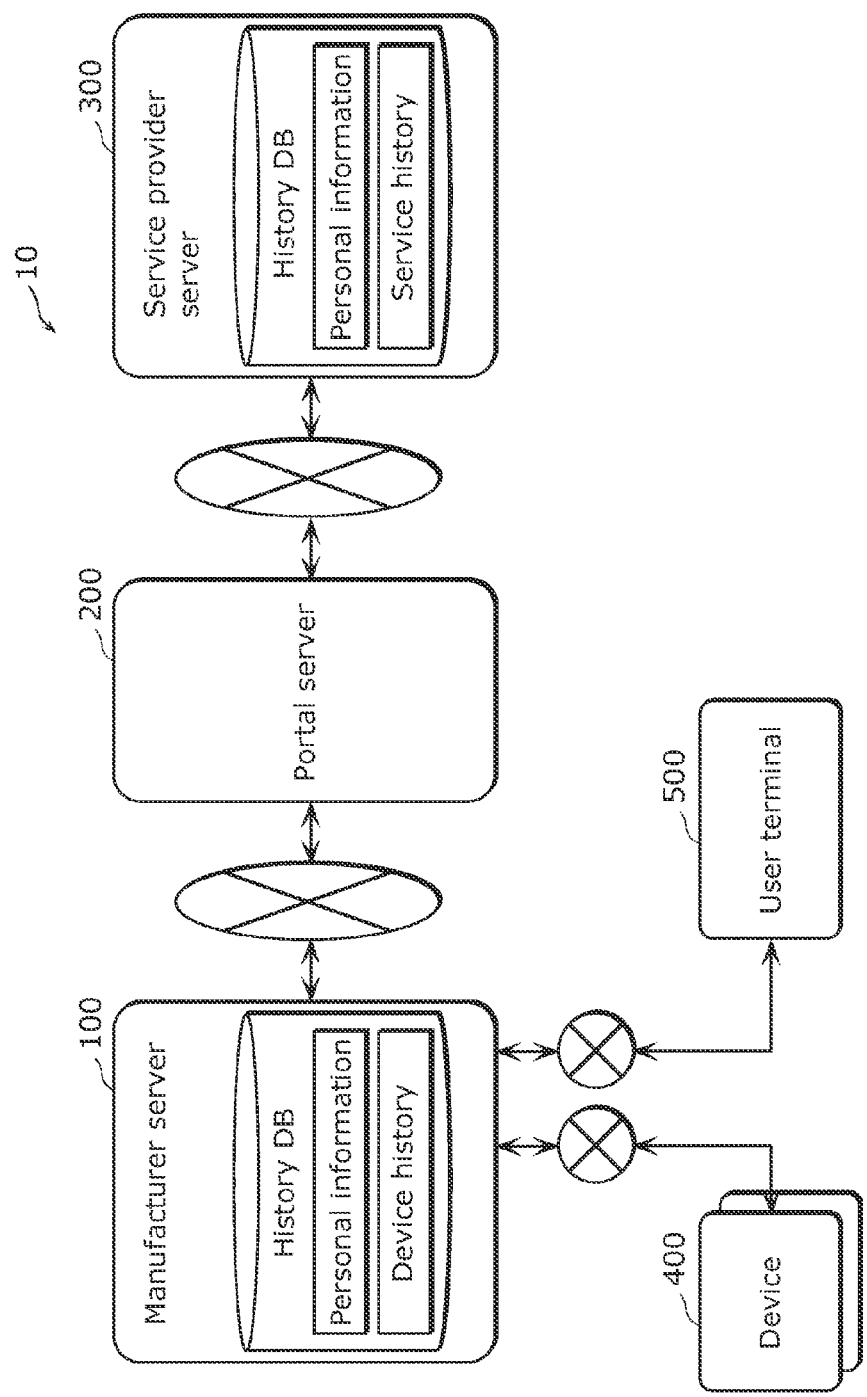
FIG. 13 shows an exemplary overall configuration of an information management system according to Embodiment 2.

FIG. 13 shows an exemplary overall configuration of an information management system according to Embodiment 2. The information management system 11 includes a manufacturer server 100, a portal server 200, a service provider server 300, devices 400, and a user terminal 500. Constituent elements having the same functionality as in Embodiment 1 are denoted with the same reference signs, and description thereof is omitted.

2.2 Configuration of the Manufacturer Server 100

Figure 14:
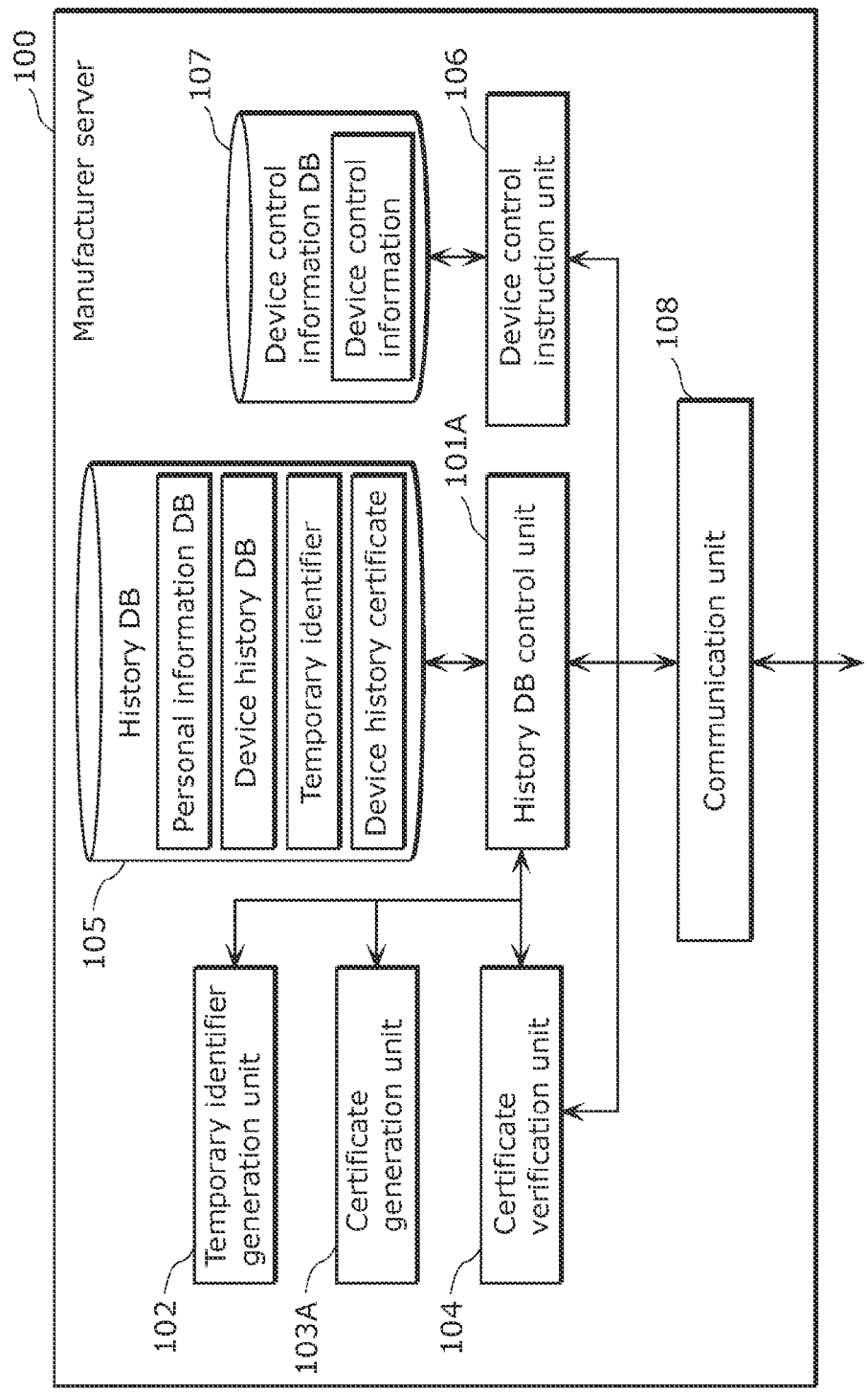
FIG. 14 is a block diagram showing an exemplary configuration of a manufacturer server according to Embodiment 2.

FIG. 14 is a block diagram illustrating an exemplary configuration of the manufacturer server 100c according to Embodiment 2. The manufacturer server 100 shown in FIG. 14 includes a history DB control unit 101A, a temporary identifier generation unit 102, a certificate generation unit 103A, a certificate verification unit 104, a history DB 105, a device control instruction unit 106, a device control information DB 107, and a communication unit 108. The manufacturer server 100 is different from the manufacturer server 100c in Embodiment 1 in that the manufacturer server 100 does not include the anonymizer unit 121.

The history DB control unit 101A controls the history DB 105 to manage personal information of a user (user information), a device history (device history information), a temporary identifier, and a device history certificate. The device history indicates an operation history of the devices 400 used by the user. The temporary identifier corresponds to a record of personal information of the user (user information) and a record of the device history.

For example, when providing device history information to the portal server 200, the history DB control unit 101A requests the temporary identifier generation unit 102 to generate a temporary identifier corresponding to a user ID. Furthermore, upon receiving a user ID and a temporary identifier from the temporary identifier generation unit 102, the history DB control unit 101A associates the user ID and the temporary identifier in the history DB 105 and requests the certificate generation unit 103A to generate a signature which associates the temporary identifier and the device history. In the managing, the history DB control unit 101A associates a device history certificate received by the certificate generation unit 103A with a user ID and a temporary identifier corresponding to the device history certificate. When verification of a proposal information certificate by the certificate verification unit 104 is successful, the history DB control unit 101A receives proposal information which indicates a proposal of service to a user, and requests the device control instruction unit 106 to control a household electric device according to the proposal information. Upon receiving device control information from the device control instruction unit 106, the history DB control unit 101A provides the device control information to a relevant user indicated by a user ID.

The temporary identifier generation unit 102 generates a temporary identifier corresponding to a user ID. The temporary identifier generation unit 102 generates a temporary identifier from a user ID upon receiving a request from the history DB control unit 101A. The temporary identifier is generated using the same method as described in Embodiment 1, and therefore description thereof is omitted.

Figures 15, 16:
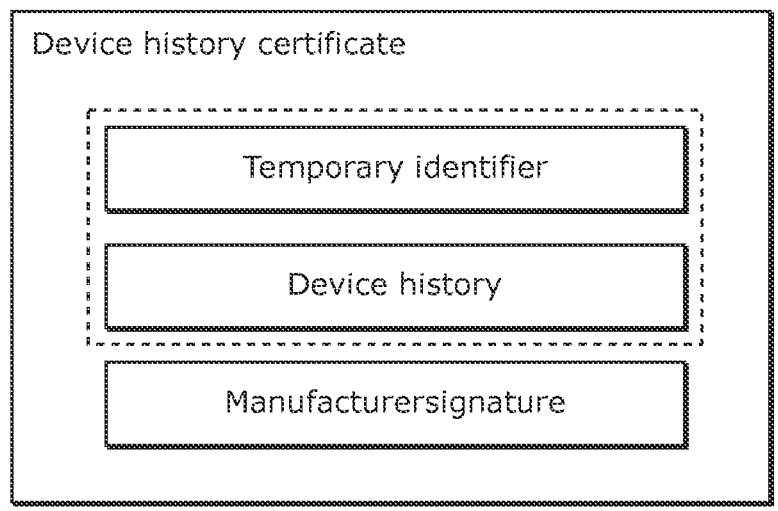
FIG. 15 shows an exemplary structure of a device history certificate according to Embodiment 2.
FIG. 16 shows an exemplary structure of a personal information DB according to Embodiment 2.

The certificate generation unit 103A generates a device history certificate upon receiving a temporary identifier and a device history from the history DB control unit 101A. FIG. 15 shows an exemplary structure of the device history certificate according to Embodiment 2. As shown in FIG. 15, the device history certificate is a certificate associating a temporary identifier and a device history, and is marked with a signature (manufacturer signature) generated for the temporary identifier and the device history using a signature generation key (not shown) held in the certificate generation unit 103A. After generating a device history certificate, the certificate generation unit 103A transmits the device history certificate and a public key certificate (not shown) including a signature verification key corresponding to the signature generation key. The public key certificate is a certificate of a signature verification key and issued with a signature by a certification authority (not shown in the diagram of the overall configuration). Alternatively, the signature may be generated for a hash value of a value of a combination of a temporary identifier and a device history.

The certificate verification unit 104 receives a public key certificate including a proposal information certificate and a signature verification key from the portal server 200 via the communication unit 108, and then verifies the signature. The verification of the proposal information certificate is performed using the same method as described in Embodiment 1, and therefore description thereof is omitted. When the verification of the proposal information certificate is successful, the certificate verification unit 104 transmits the temporary identifier and the proposal information to the history DB control unit 101A.

The history DB 105 contains a personal information DB, a device history DB, a temporary identifier, and a device history certificate.

As in Embodiment 1, the personal information DB stores user information including, as items of attribute information, information which is data of basic profiles of users, such as names and addresses. FIG. 16 shows an exemplary structure of a personal information DB according to Embodiment 2. In the example shown in FIG. 16, the user information includes items (items of attribute information) of name, address, birth date, gender, and hobby of each user. Such items may be determined for each system. In the example shown in FIG. 16, the attribute information in the record of user information with an user ID of ID11 is registered as follows: Name, Miki Yamada; Address, 3-10 Fukushima-ku, Osaka; Birth date, Oct. 5, 1980; Gender, female; and Hobby, aerobics. The attribute information in the record of user information with an user ID of ID12 is registered as follows: Name, Jiro Sato; Address, 1-19 Minato-ku, Tokyo; Birth date, Mar. 3, 1990; Gender, male; and Hobby, reading. The attribute information included in the user information (common items of attribute information among records) is entered by each user when the user registers in the manufacturer server 100 for the first time.

The device history DB contains an operation history of the device 400 such as a household electric device of a user (for example, an operation history of a television channel) or a device history of a user by the device 400 (for example, a history of a user's weight obtained by a body composition analyzer). FIG. 17 shows an example of an ID list of a device history DB according to Embodiment 2. In the example shown in FIG. 17, the devices 400 are a body composition analyzer, a television set, and an activity meter. A device history of the body composition analyzer is stored in a database having an ID of IDA1. A device history of the television set is stored in a database having an ID of IDA2. A device history of the activity meter is stored in a database having an ID of IDA3.

FIG. 18 shows an example of data stored in a household electric device history DB according to Embodiment 2. In the example shown in FIG. 18, one household electric device history DB is prepared for each type of household electric devices (devices 400), and the household electric device history DB includes records each indicating a device history (household electric device history information) for a user ID. More specifically, a database having an ID of IDA1, that is, a DB for the body composition analyzer includes, as a household electric device history information for a user ID of ID11, a record of "2012.1.1: Weight, 55 kg; Body fat percentage, 18%" and "2012.1.3: Weight, 56 kg; Body fat percentage, 19%". This record indicates that the user had a weight of 55 kilogram and a body fat percentage of 18% on Jan. 1, 2012, and a weight of 56 kilogram and a body fat percentage of 19% on Jan. 3, 2012. The database also includes, as a household electric device history of a user ID for ID12, a record of "2011.12.30: Weight, 80 kg; Body fat percentage, 22%" and "2012.1.3: Weight, 82 kg; Body fat percentage, 22%". On the other hand, a database having an ID of IDA2, that is, a DB for a television set includes, as a household electric device history information of a user ID of ID11, a record of "2012.1.1: 18:00, drama; 20:00, news" and "2012.1.3: 10:00, animation; 13:00, drama". This is a record of programs viewed on the television set of the user. The above-described household electric device history information (device histories of the devices 400) is either periodically or non-periodically uploaded to manufacturer servers in which users have registered their household electric devices.

Upon receiving a request for control of a device from the history DB control unit 101A, the device control instruction unit 106 searches the device control information DB 107 for a record of device control information for a corresponding one of the household electric devices (devices 400), and transmits the record of the device control information to the history DB control unit 101A. The device control information is the same as described in Embodiment 1, and therefore description thereof is omitted.

The device control information DB 107 stores device control information of the devices 400.

The communication unit 108A communicates with the portal server 200, devices 400, and the user terminal 500. The communication unit 108A uses Secure Socket Layer (SSL) for the communication with the portal server 200 and the user terminal 500. The communication unit 108 stores a certificate necessary for the communication using SSL.

As described above, the manufacturer server 100 stores a device history and user information. The device history indicates operation histories of the devices 400 used by users. The user information includes attribute information which allows identification of each user. The manufacturer server 100 generates a temporary identifier corresponding to a record of the user information, and transmits the device history and the temporary identifier to the portal server 200.

2.3 Configuration of the Portal Server 200

Figure 19:
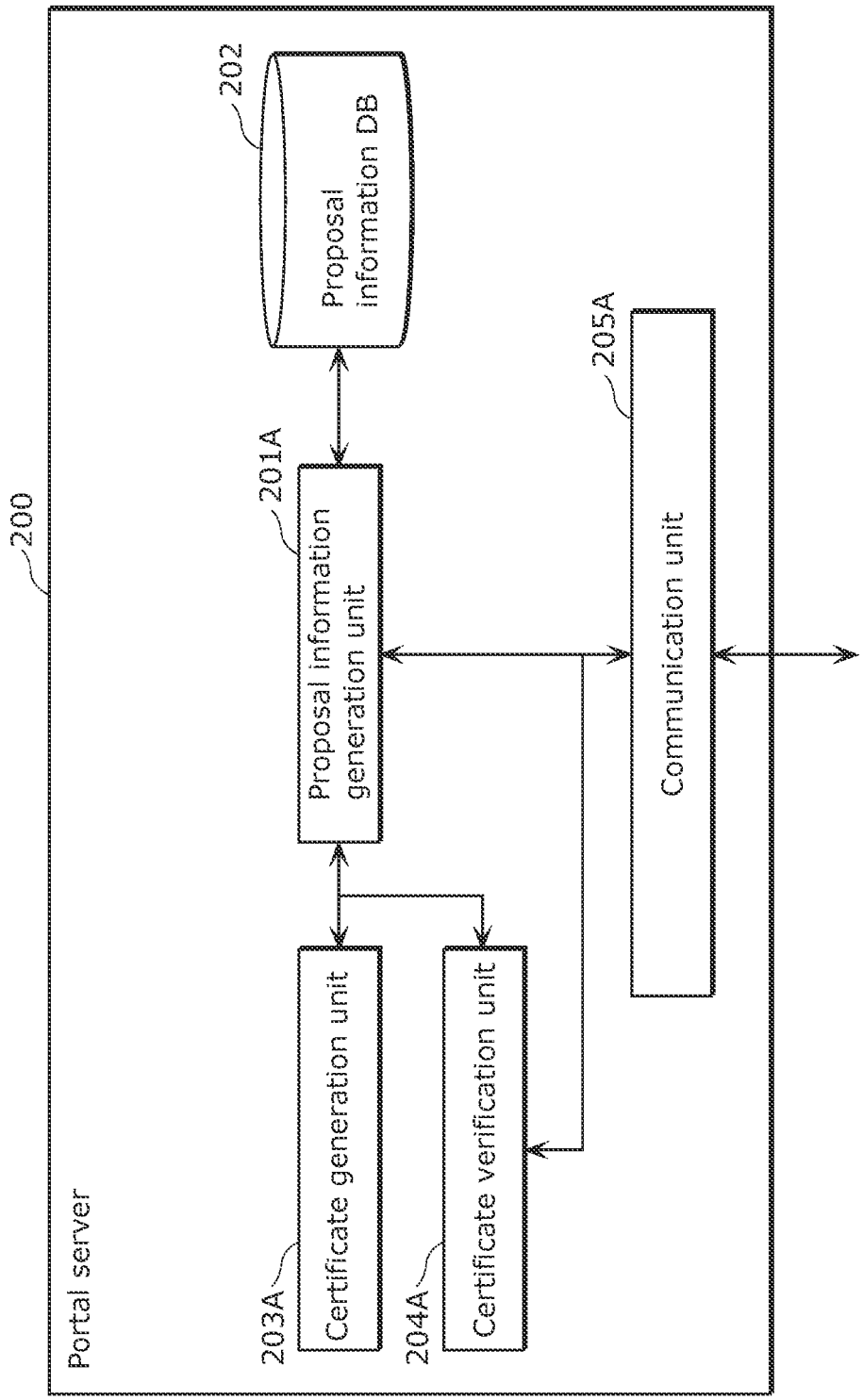
FIG. 19 is a block diagram showing an exemplary configuration of a portal server according to Embodiment 2.

FIG. 19 is a block diagram illustrating an exemplary configuration of the portal server 200 according to Embodiment 2. The portal server 200 includes a proposal information generation unit 201A, a proposal information DB 202, a certificate generation unit 203A, a certificate verification unit 204A, and a communication unit 205. The portal server 200 is different from the manufacturer server 100c in Embodiment 1 in that the portal server 200 does not include the anonymization rule generation unit 211.

More specifically, the proposal information generation unit 201A generates proposal information for a user based on a device history included in a device history certificate received from the manufacturer server 100, a service history included in a service history certificate received from the service provider server 300, and proposal information stored in the proposal information DB 202. A method of generating the proposal information is described in detail later. The proposal information generation unit 201A stores the generated proposal information in the proposal information DB. After generating the proposal information, the proposal information generation unit 201A requests the certificate generation unit 203A to generate a proposal information certificate from the device history certificate and the proposal information. Upon receiving a proposal information certificate from the certificate generation unit 203A, the proposal information generation unit 201A transmits the proposal information certificate to the manufacturer server 100.

The proposal information DB 202 stores the proposal information provided to a user.

FIG. 20 shows an exemplary structure of the proposal information DB 202. As shown in FIG. 20, proposal information stored in the proposal information DB 202 includes an item of category of proposal information and an item of service information DB. More specifically, FIG. 20 shows categories of weight control and recommended programs, and further shows that a service proposal information DB for the category of weight control is stored in a database of IDS1 and that a service proposal information DB for the category of recommended program is stored in a database of IDA2.

FIG. 21 shows an example of data stored in a service proposal information DB. In the example shown in FIG. 21, one service proposal information DB is prepared for each type of proposal information, and the service proposal information DB includes records each indicating proposal information for an ID of the service proposal information. For example, a record for an ID of IDS1 indicates proposal information such as a weight control program for males in their thirties and a record indicating a weight control program for women in their thirties. For example, the weight control program for women in their thirties includes menu items such as 30-minute treadmill exercise and 30-minute exercise bike exercise. A record for an ID of ID2 indicates proposal information such as a program recommendable for cartoon enthusiast and a record indicating a program recommendable for those who like sports.

Figure 22:
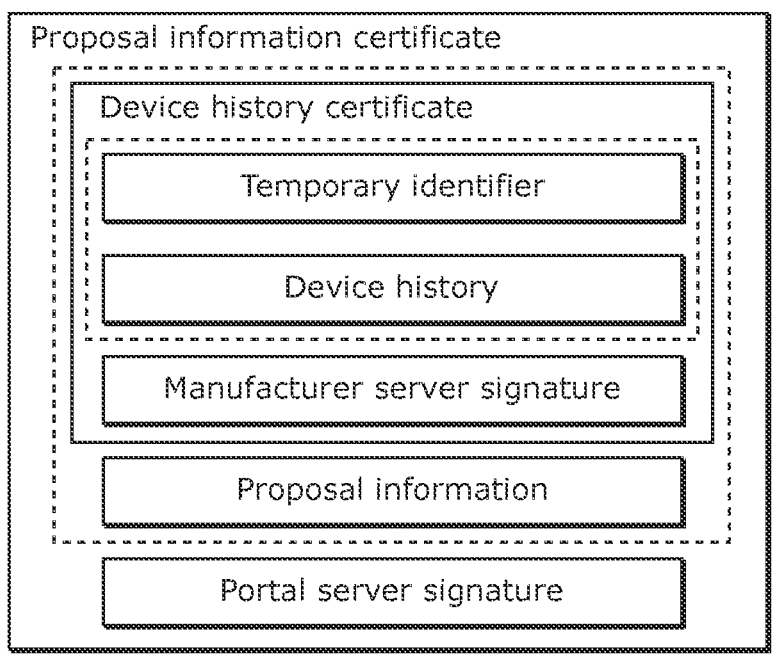
FIG. 22 shows an exemplary structure of a proposal information certificate according to Embodiment 2.

The certificate generation unit 203A generates a proposal information certificate upon receiving proposal information and a device history certificate from the certificate generation unit 201. FIG. 22 shows an exemplary structure of the proposal information certificate according to Embodiment 2. The proposal information certificate shown in FIG. 22 is a certificate associating a device history certificate and proposal information, and is marked with a portal server signature, which is a signature generated using a signature generation key (not shown) held in the certificate generation unit 203A. After generating a proposal information certificate, the certificate generation unit 203A transmits the proposal information certificate and a public key certificate (not shown) including a signature verification key corresponding to the signature generation key. As in Embodiment 1, the public key certificate is a certificate of a signature verification key and issued with a signature by a certification authority (not shown in the diagram of the overall configuration). Alternatively, the signature may be generated for a hash value of a value of a combination of a device history certificate and proposal information.

The certificate verification unit 204 receives a device history certificate and a public key certificate including and a signature verification key from the manufacturer server 100 via the communication unit 205, and then verifies the signatures. In the verification of a signature of a device history certificate, the certificate verification unit 204 verifies a manufacturer server signature against a temporary identifier and a device history included in the device history certificate. When the manufacturer server signature is valid, the certificate verification unit 204A transmits the temporary identifier and the device history to the proposal information generation unit 201.

The communication unit 205A communicates with the manufacturer server 100 and the service provider server 300. The communication unit 205A uses SSL for the communication with the manufacturer server 100 and the service provider server 300. The communication unit 205 stores a certificate necessary for the communication using SSL.

2.3.1 A Method of Generating Proposal Information

The proposal information generation unit 201A generates proposal information based on a temporary identifier and a device history received from the manufacturer server 100 and a temporary identifier and service information received from a service provider. The following describes a method of generating proposal information using, as an example, a case where proposal information indicating a weight control program is generated.

First, the proposal information generation unit 201A obtains a temporary identifier included in a device history certificate received from the manufacturer server 100, so that the proposal information generation unit 201A may obtain a use history included in the device history, that is, an age range or body composition information of a user of a body composition analyzer, which is one of the devices 400.

Next, the proposal information generation unit 201A obtains, from the service provider server 300, a service history indicating a history of services used by a user. For example, the service provider server 300 is owned by a fitness center. Then, the proposal information generation unit 201A obtains, from the service provider server 300, a temporary identifier and a service program provided by the fitness center as a service history. The proposal information generation unit 201A also determines proposal information for a user corresponding to the temporary identifier received from the service provider server 300 with reference to a service history of a user in the same age range as the user who is to be provided with the proposal information.

For example, the proposal information generation unit 201 recognizes that the user corresponding to a temporary identifier received from the manufacturer server 100 is a female user in her thirties. In this case, the proposal information generation unit 201 refers to a service history associated with a female user in her thirties among users corresponding to temporary identifiers received from the service provider server 300 in order to search out services provided to a female user in her thirties. The proposal information generation unit 201 determines a weight control program thus searched out as proposal information for the user corresponding to the temporary identifier received from the manufacturer server 100. If the user has a pedal electric cycle, the proposal information generation unit 201 determines a time for which the pedal electric cycle will put an increased load on pedaling as with load of an exercise bike working according to a weight control program, and includes the time in the proposal information to provide to the user. Thus, the proposal information indicates an exercise using a pedal electric cycle with an increased load for 60 minutes, for example. In this manner, the proposal information generation unit 201 generates proposal information indicating a weight control program for a female user in her thirties. The portal server 200 then provides the proposal information to the manufacturer server 100 so that the manufacturer server 100 may provide the user with information for control of the pedal electric cycle of the user.

As described above, the portal server 200 receives a device history and a temporary identifier from the manufacturer server 100 via a network. The portal server 200 also receives a service history and a temporary identifier from the service provider server 300 via a network. Then, the portal server 200 generates proposal information indicating a proposal service for a user based on the user information associated with the temporary identifiers, the device history, and the service history, and provides the user with the generated proposal information via the manufacturer server 100.

2.4 Configuration of the Service Provider Server 300

Figure 23:
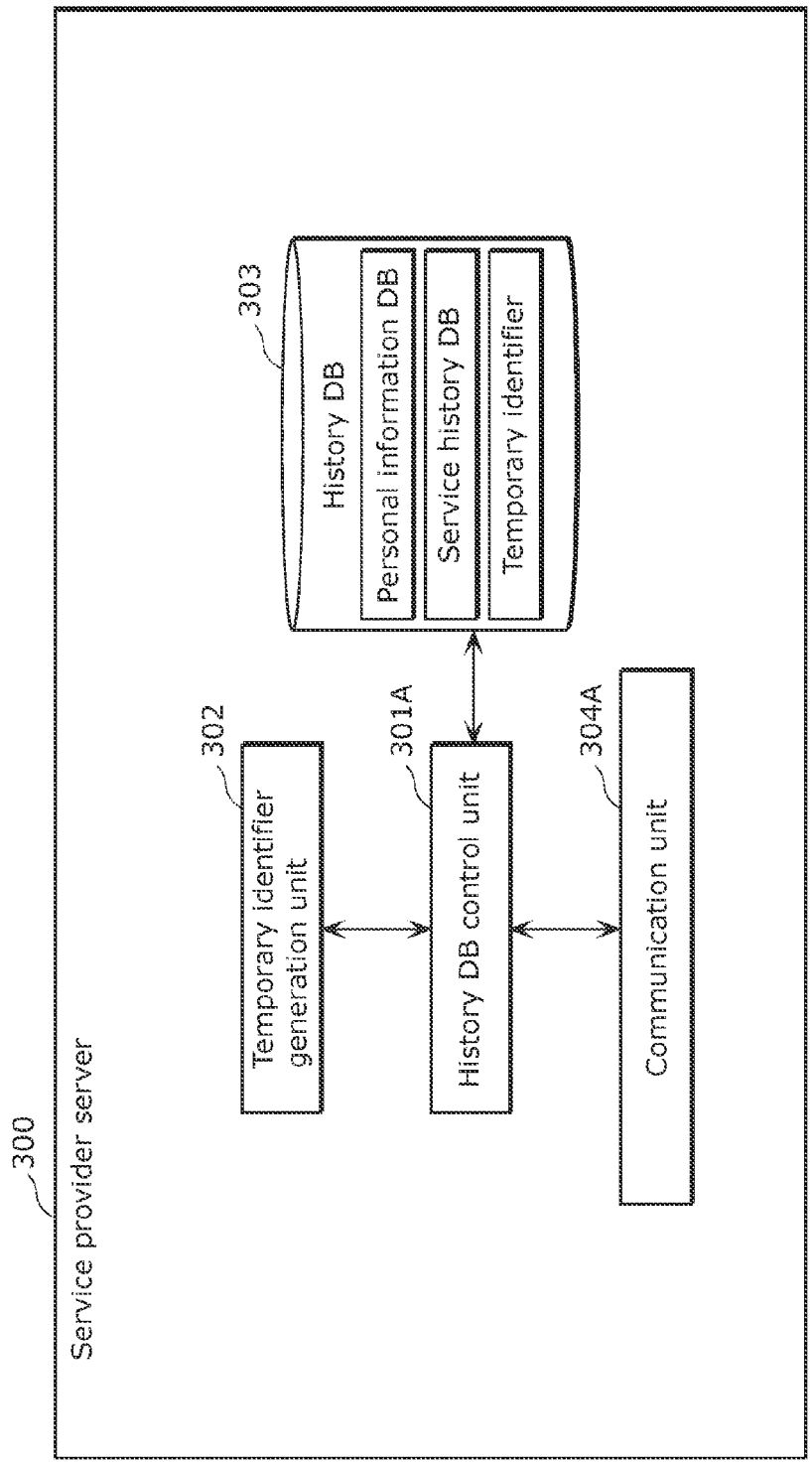
FIG. 23 is a block diagram illustrating an exemplary configuration of a service provider server according to Embodiment 2.

FIG. 23 is a block diagram illustrating an exemplary configuration of the service provider server 300 according to Embodiment 2. The service provider server 300 includes a history DB control unit 301A, a temporary identifier generation unit 302, a history DB 303, and a communication unit 304A. The service provider server 300 is different from the service provider server 300c in Embodiment 1 in that the manufacturer server 300 does not include the anonymizer unit 321.

The history DB control unit 301A controls the history DB 303 to manage personal information of a user (user information), a service history, and a temporary identifier. The service history indicates history of services used by a user. The temporary identifier corresponds to a record of personal information of the user (user information) and a record of the service history.

Figures 24, 25:
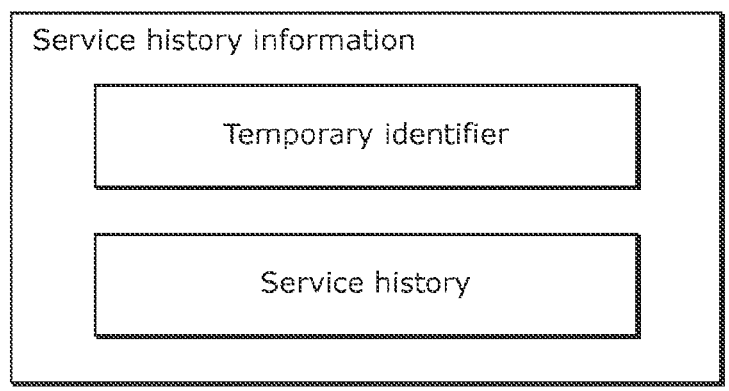
FIG. 24 shows an exemplary structure of a service history DB according to Embodiment 2.
FIG. 25 shows an exemplary structure of a personal information DB.

For example, when providing service history information to the portal server 200, the history DB control unit 301A requests the temporary identifier generation unit 302 to generate a temporary identifier corresponding to a user ID. Furthermore, upon receiving a user ID and a temporary identifier from the temporary identifier generation unit 302, the history DB control unit 301A associates the user ID and the temporary identifier in the history DB 303 and manages the temporary identifier and a service history associated with each other. The history DB control unit 301A transmits the temporary identifier and the service history as service history information to the portal server 200. FIG. 24 shows an exemplary structure of the service history information according to Embodiment 2.

The temporary identifier generation unit 302 generates a temporary identifier corresponding to a user ID. For example, the temporary identifier generation unit 302 generates a temporary identifier from to a user ID upon receiving a request from the history DB control unit 301. The temporary identifier is generated using the same method as described in Embodiment 1, and therefore description thereof is omitted.

The history DB 303 contains a personal information DB, a service history DB, and a temporary identifier.

The personal information DB stores user information including, as items of attribute information, information which is data of basic profiles of users, such as names and addresses. FIG. 25 shows an exemplary structure of a personal information DB according to the present disclosure. In the example shown in FIG. 25, the user information includes items (items of attribute information) of name, address, birth date, gender, and hobby of each user. Such items may be determined for each system. In the example shown in FIG. 25, the attribute information in the record of user information with an user ID of ID21 is registered as follows: Name, Miki Yamada; Address, 3-10 Fukushima-ku, Osaka; Birth date, Oct. 5, 1980; Gender, Female; and Hobby, aerobics. The attribute information in the record of user information with an user ID of ID22 is registered as follows: Name, Goro Kato; Address, 1-19 Chuo-ku, Chiba-shi; Birth date, Jun. 1, 1975; Gender, male; and Hobby, marathon. The attribute information included in the user information (common items of attribute information among records) is entered by each user when the user registers in the service provider server 300 for the first time.

Figures 26, 27:
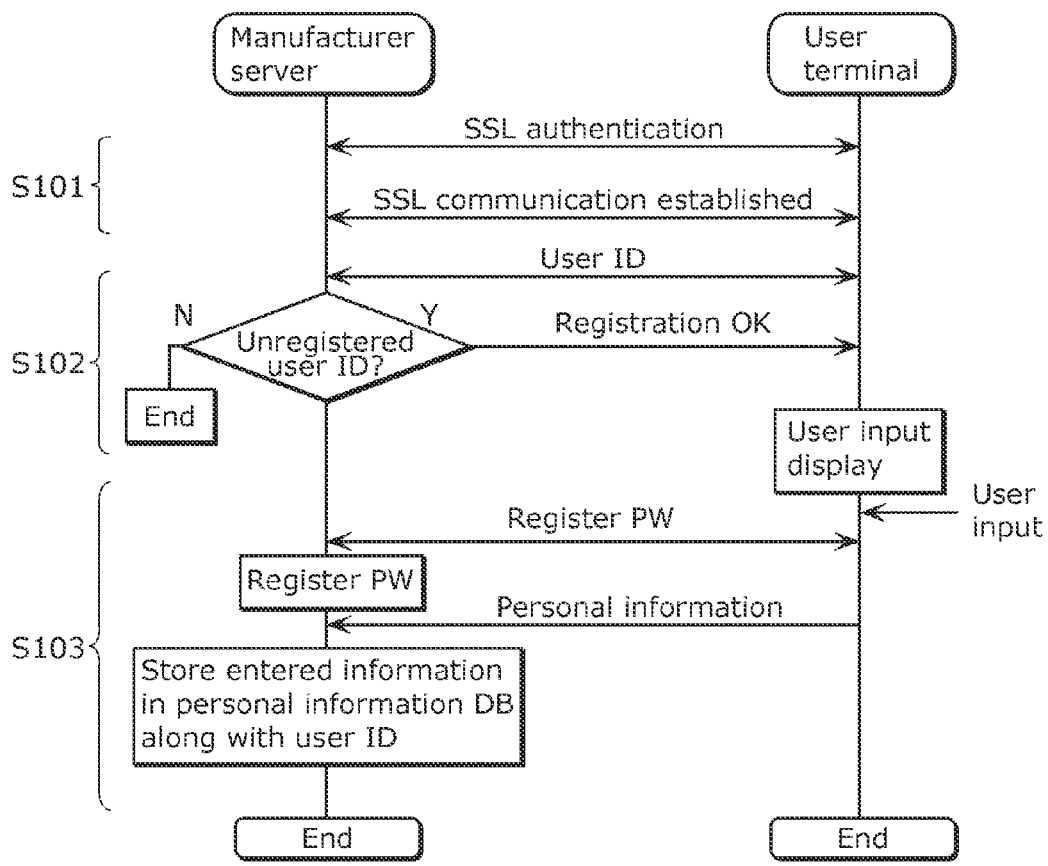
FIG. 26 shows an example of data stored in a service information DB.
FIG. 27 is a sequence diagram of processing for registration of a user in a manufacturer server via a user terminal.

FIG. 26 shows an example of data stored in a service information DB. In the example shown in FIG. 26, one service history DB includes records each indicating history information of proposed services for an ID. For example, a record of history information of proposed services for ID21 is as follows: "2011.12.28, 2 sets of aerobic exercise with no running, 30-minute running, advice; 2012.1.3, 1 set of advanced aerobic exercise, 30-minute exercise bike." This indicates that the user indicated by a user ID of ID21 had two sets of aerobic exercise with no running and 30-minute running, and was provided with advice on Dec. 28, 2011.

Similarly, a record of history information of proposed services for ID22 indicates that the user had one set of advanced aerobic exercise and 30-minute exercise bike exercise on Jan. 3, 2012.

The communication unit 304A communicates with the portal server 200. The communication unit 304A uses Secure Socket Layer (SSL) for the communication with the portal server 200c. The communication unit 304 stores a certificate necessary for the communication using SSL.

As described above, the service provider server 300 stores a service history and user information. The service history indicates a history of services provided to the user. The user information allows identification of a user. The service provider server 300 generates a temporary identifier corresponding to a record of the user information, and transmits the service history and the temporary identifier to the portal server 200.

2.5 Operation of the Information Management System 10

Operation of the information management system 10 includes the following processing.

(1) Processing for registration of a user in the manufacturer server 100c by a user via the user terminal 500

(2) Processing for registration of a household electric device in the manufacturer server 100 by the user (3) Processing for uploading household electric device history information from the device 400 of the user to a device history DB (4) Processing for providing the user with proposal information from the portal server 200

The operation also includes processing for registration of a user in the service provider server 300 by the user via the user terminal, and the processing is the same as the processing (1). Description thereof is therefore omitted in this section. The processing for registration of a service history of a user in the service provider server 300 depends on each service provider. More specifically, a user may register a service history, or a service provider may register a service history of services which the service provider has provided to a user.

The following describes each processing using drawings.

2.5.1 Operation of Processing for User Registration

FIG. 27 is a sequence diagram illustrating processing for registration of a user in the manufacturer server 100 by a user via the user terminal 500.

In S101, an encrypted communication channel is established between the manufacturer server 100 and the user terminal 500 using SSL authentication. The SSL authentication and the SSL communication channel are not detailed herein.

Next, in S102, the user terminal 500 transmits a user ID to the manufacturer server 100. When the user ID is already registered in the manufacturer server 100, the manufacturer server 100 notifies the user terminal 500 of the registration and ends the processing for registration. When the user ID is not registered, the manufacturer server 100 notifies the user terminal 500 that the user ID can be newly registered.

Next, in S103, the user enters a password (hereinafter referred to as PW) and personal information on a predetermined form via the user terminal 500. As described above, the information is registered in a personal information DB contained in the history DB 105 stored in the manufacturer server 100. The PW is used by a user to access the manufacturer server 100 after the registration. The manufacturer server 100 records the entered PW in, for example, the communication unit 108 in FIG. 14 which communicates with the user terminal 500, and compares the registered user ID and recorded PW and a user ID and a PW entered by a user requesting an access after the registration. When the user IDs and PWs match, the manufacturer server 100 permits the access.

2.5.2 Operation of Processing for Registration of the Devices 400

Figure 28:
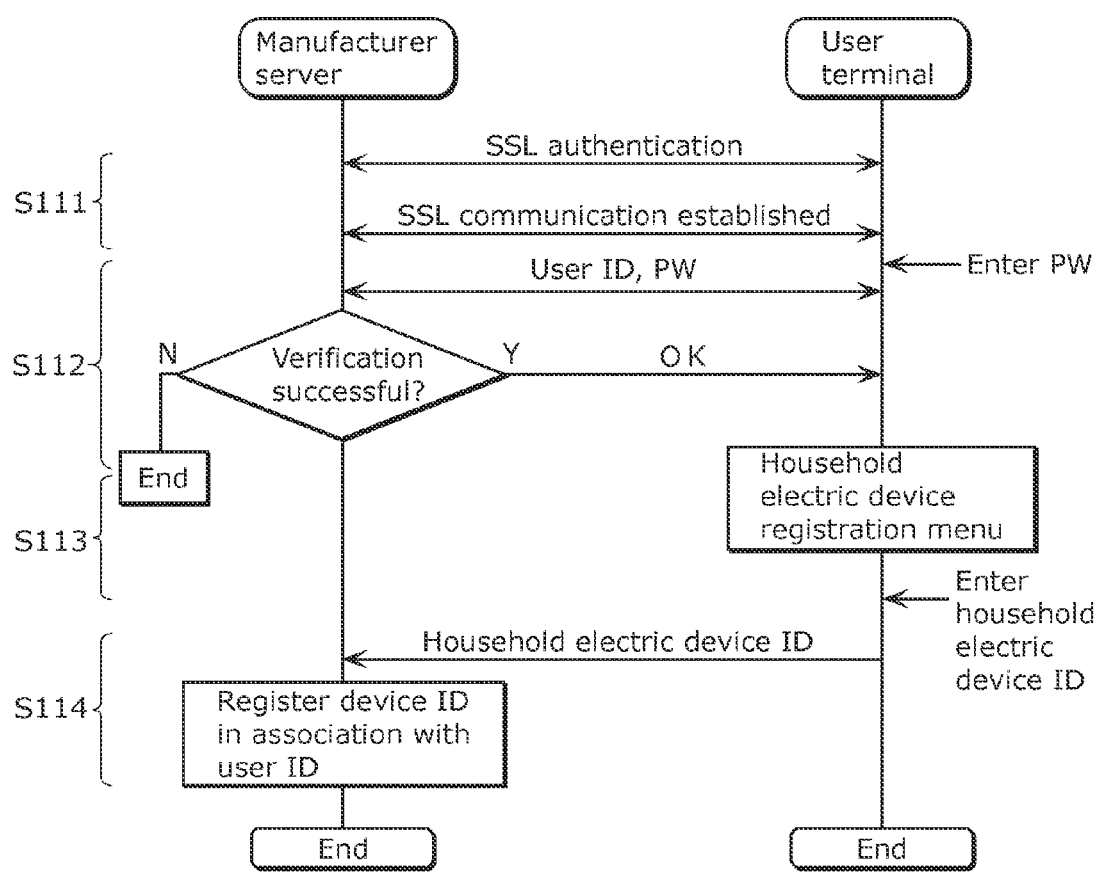
FIG. 28 is a sequence diagram of processing for registration of a household electric device via a user terminal.

FIG. 28 is a sequence diagram of processing for registration of a household electric device 400 by a user via the user terminal 500. The following describes the processing using, as an example, a case where a user starts an application for registration provided by a manufacturer (not shown) on the user terminal 500. Users may access the manufacturer server 100 using the user terminal 500 in order to register a household electric device 400.

In S111, an encrypted communication channel is established between the manufacturer server 100 and the user terminal 500 using SSL authentication.

Next, in S112, a user enters a PW set in the initial registration. The manufacturer server 100 compares the entered PW with the stored PW associated with the user ID. When they match, the user authentication is successful. When the authentication fails, the manufacturer server 100 notifies the user of the failure of the authentication.

Next, in S113, the user enters a device ID to register from a household electric device registration menu of the application, and transmits the device ID from the user terminal 500. The device ID is an ID for identification of the device 400. The device ID may be printed on a chassis of the device 400 or a document packed together with the device 400. In this case, the user enters the printed device ID. Alternatively, the user terminal 500 may obtain a device ID from the device 400. In this case, for example, the user terminal 500 and the device 400 communicate with each other so that the user terminal 500 may obtain a device ID and transfer the device ID to the manufacturer server 100.

Next, in S114, the manufacturer server 100 registers the device ID in association with the user ID.

2.5.3 Operation of Processing for Uploading Household Electric Device History Information from the Device 400

Figure 29:
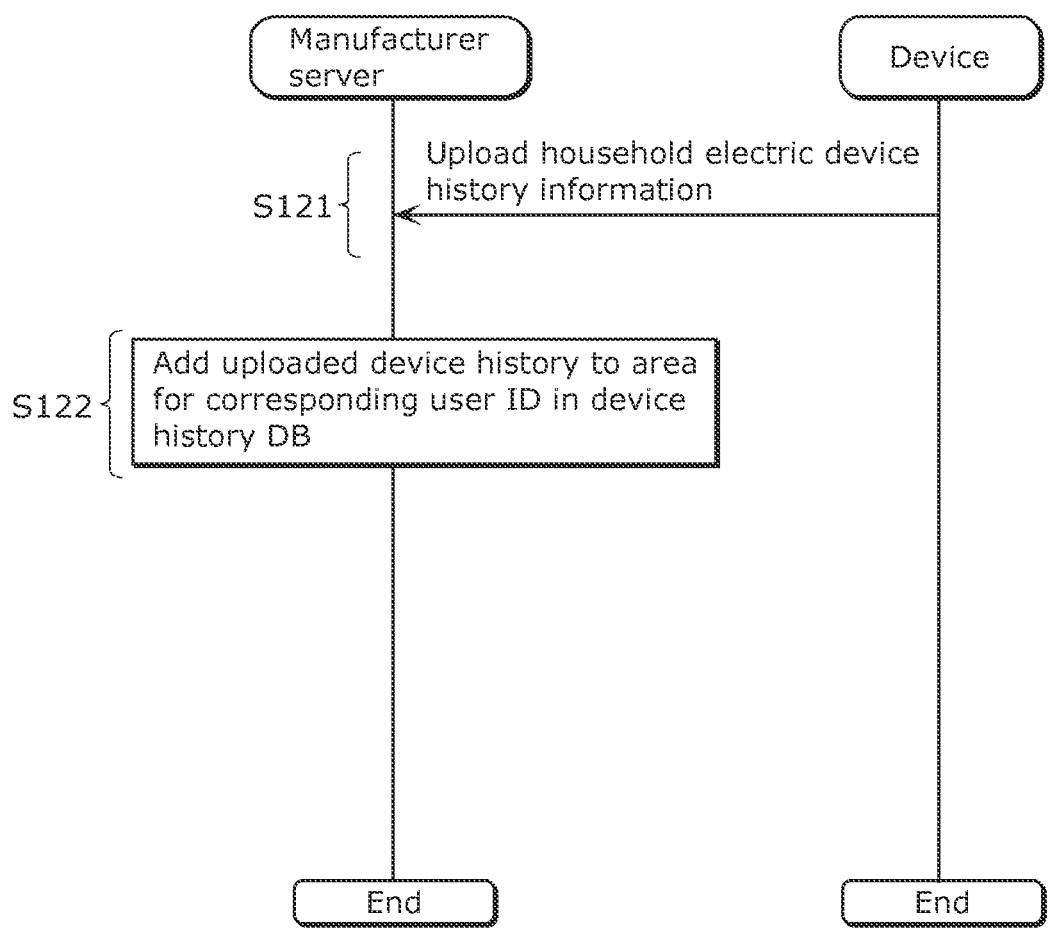
FIG. 29 is a sequence diagram of processing for uploading device history information by a device.

FIG. 29 is a sequence diagram illustrating processing for uploading device history information by the device 400. The uploading is performed either periodically or non-periodically.

First, in S121, the device 400 uploads an accumulated device history and a device ID to the manufacturer server 100.

Next, in S122, the manufacturer server 100 receives the device ID and the device history, searches for a device history DB corresponding to the device ID using the device ID, and adds the device history to the area for the corresponding user ID in the device history DB.

2.5.4 Processing for Providing a User with Proposal Information from the Portal Server 200

Figure 30:
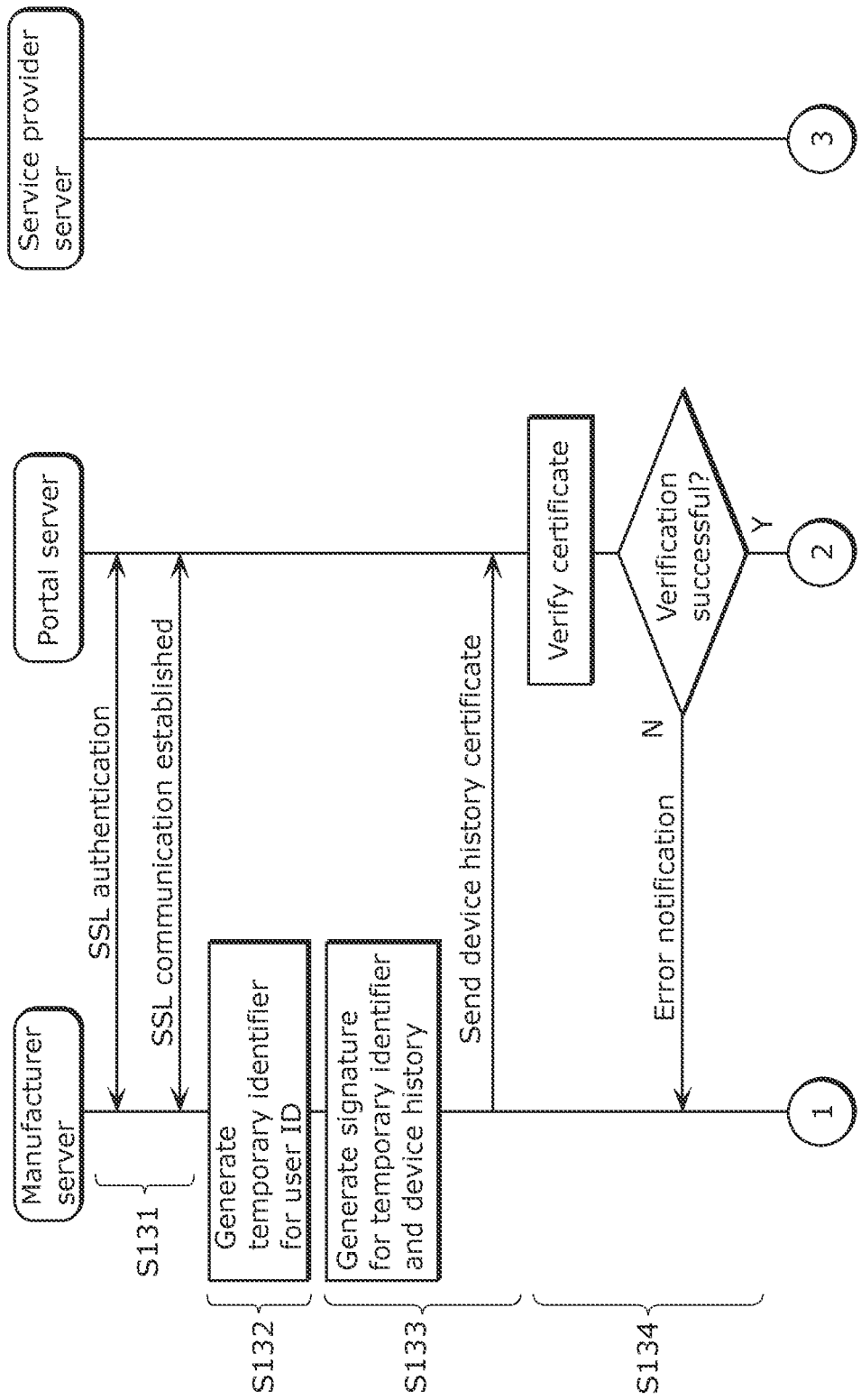
FIG. 30 is a sequence diagram illustrating processing for providing a user with proposal information by the portal server according to Embodiment 2.
Figure 31:
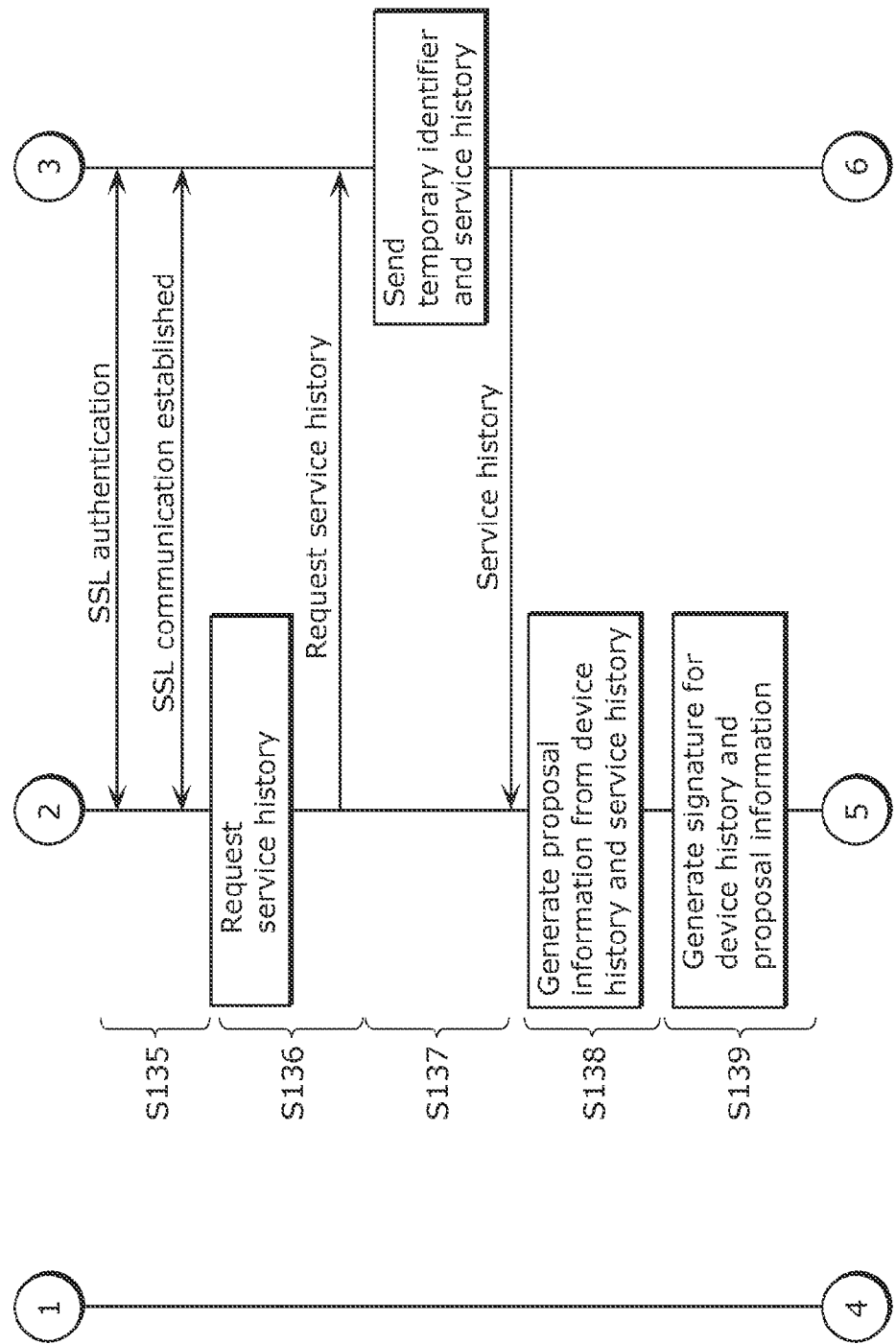
FIG. 31 is a sequence diagram illustrating processing for providing a user with proposal information by the portal server according to Embodiment 2.
Figure 32:
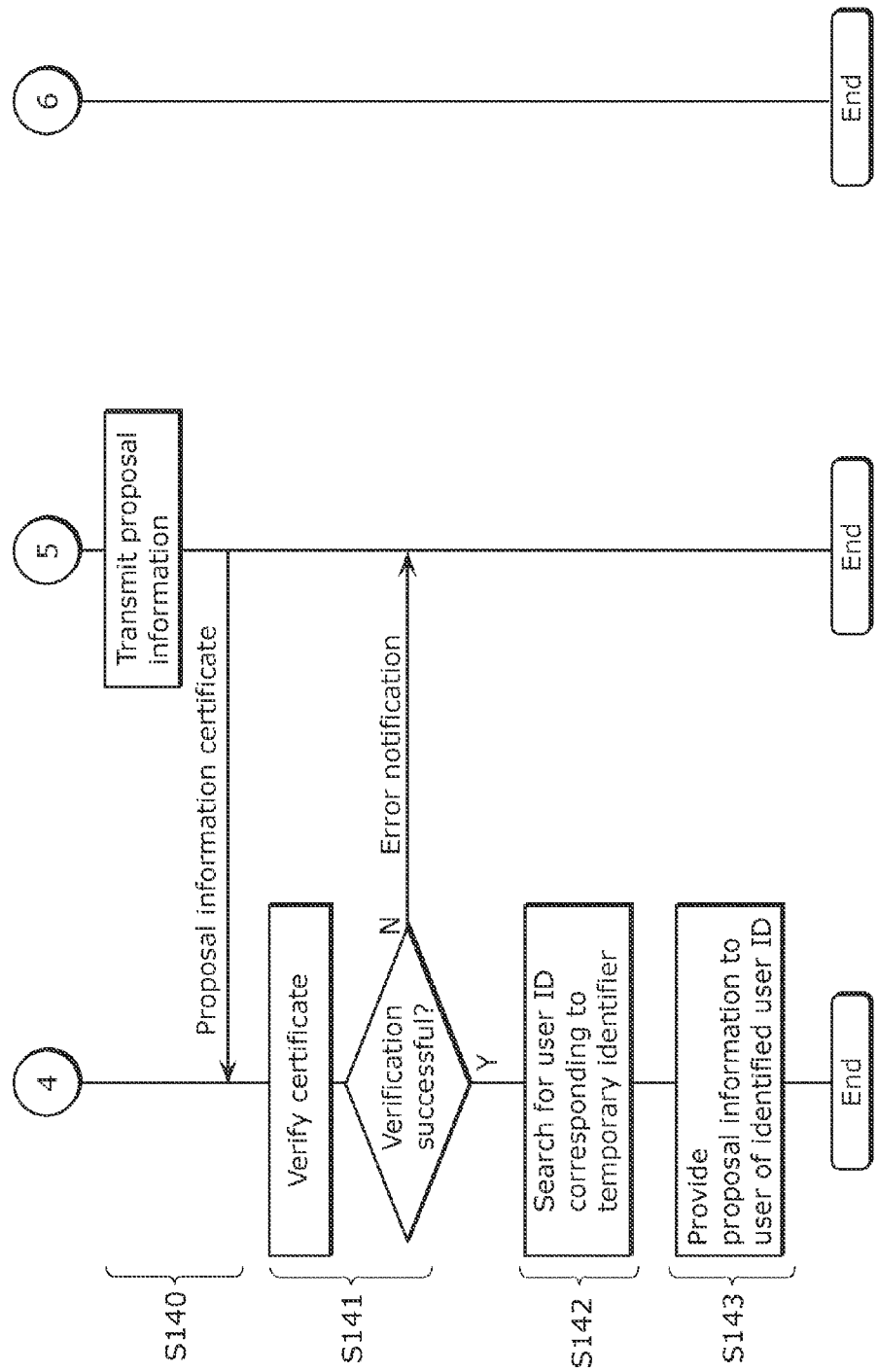
FIG. 32 is a sequence diagram illustrating processing for providing a user with proposal information by the portal server according to Embodiment 2.

FIG. 30 to FIG. 32 are sequence diagrams illustrating processing for providing a user with proposal information from the portal server 200 according to Embodiment 2. The providing of proposal information is performed either periodically or non-periodically.

First, in S131, an encrypted communication channel is established between the manufacturer server 100 and the portal server 200 using SSL authentication.

Next, in S132, the manufacturer server 100 selects a user to whom a service is to be provided, and generates a temporary identifier from the user ID of the user.

Next, in S133, the manufacturer server 100 generates a signature for the temporary identifier and the device history, and thereby generates a device history certificate. Then, the manufacturer server 100 transmits the device history certificate and a public key certificate to the portal server 200.

Next, in S134, the portal server 200 receives the device history certificate and the public key certificate from the manufacturer server 100 and verifies these certificates. When the verification of the certificates fails, the portal server 200 notifies the manufacturer server 100 of an error.

Next, when the verification of the device history certificate is successful, in S135, the portal server 200 establishes an encrypted communication channel to the service provider server 300 using SSL authentication.

Next, in S136, the portal server 200 transmits a request to the service provider server 300 in order to request the service provider server 300 for service information relevant to the service history.

Next, in S137, upon receiving, from the portal server 200, the request for service information, the service provider server 300 generates a temporary identifier from the user ID of a user, and transmits the temporary identifier and a service history to the portal server 200.

Next, in S138, upon receiving the service history from the service provider server 300, the portal server 200 generates proposal information based on the device history and the service history.

Next, in S139, the portal server 200 generates a signature for the generated proposal information and the device history certificate, and thereby generates a proposal information certificate.

Next, in S140, the portal server 200 transmits the proposal information certificate to the manufacturer server 100.

Next, in S141, the manufacturer server 100 verifies the proposal information certificate. When the verification of the proposal information certificate fails, the manufacturer server 100 notifies the portal server 200 of an error.

Next, in S142, when the verification of the proposal information certificate by the manufacturer server 100 is successful, the manufacturer server 100 searches the history DB for a device history certificate with reference to the device history certificate included in the proposal information certificate. Then, the manufacturer server 100 searches for a user ID corresponding to the temporary identifier included in the device history certificate searched out, and identifies the user ID as the user ID of a user to whom the proposal information is to be provided.

Next, in S143, the manufacturer server 100 provides the proposal information to the user indicated by the identified user ID. When the proposal information includes control information of any of the devices 400, the manufacturer server 100 notifies the user terminal 500 of the presence of the control information in the proposal information, and further transmits the control information when the user terminal 500 sends back OK in return to the notification. When the proposal information does not include control information of any of the devices 400, the manufacturer server 100 transmits the proposal information to the user terminal 500 without the transmitting of the notification.

2.6 Advantageous Effects

In Embodiment 2, use of a temporary identifier allows the manufacturer server 100, the portal server 200, and the service provider server 300 to interface with each other, so that the portal server 200 may provide a user with proposal service information.

More specifically, the portal server 200 which interfaces with the manufacturer server 100 is provided not with personal information but with a device history using a temporary identifier, so that the portal server 200 may generate proposal information with security for privacy of users. The manufacturer server 100 generates a proposal information certificate for a device history certificate provided by the manufacturer server 100, and thereby enables the manufacturer server 100 to detect tampering of the device history certificate and wrong replacement of proposal information with proposal information which is based on device history information of another user. Furthermore, this allows users who have registered personal information only in the manufacturer server 100 to receive proposal information from the portal server 200 which interfaces with the service provider server 300.

Thus, also in Embodiment 2, a user is required to register personal information of the user only when the user registers in the manufacturer server 100, and is not required to register personal information for each service which the user uses. The manufacturer server 100 provides the portal server 200 with a temporary identifier along with a device history. The association between the temporary identifier and a specific user is available only to the manufacturer server 100 (that is, only the manufacturer server 100 can identify a user from a temporary identifier). Privacy of users is thus protected. Furthermore, the manufacturer server 100 manages user information and a temporary identifier by associating them with each other, and provides the temporary identifier with a signature to the portal server. The manufacturer server 100 thus enables verification on whether or not proposal information is provided to an intended user.

Embodiment 3

3. System Configuration

The following describes an information management system 12 according to Embodiment 3 with reference to drawings.

Embodiment 3 is described using a case where when a user uses both a manufacturer server and a service provider server, a device history and a service history of the user are associated with each other with permission of the user, and a portal server provides the user with proposal information.

3.1 Overall Configuration of the Information Management System 12

Figure 33:
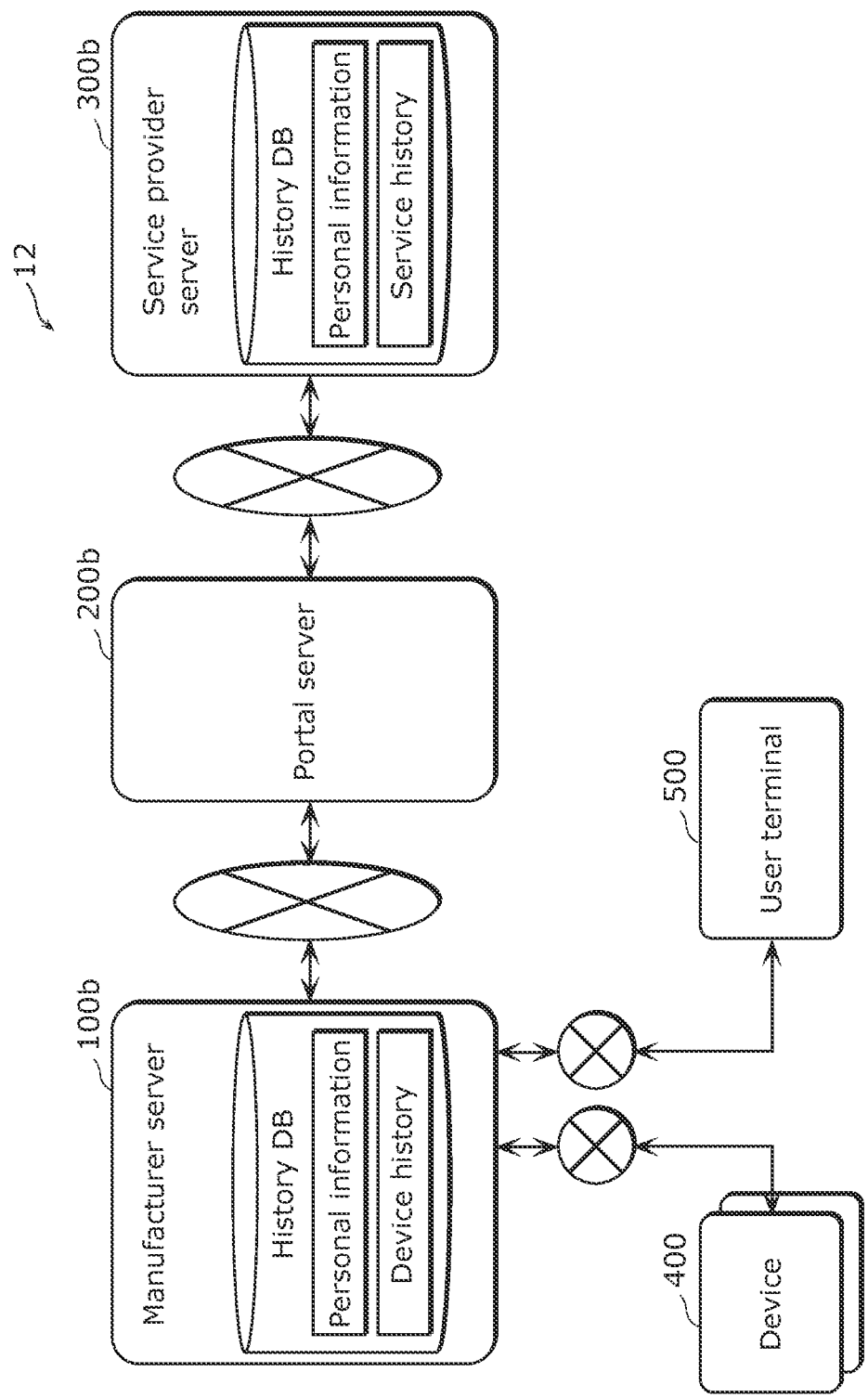
FIG. 33 shows an exemplary overall configuration of an information management system according to Embodiment 3.

FIG. 33 shows an exemplary overall configuration of an information management system according to Embodiment 3. The information management system 12 includes a manufacturer server 100*b*, a portal server 200*b*, a service provider server 300*b*, devices 400, and a user terminal 500. Constituent elements having the same functionality as in Embodiment 1 or Embodiment 2 are denoted with the same reference signs, and description thereof is omitted.

3.2 Configuration of the Manufacturer Server 100*b*

Figure 34:
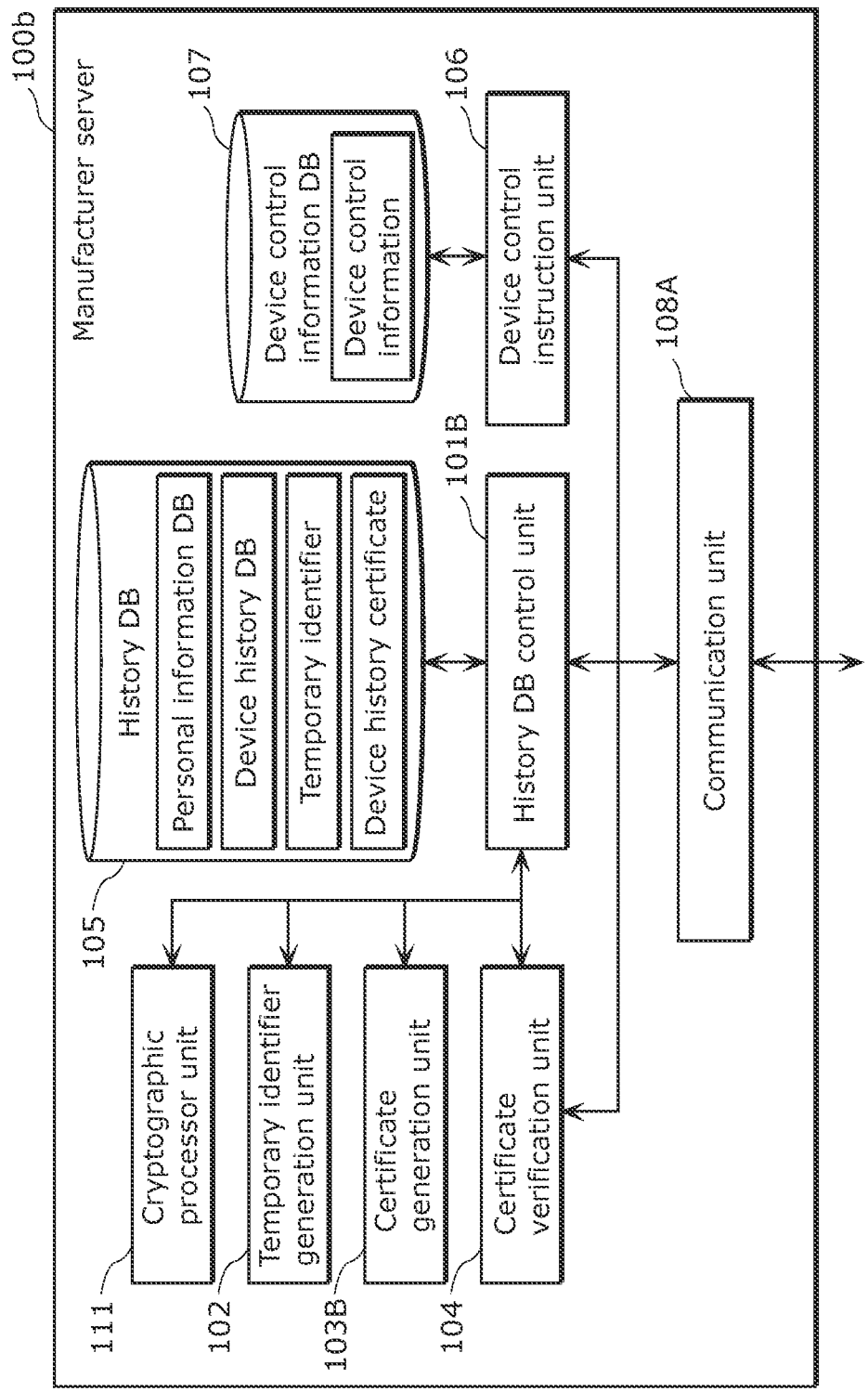
FIG. 34 is a block diagram showing an exemplary configuration of a manufacturer server according to Embodiment 3.

FIG. 34 is a block diagram illustrating an exemplary configuration of the manufacturer server 100*b* according to Embodiment 3. The manufacturer server 100 shown in FIG. 34 includes a history DB control unit 101B, a temporary identifier generation unit 102, a certificate generation unit 103B, a certificate verification unit 104, a history DB 105, a device control instruction unit 106, a device control information DB 107, a communication unit 108A, and a cryptographic processor unit 111. The manufacturer server 100*b* includes the cryptographic processor unit 111 in addition to the constituent elements of the manufacturer server 100 in Embodiment 2.

The history DB control unit 101B has the same functions as the history DB control unit 101A in Embodiment 1, and further has a function to ask a user of the user terminal 500 for permission to provide the service provider server 300*b* with a device history together with personal information.

Upon receiving, from the user terminal 500, a reply as to whether or not the user permits the providing of the service provider server with a device history together with personal information, the history DB control unit 101B updates a personal information DB in the history DB 105. The personal information corresponds to the user information in Embodiment 1 and Embodiment 2.

FIG. 35 shows an exemplary structure of a personal information DB according to Embodiment 3. As shown in FIG. 35, the personal information DB stores personal information of users and service provider IDs of service providers to which provision of device histories along with the personal information is permitted. For example, the history DB control unit 101B provides a device history when the history DB control unit 101B obtains proposal information from the portal server 200b. More specifically, when a user to whom proposal information is to be provided permits the history DB control unit 101B to provide a device history to a service provider together with personal information of the user, the history DB control unit 101B requests the cryptographic processor unit 111 to encrypt personal information corresponding to the user ID of the user and notifies the cryptographic processor unit 111 of the service provider ID of the service provider. Upon receiving encrypted personal information from the cryptographic processor unit 111, the history DB control unit 101B requests the certificate generation unit 103 to generate a signature which associates a temporary identifier, the service provider ID, the encrypted personal information, and the device history. Upon receiving a device history certificate from the certificate generation unit 103, the history DB control unit 101B transmits the device history certificate to the portal server 200b.

The certificate generation unit 103B generates a device history certificate upon receiving a temporary identifier, a service provider ID, an encrypted personal information, and a device history from the history DB control unit 101B.

Figure 36:
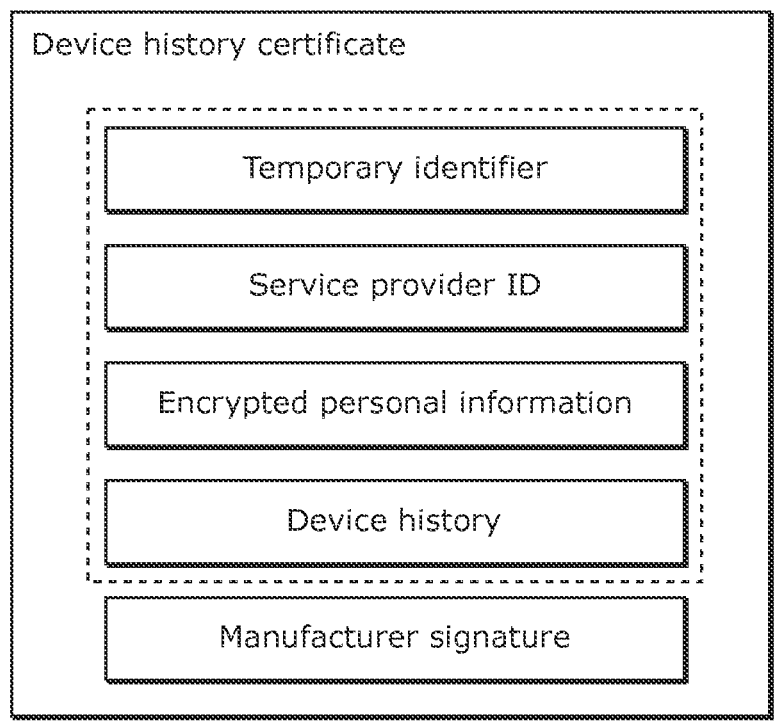
FIG. 36 shows an exemplary structure of a device history certificate according to Embodiment 3.

FIG. 36 shows an exemplary structure of the device history certificate according to Embodiment 3. As shown in FIG. 36, the device history certificate is a certificate associating a temporary identifier, a service provider ID, an encrypted personal information, and a device history, and is marked with a signature (manufacturer signature) generated for the temporary identifier, the service provider ID, the encrypted personal information, and the device history using a signature generation key (not shown) held in the certificate generation unit 103B. After generating a device history certificate, the certificate generation unit 103B transmits the device history certificate and a public key certificate (not shown) including a signature verification key corresponding to the signature generation key. The public key certificate is a certificate of a signature verification key and issued with a signature by a certification authority (not shown in the diagram of the overall configuration).

The cryptographic processor unit 111 holds public keys each corresponding to a different service provider. Upon receiving a request for encryption processing and a service provider ID from the history DB control unit 101B, the cryptographic processor unit 111 encrypts personal information using a public key corresponding to the service provider ID, and transmits the encrypted personal information to the history DB control unit 101B.

3.3 Configuration of the Portal Server 200b

The portal server 200b has the same configuration as the portal server 200 in Embodiment 2. Specifically, the portal server 200b includes a proposal information generation unit 201B, a proposal information DB 202, a certificate generation unit 203B, a certificate verification unit 204A, and a communication unit 205.

The following describes constituent elements different from those in Embodiment 2 in functionality.

The proposal information generation unit 201B generates proposal information for a user based on a device history included in a device history certificate received from the manufacturer server 100b, a service history included in a service history certificate received from the service provider server 300b, and proposal information stored in the proposal information DB 202. More specifically, upon receiving a device history certificate from the manufacturer server 100b, the proposal information generation unit 201B transmits a request to a service provider corresponding to a service provider ID in order to request the service provider for a service history certificate. Upon receiving a service history certificate from the service provider server 300b, the proposal information generation unit 201B generates proposal information using a device history included in the device history and a service history included in the service history certificate. In Embodiment 3, the user corresponding to the device history certificate and the user corresponding to the service history certificate are the same user.

The following describes a method of generating proposal information using, as an example, a case where proposal information indicating a weight control program is generated.

First, the proposal information generation unit 201B obtains a temporary identifier included in a device history certificate received from the manufacturer server 100b, so that the proposal information generation unit 201B may obtain a use history included in the device history, that is, an age range or body composition information of a user of a body composition analyzer, which is one of the devices 400.

Next, the proposal information generation unit 201B obtains, from the service provider server 300b, a service history indicating a history of services used by the user. For example, the service provider server 300b is owned by a fitness center. Then, the proposal information generation unit 201B obtains, from the service provider server 300b, a temporary identifier and a service program provided by the fitness center as a service history. The proposal information generation unit 201B also generates proposal information for the user corresponding to the temporary identifier received from the service provider server 300b with reference to a service history of another user who is in the same age range as the user to be provided with the proposal information and has succeeded in weight control. Examples of the proposal information for the user include an exercise program at the fitness center or at home and recipes for weight control.

Figure 37:
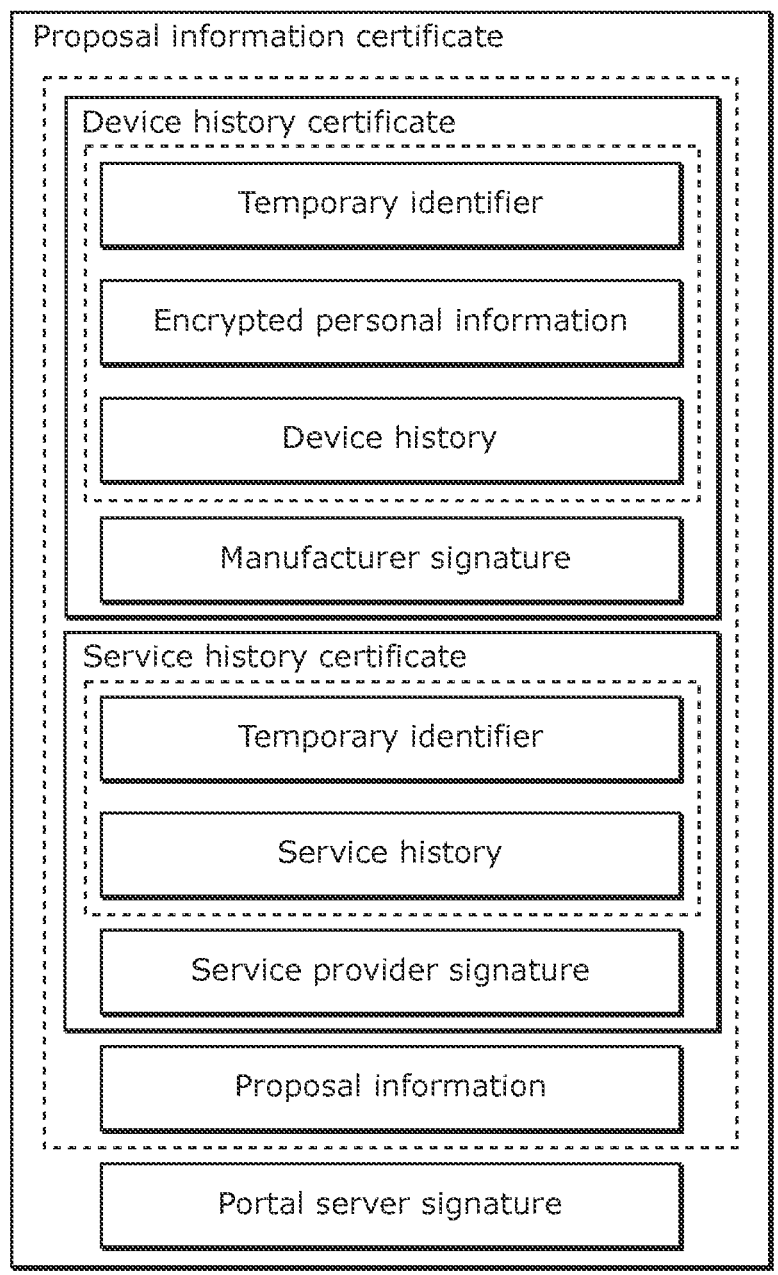
FIG. 37 shows an exemplary structure of a proposal information certificate according to Embodiment 3.

The certificate generation unit 203B generates a proposal information certificate including a service history certificate in addition to proposal information and a device history certificate. FIG. 37 shows an exemplary structure of the proposal information certificate according to Embodiment 3. The proposal information certificate shown in FIG. 37 is a certificate associating a device history certificate, a service history certificate, and proposal information, and is marked with a portal server signature, which is a signature generated using a signature generation key (not shown) held in the certificate generation unit 203B. After generating a proposal information certificate, the certificate generation unit 203B transmits the proposal information certificate and a public key certificate (not shown) including a signature verification key corresponding to the signature generation key. As in Embodiment 1 and Embodiment 2, the public key certificate is a certificate of a signature verification key and issued with a signature by a certification authority (not shown in the diagram of the overall configuration). Alternatively, the signature may be generated for a hash value of a value of a combination of a device history certificate and proposal information.

3.4 Configuration of the Service Provider Server 300b

Figure 38:
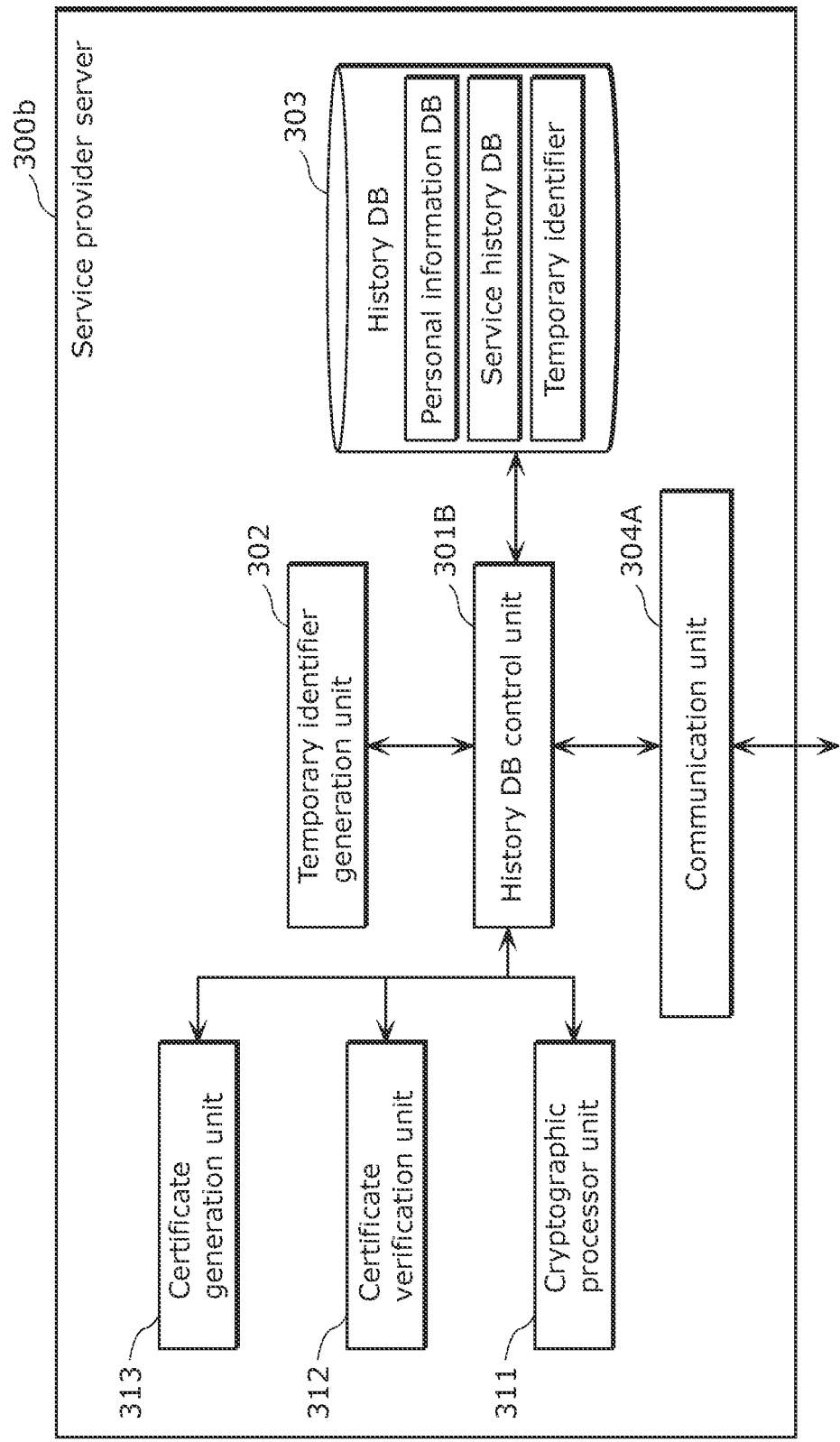
FIG. 38 is a block diagram illustrating an exemplary configuration of a service provider server according to Embodiment 3.

FIG. 38 is a block diagram illustrating an exemplary configuration of the service provider server 300b according to Embodiment 3. The service provider server 300b includes a history DB control unit 301B, a temporary identifier generation unit 302, a history DB 303, a communication unit 304A, an cryptographic processor unit 311, a certificate verification unit 312, and a certificate generation unit 313. Constituent elements having the same functionality as shown in FIG. 7 or FIG. 23 are denoted with the same reference signs, and description thereof is omitted.

The service provider server 300b is different from the service provider server 300 in Embodiment 2 in that the service provider server 300b further includes the cryptographic processor unit 311, the certificate verification unit 312, and the certificate generation unit 313, and the history DB control unit 301B has a configuration different from that of the history DB control unit 301A. Furthermore, the service provider server 300b is different from the service provider server 300c in Embodiment 1 in that the history DB control unit 301B has a configuration different from that of the history DB control unit 301A.

The following description focuses on the differences from the Embodiment 1 and Embodiment 2.

Figure 39:
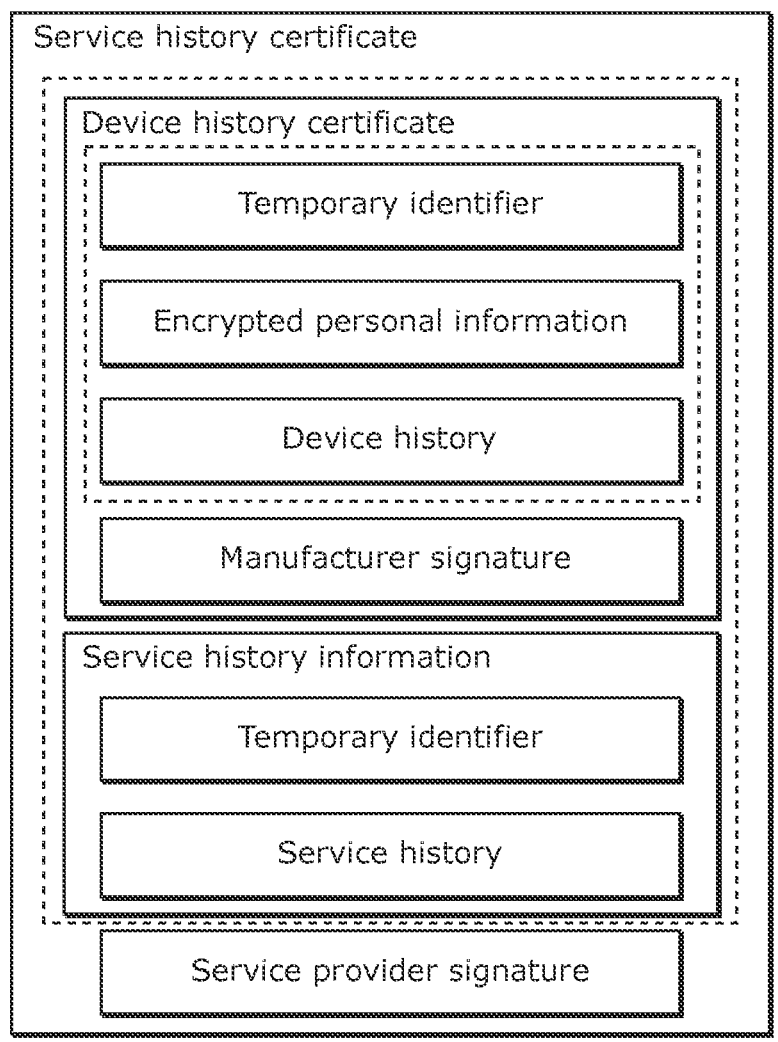
FIG. 39 shows an exemplary structure of a device history certificate according to Embodiment 3.

The history DB control unit 301B receives a device history certificate from the portal server 200b and transmits the device history certificate to the cryptographic processor unit 311. Upon receiving decrypted personal information from the cryptographic processor unit 311, the history DB control unit 301B transmits the decrypted personal information to the certificate verification unit 312. When the verification of a certificate by the certificate verification unit 312 is successful, the history DB control unit 301B searches personal information DB contained in the history DB 303 for a user having personal information which matches the decrypted personal information. The history DB control unit 301B extracts a service history of the user searched out, and then requests the certificate generation unit 313 to generate a service history certificate for a temporary identifier, a device history certificate, and a service history. Upon receiving a device history certificate from the certificate generation unit 313, the history DB control unit 301B transmits the device history certificate to the portal server 200b. FIG. 39 shows an exemplary structure of the service history certificate according to Embodiment 3.

3.5 Operation of the Information Management System 12

Operation of the information management system 12 includes the following processing.

(1) Processing for registration of a user in the manufacturer server 100b by a user via the user terminal 500

(2) Processing for registration of a household electric device in the manufacturer server 100b by the user (3) Processing for uploading a household electric device history information from the device 400 of the user to a device history DB (4) Processing for providing the user with proposal information from the portal server 200

The Processing (2) and Processing (3) have been described above in Embodiment 2, and therefore description thereof is not repeated below.

3.5.1 Operation of Processing for User Registration

Figure 40:
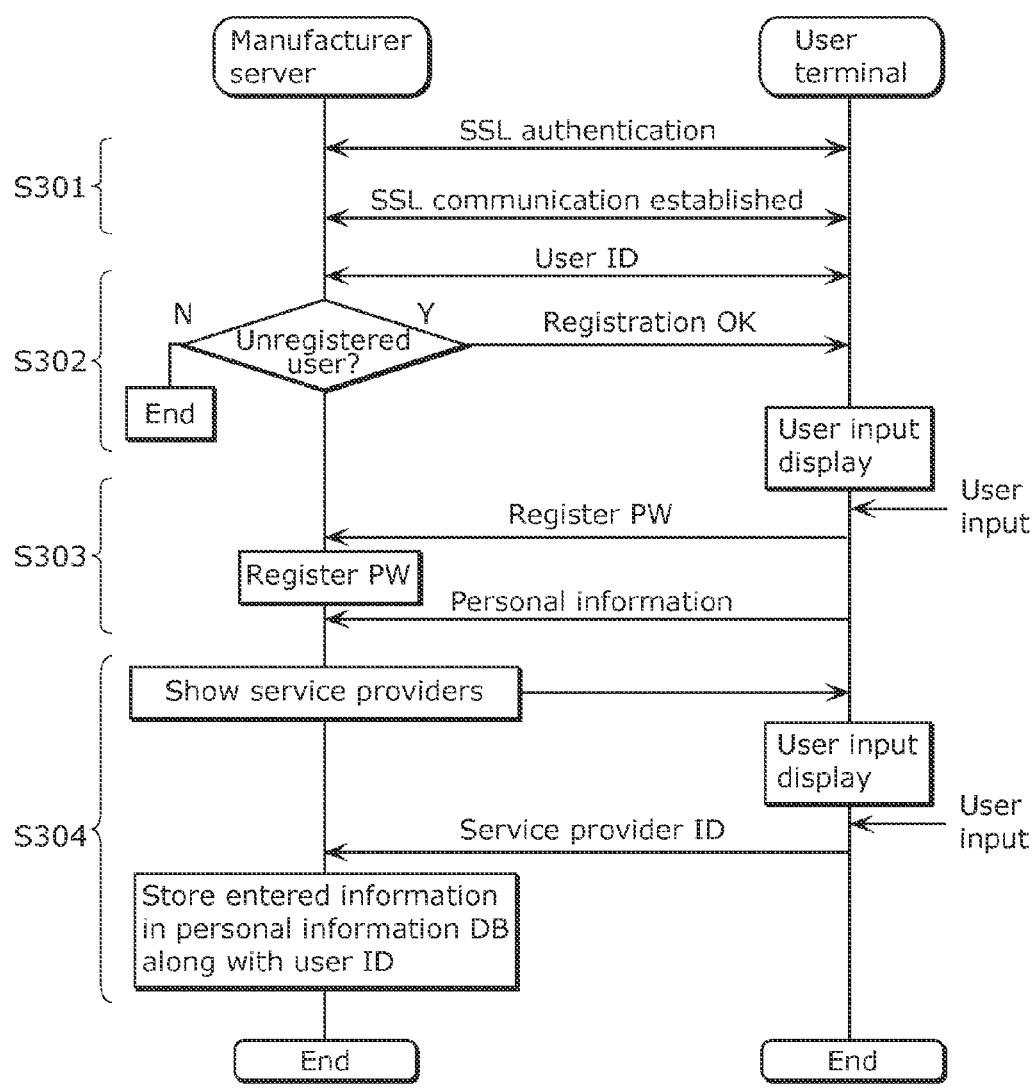
FIG. 40 is a sequence diagram illustrating processing for registration of a user according to Embodiment 3.
Figure 41:
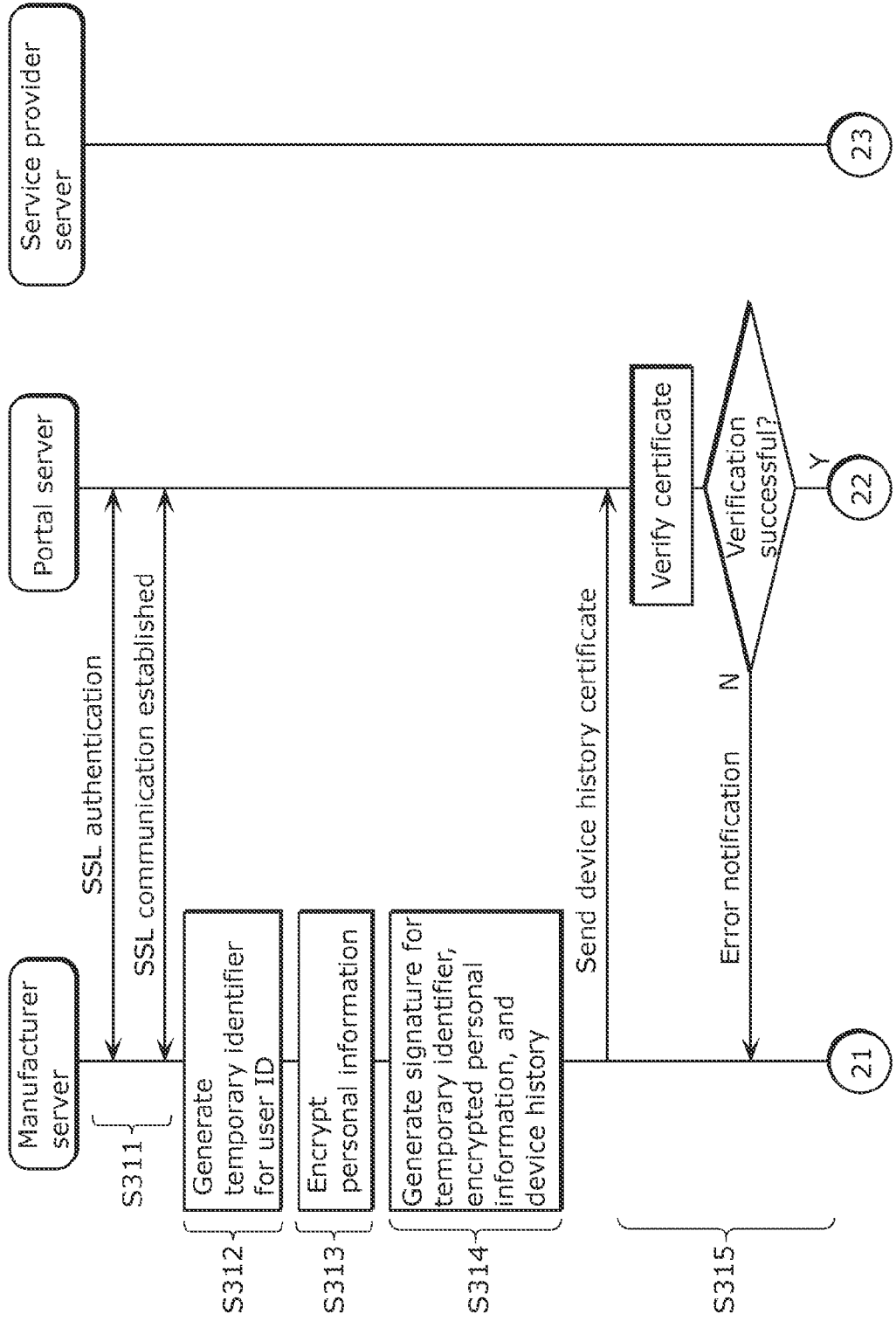
FIG. 41 is a sequence diagram illustrating processing for providing proposal information according to Embodiment 3.
Figure 42:
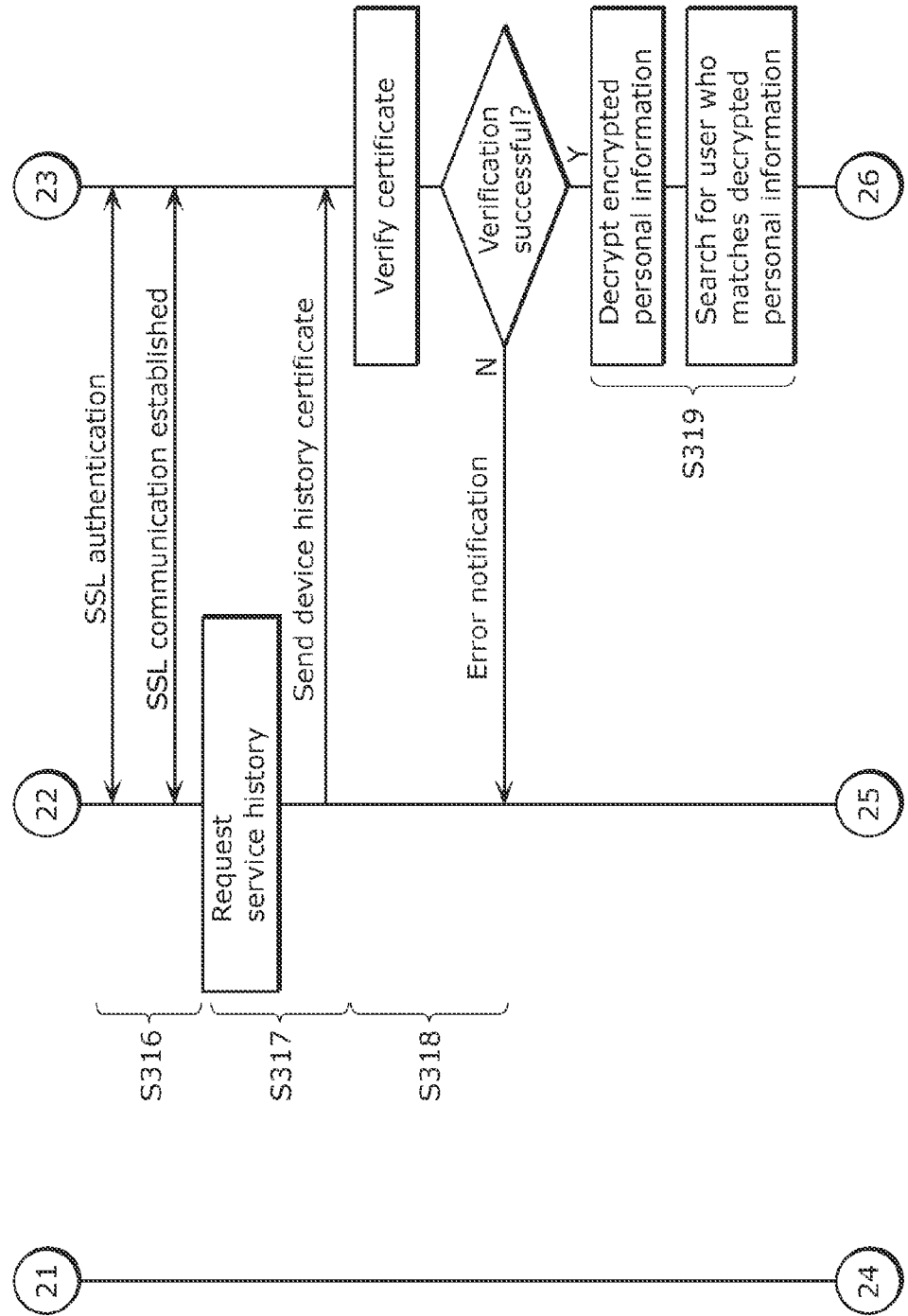
FIG. 42 is a sequence diagram illustrating processing for providing proposal information according to Embodiment 3.
Figure 43:
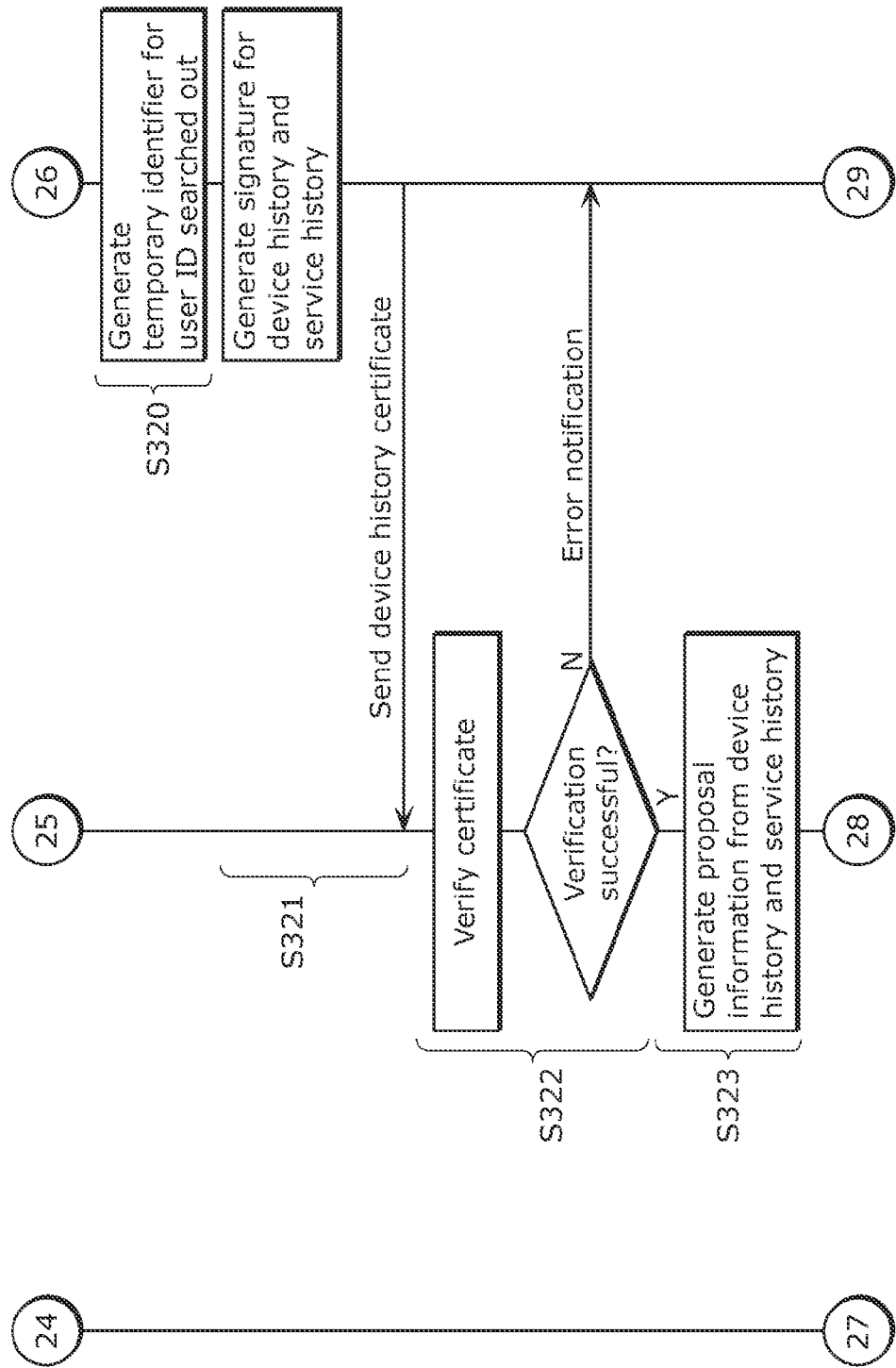
FIG. 43 is a sequence diagram illustrating processing for providing proposal information according to Embodiment 3.
Figure 44:
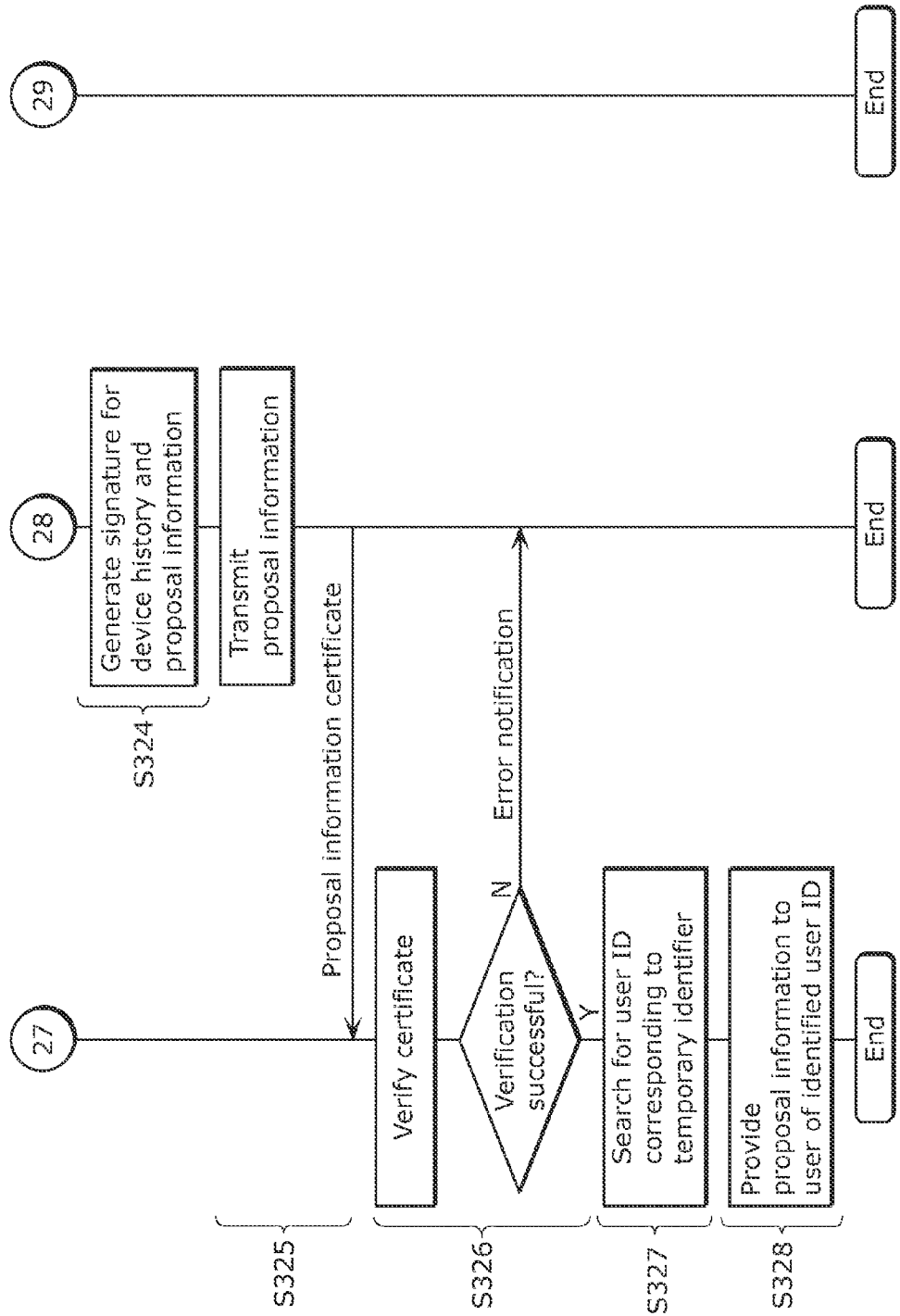
FIG. 44 is a sequence diagram illustrating processing for providing proposal information according to Embodiment 3.

FIG. 40 is a sequence diagram illustrating processing for registration of a user according to Embodiment 3.

In S301, an encrypted communication channel is established between the manufacturer server 100b and the user terminal 500 using SSL authentication. The SSL authentication and the SSL communication channel are not detailed herein.

Next, in S302, the user terminal 500 transmits a user ID to the manufacturer server 100b. When the user ID is already registered in the manufacturer server 100b, the manufacturer server 100b notifies the user terminal 500 of the registration and ends the processing for registration. When the user ID is not registered, the manufacturer server 100 notifies the user terminal 500 that the user ID can be newly registered.

Next, in S303, the user enters a password (PW) and personal information on a predetermined form via the user terminal 500.

Next, in S304, the manufacturer server 100b shows the user a list of candidate service providers to which the user may give permission to provide personal information of the user. The user selects, via the user terminal 500, one or more service providers from the candidate service providers to which the user gives permission to provide personal information of the user. The personal information of the user and the selected service providers are recorded in a personal information DB contained in the history DB 105 in the manufacturer server 100b.

3.5.2 Processing for Providing a User with Proposal Information from the Portal Server 200b FIG. 41 to FIG. 44 are sequence diagrams illustrating processing for providing proposal information according to Embodiment 3. The providing of proposal information is performed either periodically or non-periodically.

First, in S311, an encrypted communication channel is established between the manufacturer server 100b and the portal server 200b using SSL authentication.

Next, in S312, the manufacturer server 100b selects a user to whom a service is to be provided, and generates a temporary identifier from the user ID of the user.

Next, in S313, when the user has given a service provider permission to provide personal information of the user, the manufacturer server 100b encrypts the personal information using an encryption key for the service provider.

Next, in S314, the manufacturer server 100b generates a signature for the temporary identifier, the encrypted personal information, and a device history, and thereby generates a device history certificate. Then, the manufacturer server 100b transmits the device history certificate and a public key certificate to the portal server 200b.

Next, in S315, the portal server 200b receives the device history certificate and the public key certificate from the manufacturer server 100b, and then verifies the device history certificate. When the verification of the device history certificate fails, the portal server 200b notifies the manufacturer server 100b of an error.

Next, when the verification of the device history certificate is successful, in S316, the portal server 200b establishes an encrypted communication channel, using SSL authentication, to the service provider server 300b corresponding to the service provider ID included in the device history certificate.

Next, in S317, the portal server 200b transmits the device history certificate and the public key certificate to the service provider server 300b and requests the service provider server 300b for a service history certificate relevant to the device history certificate.

Next, in S318, the service provider server 300*b* receives the device history certificate and the public key certificate from the portal server 200*b*, and verifies the device history certificate. When the verification of the device history certificate fails, the service provider server 300*b* notifies the portal server 200*b* of an error.

Next, when the verification of the device history certificate is successful, in S319, the service provider server 300*b* decrypts the encrypted personal information in the device history certificate. The service provider server 300*b* then searches the personal information DB for a registered user having personal information which matches the decrypted personal information.

Next, in S320, the service provider server 300*b* generates a temporary identifier from the user ID of the user searched out.

Next, in S321, the service provider server 300*b* generates a signature for the temporary identifier, service history, and device history certificate of the user searched out, and thereby generates a service history certificate. Then, the service provider server 300*b* transmits the service history certificate and the public key certificate to the portal server 200*b*.

Next, in S322, the service provider server 200*b* receives the service history certificate and the public key certificate from the portal server 300*b*, and verifies the service history certificate. When the verification of the service history certificate fails, the portal server 200*b* notifies the service provider server 300*b* of an error.

Next, when the verification of the service history certificate is successful, in S323, the portal server 200*b* generates proposal information based on the device history and the service history.

Next, in S325, the portal server 200*b* generates a signature for the generated proposal information and the device history certificate, and thereby generates a proposal information certificate.

Next, in S325, the portal server 200*b* transmits the proposal information certificate to the manufacturer server.

Next, in S326, the manufacturer server 100*b* verifies the proposal information certificate. When the verification of the proposal information certificate fails, the manufacturer server 100*b* notifies the portal server 200*b* of an error.

Next, in S327, when the verification of the proposal information certificate by the manufacturer server 100*b* is successful, the manufacturer server 100*b* searches the history DB for a device history certificate with reference to the device history certificate included in the proposal information certificate. Then, the manufacturer server 100 searches for a user ID corresponding to the temporary identifier included in the device history certificate searched out, and identifies the user ID as the user ID of a user to whom the proposal information is to be provided.

Next, in S328, the manufacturer server 100*b* provides the proposal information to the user indicated by the identified user ID. When the proposal information includes control information of any of the devices 400, the manufacturer server 100*b* notifies the user terminal 500 of the presence of the control information in the proposal information, and further transmits the control information when the user terminal 500 sends back OK in return to the notification. When the proposal information does not include control information of any of the device 400, the manufacturer server 100*b* transmits the proposal information to the user terminal 500 without transmitting the notification.

3.6 Advantageous Effects

In Embodiment 3, both a device history and a service history of the same user are usable, so that the manufacturer server 100*b*, the portal server 200*b*, and the service provider server 300 may interface with each other to provide the user with proposal information.

More specifically, the portal server 200*b* which interfaces with each of the manufacturer server 100*b* and the service provider server 300*b* is not provided with personal information. On the other hand, the manufacturer server 100*b* and the service provider server 300*b* are provided with personal information of a user with permission of the user. Thus, the manufacturer server 100*b* and the service provider server 300*b* may provide a device history and a service history of the same user to the portal server 200.

In other words, when the manufacturer server 100*b* provides the portal server 200*b* with a device history of a device 400 used by a user and user information of the user, the manufacturer server 100*b* assure anonymity of the user against the portal server 200*b* by encrypting the user information (personal information) corresponding to the device history so that only the service provider server 300*b* can decrypt the user information. This allows the service provider server 300*b* to provide the portal server 200*b* with a service history corresponding to the decrypted personal information (user information), so that the portal server 200*b* may generate proposal information from the device history and the service history of the user.

This allows the portal server 200*b* to generate proposal information while protecting security for privacy of users.

As described above, in Embodiment 3, a user registers personal information of the user only when the user registers in the manufacturer server 100*b* or the service provider server 300*b*. The user may be provided with proposal information generated based on a device history and a service history of the user from portal server 200*b* without providing the personal information to the portal server 200*b*.

The information management method and the information management system according to one or more aspects of the present invention have been described based on the embodiments, which are not intended to limit the scope of the present invention. Various modifications of the embodiments and embodiments resulting from arbitrary combinations of constituent elements of the different embodiments that may be conceived by those skilled in the art are intended to be included within the scope of one or more aspects of the present invention as long as these do not depart from the essence of the present invention.

For example, the following is also within the scope of the present invention.

Figure 45:
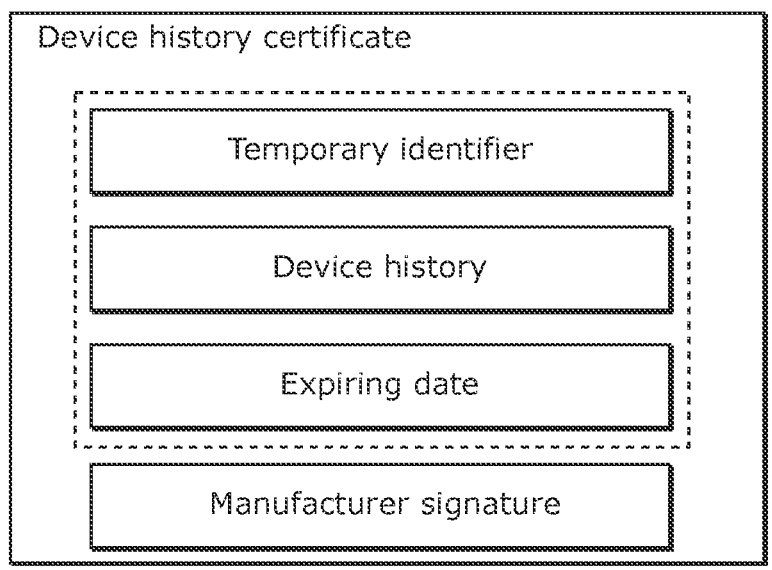
FIG. 45 shows an exemplary structure of the device history certificate including an expiring date.

(1) The device history certificate including a temporary identifier, a device history, and a manufacturer signature in Embodiment 2 is not limiting. For example, the device history certificate may include an expiring date as shown in FIG. 45. FIG. 45 shows an exemplary structure of the device history certificate including an expiring date. For example, when information in a device history is old, a user may not be provided with appropriate proposal information. The device history certificate including an expiring date as shown in FIG. 45 prevents providing proposal information generated based on an expired device history, and allows a user to receive proposal information generated based on a recent device history of the user.

(2) The device history information is uploaded to the manufacturer server 100 and others directly from the devices 400 in Embodiments 1 to 3. Alternatively, the device history information may be uploaded via the user terminal 500. In this case, the devices 400 and the user terminal 500 may be connected via a local communication path or a proximity communication path such as near field communication (NFC).

(3) The manufacturer server 100 generates a temporary identifier each time the manufacturer server 100 provides a device history certificate to the portal server 200 in Embodiment 2, which is not limiting. For example, the manufacturer server 100 may renew a temporary identifier at an interval of a predetermined time or after transmitting a device history certificate over predetermined threshold times. This enables provision of proposal information generated based on combination of device history information provided in the last two or more transmissions from the manufacturer server 100.

The following details this case. FIG. 46 shows an example of a list of provided data sets of device history information. The manufacturer server 100 selects, based on the list of provided data shown in FIG. 46, a data set of device history information to provide to the portal server 200 from data sets of device histories of a user for different periods. For example, when a device history of a body composition analyzer is provided, the manufacturer server 100 selects a device history for a week as a device history to be included in a device history certificate as shown in FIG. 46. FIG. 46 also shows that a temporary identifier can be used twice to generate device history certificates. The period of a history or the limit of number of transmissions of a temporary identifier may be determined by the manufacturer server 100 or may be determined according to a request from a user or the portal server 200. The period of a history or the limit of number of transmissions of a temporary identifier once determined may be changed afterwards.

This allows not only combining device history information but also determining the period of a history or the limit of number of transmissions of a temporary identifier. Thus, when a user does not want to provide the whole of device histories, the user may change the period of a history or the limit of number of transmissions of a temporary identifier appropriately.

(4) The example in Embodiment 1 to Embodiment 3, in which the portal server 200 and others receive a service history from the service provider server 300 or others, is not limiting. For example, the manufacturer server 100 and others may receive a service history from the service provider server 300 or others. The following describes the processing for providing proposal information by the portal server 200 or others.

Figure 47:
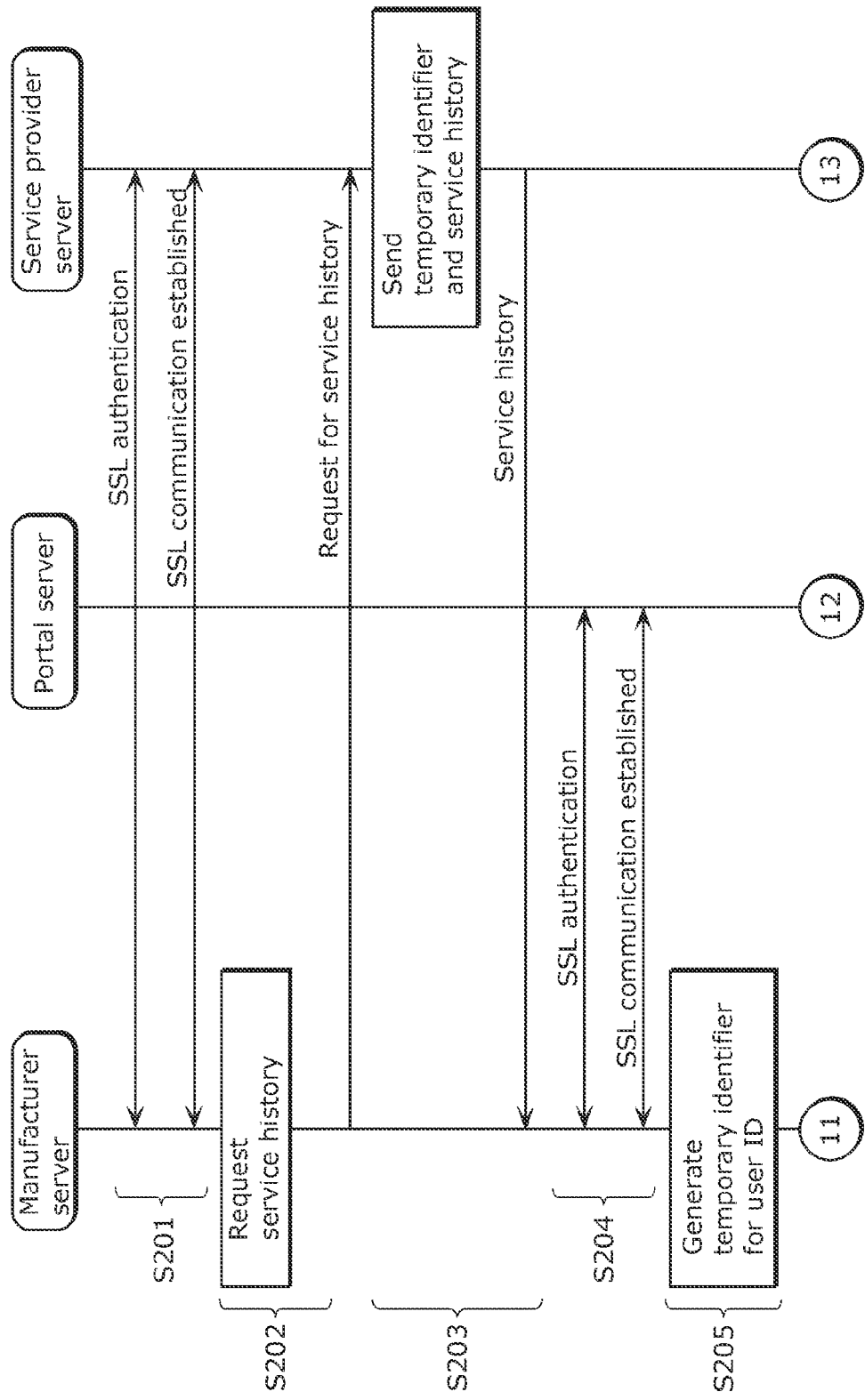
FIG. 47 is a sequence diagram illustrating processing for providing a user with proposal information by the portal server.
Figure 48:
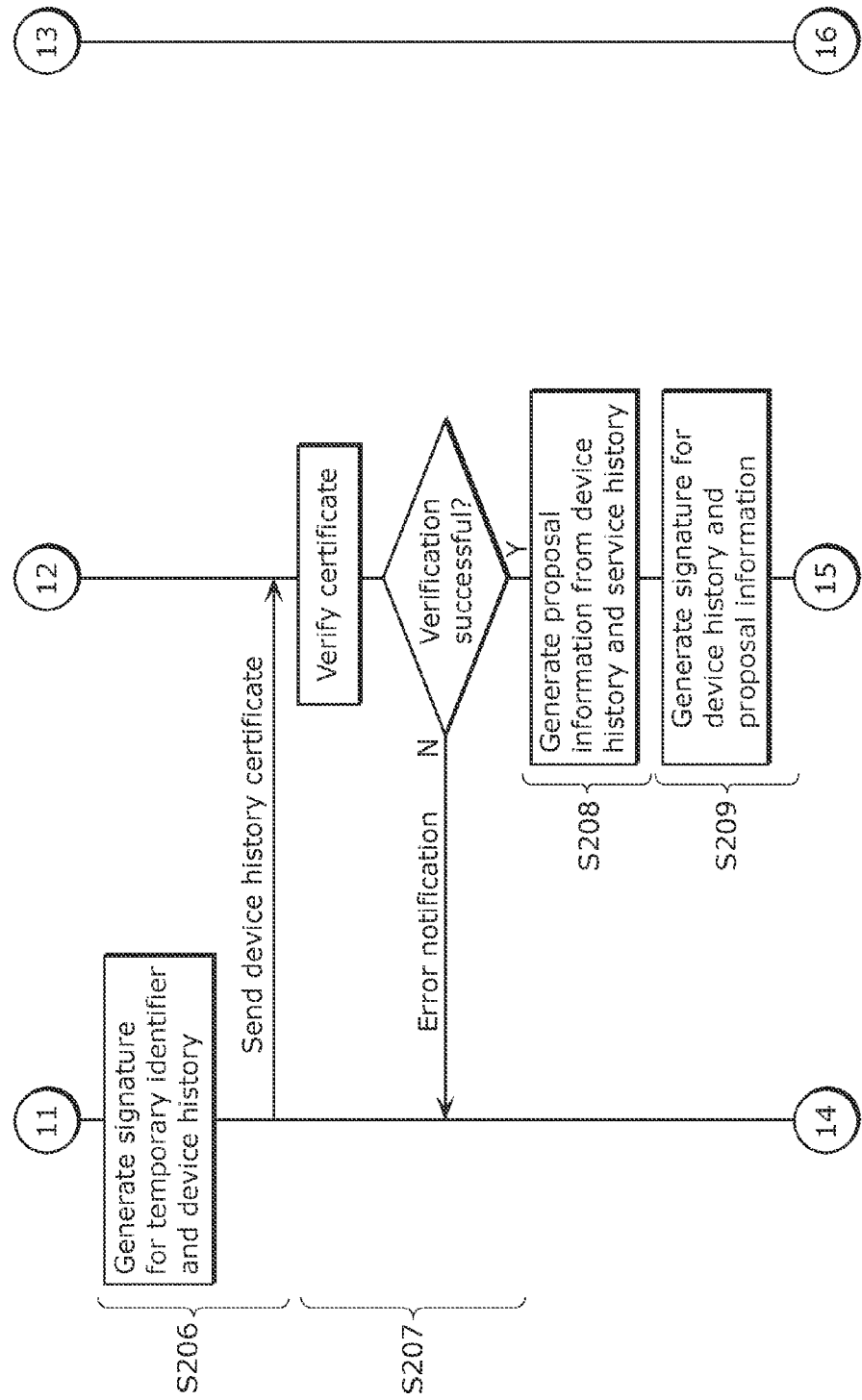
FIG. 48 is a sequence diagram illustrating processing for providing a user with proposal information by the portal server.
Figure 49:
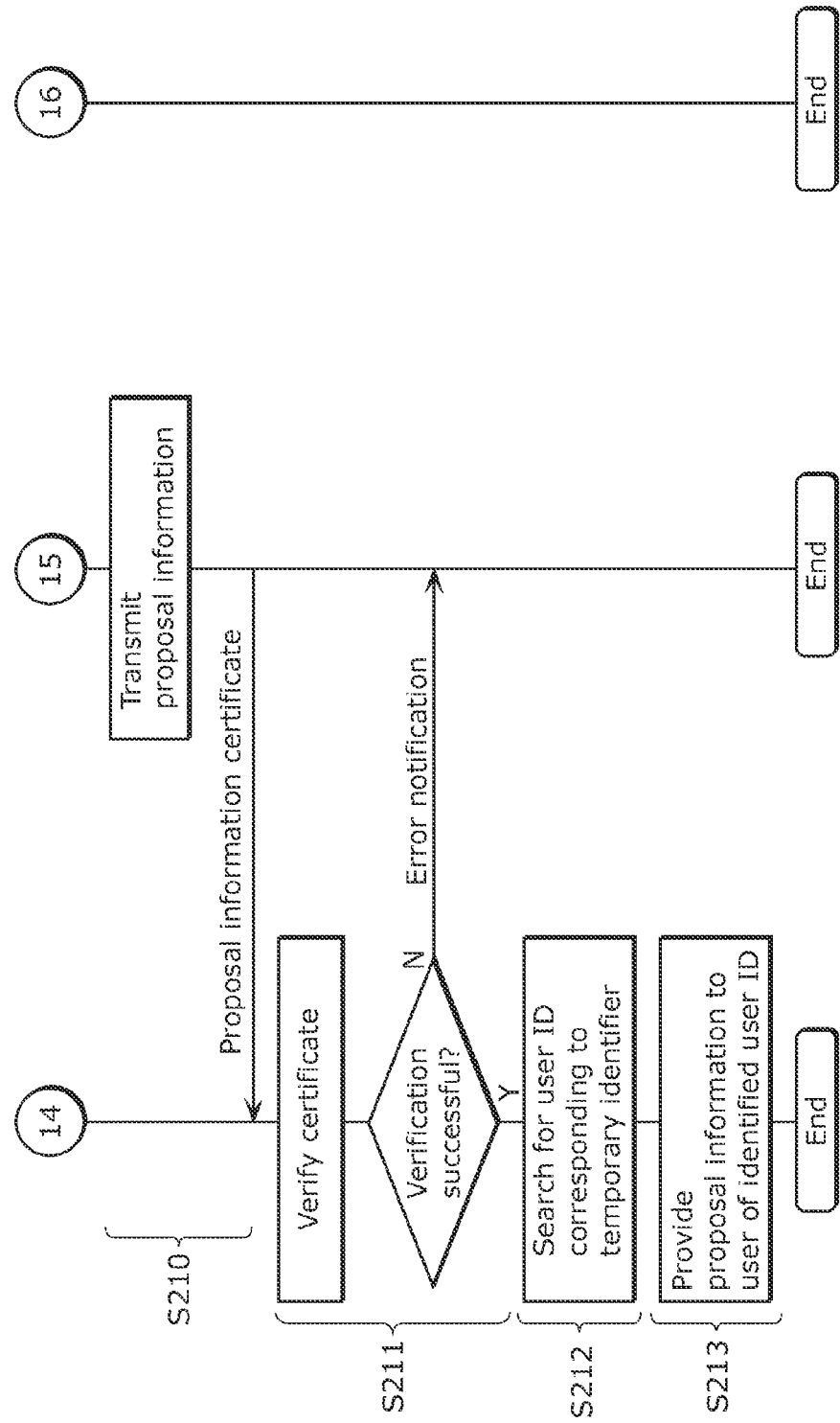
FIG. 49 is a sequence diagram illustrating processing for providing a user with proposal information by the portal server.

FIG. 47 to FIG. 49 are sequence diagrams illustrating processing for providing a user with proposal information by the portal server 200.

First, in S201, an encrypted communication channel is established between the manufacturer server 100 and the service provider server 300 using SSL authentication.

Next, in S202, the manufacturer server 100 selects a user to whom a service is to be provided, and transmits a request to the service provider server 300 in order to request the service provider server 300 for a service history relevant to a device of the user.

Next, in S203, upon receiving, from the manufacturer server 100, the request for service information, the service provider server 300 generates a temporary identifier from a user ID, and transmits the temporary identifier and a service history to the manufacturer server 100.

Next, in S204, an encrypted communication channel is established between the manufacturer server 100 and the portal server 200 using SSL authentication.

Next, in S205, the service provider server 100 generates a temporary identifier from the user ID of the selected user.

Next, in S206, the manufacturer server 100 generates a signature for the temporary identifier and the device history, and thereby generates a device history certificate. Then, the manufacturer server 100 transmits a service history along with the device history certificate and a public key certificate to the portal server 200.

Next, in S207, the portal server 200 receives the device history certificate, the public key certificate, and the service history from the manufacturer server 100, and then verifies the device history certificate. When the verification of the device history certificate fails, the portal server 200 notifies the manufacturer server 100 of an error.

Next, in S208, the portal server 200 generates proposal information based on the device history and the service history.

Figure 50:
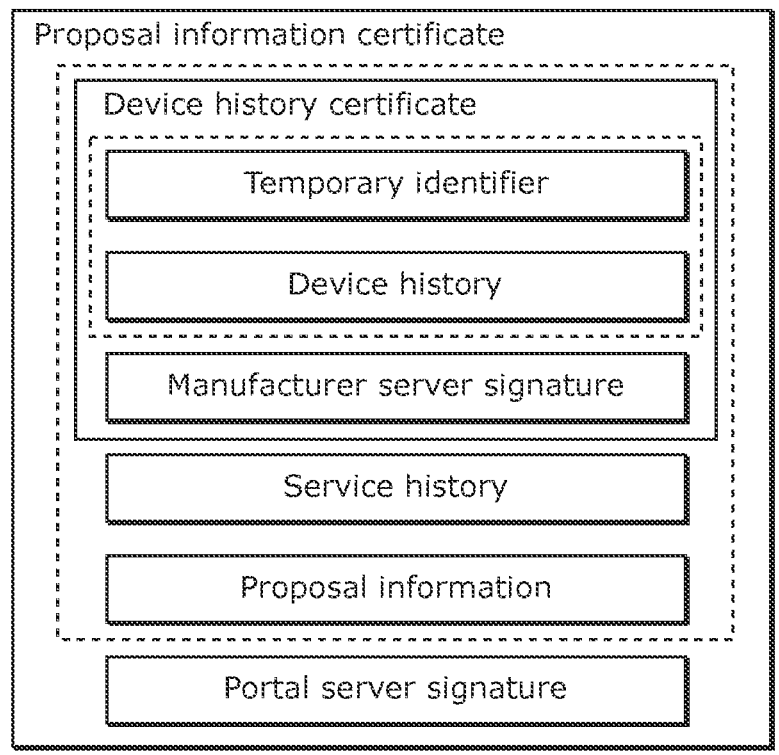
FIG. 50 shows an exemplary structure of the proposal information certificate.

Next, in S209, the portal server 200 generates a signature for the generated proposal information, the device history certificate, and the service history, and thereby generates a proposal information certificate. FIG. 50 shows an exemplary structure of the proposal information certificate. The proposal information certificate shown in FIG. 50 is a certificate associating a device history certificate, a service history certificate, and proposal information, and is marked with a portal server signature, which is a signature generated using a signature generation key held in the certificate generation unit 203.

Next, in S210, the portal server 200 transmits the proposal information certificate to the manufacturer server 100.

Next, in S211, the manufacturer server 100 verifies the proposal information certificate. When the verification of the proposal information certificate fails, the manufacturer server 100 notifies the portal server 200 of an error.

Next, in S212, when the verification of the proposal information certificate by the manufacturer server 100 is successful, the manufacturer server 100 searches the history DB for a device history certificate with reference to the device history certificate included in the proposal information certificate. Then, the manufacturer server 100 searches for a user ID corresponding to the temporary identifier included in the device history certificate searched out, and identifies the user ID as the user ID of a user to whom the proposal information is to be provided.

Next, in S213, the manufacturer server 100 provides the proposal information to the user indicated by the identified user ID. When the proposal information includes control information of any of the devices 400, the manufacturer server 100 notifies the user terminal 500 of the presence of the device control information in the proposal information, and further transmits the control information when the user terminal 500 sends back OK in return to the notification. When the proposal information does not include control information of any of the devices 400, the manufacturer server 100 transmits the proposal information to the user terminal 500 without the transmitting of the notification.

The manufacturer server 100 thus provides the portal server 200 with only a service history relevant to a device history, so that the manufacturer server 100 may provide proposal information to the user.

(5) The example in Embodiment 2, in which when verification of a certificate is successful in S134, the portal server 200 requests the service provider server 300 for service information, is not limiting. For example, the portal server 200 may either periodically or non-periodically request the service provider server 300 for service information so that the portal server 200 may accumulate the service information.

(6) The service history provided by the service provider server 300 in Embodiment 2, in which the service history includes a temporary identifier and a service history, is not limiting. For example, the service provider server 300 may generate a signature for a temporary identifier and a service history and generate a service history certificate which includes the temporary identifier, the service history, and the signature. Optionally, the service provider server 300 may obtain proposal information based on a service history and a device history from the portal server 200 and a proposal information certificate including a service history certificate. In this case, the service provider server 300 may include a certificate generation unit and a certificate verification unit. This configuration allows not only the manufacturer server 100 but also the service provider server 300 to obtain proposal information so that the service provider server 300 may provide a user with the proposal information.

(7) The device history and the service history in Embodiments 1 to 3, which provide all information contained in the history DB 105, are not limiting. For example, the device history and the service history may provide information for the one or more most recent days or the one or more newest history records.

(8) The portal server 200 and others in Embodiments 1 to 3, which provide device control information to the devices 400, may generate a signature for device control information, and the devices 400 may verify the signature.

Figure 51:
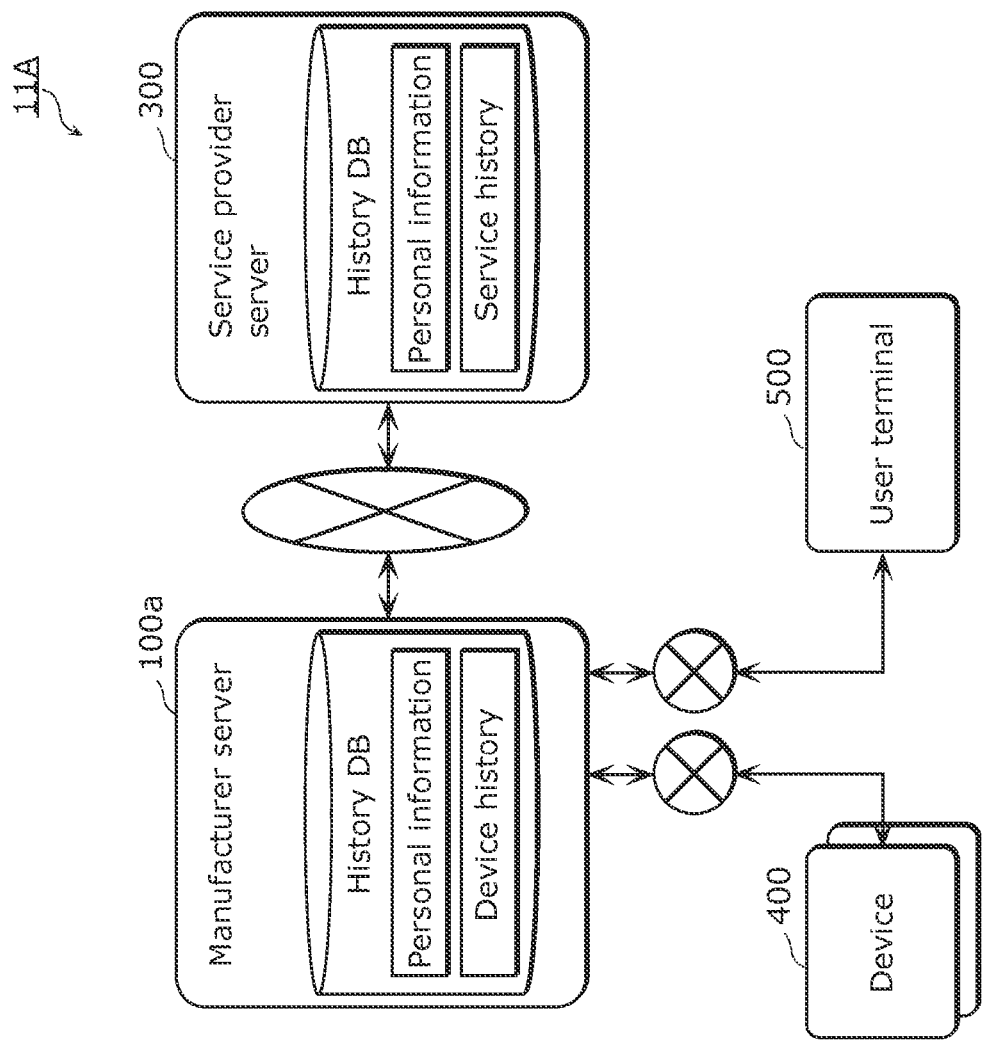
FIG. 51 shows an exemplary overall configuration of an information management system.

(9) The portal server 200 and others in Embodiments 1 to 3, which generate proposal information, are not limiting. For example, the manufacturer server 100 may receive a service history from the service provider server 300 and generate proposal information for a user. FIG. 51 shows an exemplary overall configuration of an information management system 11A. The information management system 11A shown in FIG. 51 includes a manufacturer server 100a, a service provider server 300, devices 400, and a user terminal 500. In addition to the functional configuration of the manufacturer server 100 in Embodiment 2, the manufacturer server 100a includes a proposal information generation unit and a proposal information DB which are equivalent to the proposal information generation unit and 201 the proposal information DB 202 of the portal server 200 in functionality, respectively.

Figure 52:
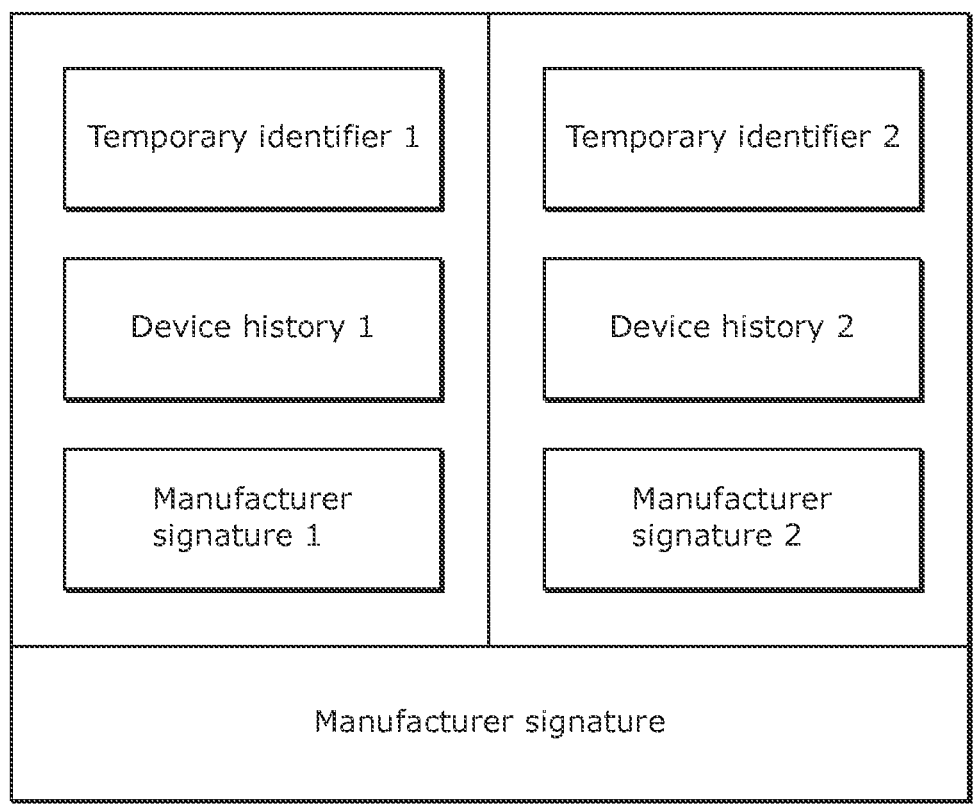
FIG. 52 shows an exemplary structure of a device history certificate including device histories of a plurality of users.

(10) The device history in Embodiments 1 to 3, which provides all information for a selected single user stored in the history DB 105, is not limiting. For example, the device history may provide information for two or more users. FIG. 52 shows an exemplary structure of a device history certificate including device histories of a plurality of users.

The following describes an exemplary device history certificate including device histories of two users, using FIG. 52. More specifically, for example, the manufacturer server 100 combines device history certificates each for one user, and generates a signature for a resulting device history certificate for the two users. In a method of generating a signature, a signature may be generated for a hash value obtained by combining hash values each for a different one of the device history certificates of the two users. More specifically, a signature is generated for a hash value obtained by combining two hash values: one is a combination of a temporary identifier 1, a hash value of a device history 1, and a hash value of a manufacturer signature 1 or a hash value of a combination of the temporary identifier 1, device history 1, and the manufacturer signature 1; and the other is a combination of a hash value of a temporary identifier 2, a hash value of a device history 2, and a hash value of a manufacturer signature 2 or a hash value of a combination of the temporary identifier 2, device history 2, and the manufacturer signature 2. Alternatively, a result of encryption or a result of calculation using a one-way function may be used instead of the hash value. With this, when the portal server 200 extracts a device history certificate for only one of the users and generates proposal information based on a combination of the extracted device history certificate with another device history certificate, the manufacturer server 100 may detect by verifying the proposal information.

(11) The device history certificate in above-described item (10), which is generated from device histories of a plurality of users, is not limiting. The hash value of the device history of a user to whom proposal information is not provided need not be provided to the portal server 200. For example, in the example shown in FIG. 52, when it is determined that the device history 2 is not provided to the portal server because the manufacturer server 100 does not provide the user of the device history 2 with proposal information, the value in the region of the device history 2 may be replaced with a hash value of the device history 2. Thus, the portal server 200 cannot obtain the device history 2. Furthermore, since a manufacturer signature is generated from the hash value of the temporary identifier 1, the device history 1, and the manufacturer signature 1 and the hash value of the temporary identifier 2, the device history 2, and the manufacturer signature 2, the manufacturer signature can be generated without providing the device history 2 to the portal server 200. Furthermore, verification of proposal information certificate can be done in a similar manner.

(12) The portal server 200 in Embodiment 2, which generates proposal information for a single user to be identified using a temporary identifier, is not limiting. For example, the portal server 200 may generate proposal information for users identified using temporary identifiers in device history certificates where the temporary identifiers indicates users having the same attribute information.

More specifically, the portal server 200 may generate a weight control program for users indicated by temporary identifiers in device history certificates when the temporary identifiers indicate users having the same attribute information of females in their thirties, and provide the same proposal information, which is the weight control program for females in their thirties, to the users indicated by the respective temporary identifiers in the device history certificates. Proposal information is thus provided not only to a single user but also to a plurality of users, so that the proposal information can be provided to more users.

(13) The portal server 200 in Embodiment 2, which generates a signature for proposal information and a device history certificate and thereby generates a proposal information certificate, is not limiting. For example, the portal server 200 may generate a signature for a temporary identifier and proposal information included in a device history certificate and thereby a proposal information certificate.

(14) Personal information in Embodiment 3, which is encrypted in the portal server 200b and decrypted in the service provider server 300b to identify a user, is not limiting. For example, personal information of a user registered in the service provider server 300b may be encrypted, and then be decrypted in the portal server 200b.

(15) The anonymization rule in Embodiment 1, which is generated by the portal server 200c, transmitted to the manufacturer server 100c, the service provider server 300c or others, and then anonymized therein, is not limiting. For example, the manufacturer server 100c or the service provider server 300c may generate an anonymization rule.

(16) Each of the above-described systems is specifically a computer system including a microprocessor, read-only memory (ROM), random-access memory (RAM), a hard-disk unit, a display unit, a keyboard, and a mouse. The RAM or the hard-disk unit stores a computer program. The microprocessor operates according to the computer program so that the system achieves its function. The computer program includes a plurality of operation codes indicating instructions for a computer combined in order to achieve a predetermined function.

(17) All or part of the constituent elements of the above-described system may be a single system large scale integration (LSI). The system LSI is a super multi-functional LSI made by integrating a plurality of components on a single chip. More specifically, the system LSI is a computers system including a microprocessor, ROM, and RAM. The RAM stores a computer program. The microprocessor operates according to the computer program so that the system LSI achieves its function.

The constituent elements of the above-described systems may be individually implemented as a single chip, or all or part of the constituent elements may be included in a single chip.

The above-described system LSI may be referred to as an IC, an LSI, a super LSI, or an ultra LSI depending on the degree of integration. Alternatively, the constituent elements may be formed as a dedicated circuit or a general-purpose processor instead of as such LSIs. Furthermore, a field programmable gate array (FPGA) which allows programming after LSI manufacturing or a reconfigurable processor which allows reconfiguration of the connections and settings of circuit cells inside the LSI may be used.

Furthermore, in the event that an advance in or derivation from semiconductor technology brings about an integrated circuitry technology whereby an LSI is replaced, functional blocks may be obviously integrated using such new technology. Application of biotechnology or the like is possible.

(18) All or part of the components included in the respective systems above may be an integrated circuit (IC) card or a unit of a module that are attachable to the respective systems. The IC card or the module is a computer system including a microprocessor, a ROM, and a RAM. The IC card or the module may include the above-described super-multi-functional LSI. The microprocessor operates according to the computer program so that the IC card or the module achieves its function. The IC card or the module may be implemented to be tamper-resistant.

(19) The present invention may be implemented as the above-described method. Furthermore, the present invention may be implemented as a computer program which causes a computer to execute the method or a digital signal representing the computer program.

The present invention may also be implemented as a computer-readable recording medium, such as a flexible disk, a hard disc, a CD-ROM, an MO, a DVD, a DVD-ROM, a DVD-RAM, Blu-ray (registered trademark) Disc (BD), a semiconductor memory, or the like on which a computer program or a digital signal is recorded. The present invention may be implemented as the digital signal recorded on any of the recording media.

Furthermore, the present invention may also be implemented as the computer program or the digital signal transmitted via an electric telecommunication line, wire or wireless communication line, a network typified by the Internet, or data broadcasting.

Furthermore, the present invention may also be implemented as a computer system including a microprocessor and a memory, where the memory stores the computer program, and the microprocessor operates according to the computer program.

Optionally, the program or the digital signal may be recorded on a recording medium for transportation or transmitted through a network or the like so that the program is executed on another independent computer system.

(20) The embodiment and the modifications described above may be selectively combined for implementation.

(21) For example, an information management system according to an aspect of the present disclosure may include: a first management server which collects and manages device histories; a second management server which collects and manages service histories; a third management server which uses the device histories and the service histories; and a device which transmits the device histories to the first management server. The first management server includes: a first history DB which stores the device histories and user information relevant to the device histories; a first cryptographic processor unit which calculates encrypted user information by encrypting the user information; a first signature generation unit which generates a first signature for the encrypted user information and a device history among the device histories; and a first provider unit which provides the second management server with device history information including the encrypted user information, the device history, and the first signature. The second management server includes: a second history DB which stores the service histories and user information relevant to the service histories; a second cryptographic processor unit which obtains user information by decrypting the encrypted user information; and a second provider unit which searches the history DB for a service history based on the user information and provides the service history to the third server. The third management server includes a proposal information generation unit which generates proposal information based on the device history information and the service history information.

Furthermore, in the information management system according to an aspect of the present disclosure, the second management server may further include a second signature generation unit which generates a second signature for the device history information and the service history, the second provider unit may further provide the third management server with service history information which includes device history information, the service history, and the second signature, and the third management server may further include a verification unit which verifies the signature included in the service history information.

Furthermore, in the information management system according to an aspect of the present disclosure, the third management server may further include: a third signature generation unit which generates a third signature for the device history information and the proposal information; and a third provider unit which provides the first management server with second proposal information including the device history information, the proposal information, and the second signature, and the first management server may further include a verification unit which verifies the signature in the second proposal information.

Furthermore, in the information management system according to an aspect of the present disclosure, the first management server may further include a control information generation unit which generates control information, and the control information generation unit generates control information for the device only when the verification of the signature by the verification unit is successful.

Furthermore, in the information management system according to an aspect of the present disclosure, the device history information may further include an expiring date of the device history information, and the verification unit in the first management server may further verify the expiring date of the device history information included in the second proposal information.

Furthermore, in the information management system according to an aspect of the present disclosure, the first provider unit may provide only a device history stored in the first history DB in a predetermined period out of the device histories stored in the first history DB, and the first provider unit may manage a list including a record of the predetermined period and a predetermined threshold for the number of times of provision.

(22) Furthermore, an information management system according to an aspect of the present disclosure may include: a first management server which collects and manages device histories; a second management server which collects and manages service histories; a third management server which uses the device histories and the service histories; and a device which transmits the device histories to the first management server. The first management server includes: a history DB which stores the device histories and user information relevant to the device histories; a temporary identifier generation unit which generates a temporary identifier from the user information; a signature generation unit which generates a first signature for the temporary identifier and a device history among the device histories; and a first provider unit which provides the third management server with device history information including the temporary identifier, the device history, and the first signature. The second management server includes a second provider unit which provides the third server with a service history among the service histories. The third management server includes a proposal information generation unit which generates proposal information based on the device history and the service history.

Furthermore, in the information management system according to an aspect of the present disclosure, the third management server may further include: a signature generation unit which generates a second signature for the device history information and the proposal information; and a second provider unit which provides the first management server with second proposal information including the device history information, the proposal information, and the second signature, and the first management server may further include a verification unit which verifies the signature in the second proposal information.

Furthermore, in the information management system according to an aspect of the present disclosure, the first management server may further include a control information generation unit which generates control information control information for the device, and the control information generation unit generates control information only when the verification of the signature by the signature verification unit is successful.

Furthermore, in the information management system according to an aspect of the present disclosure, the device history information may further include an expiring date of the temporary identifier and the device history, and the verification unit of the first management server may further verifies the expiring date in the device history information included in the second proposal information.

The present invention is applicable to information management methods and information management systems, and, in particular, to an information management method executed by an information management apparatus or an information management system including the information management apparatus which interfaces with a plurality of serves operating independently of each other and is not provided with personal information in consideration of users' privacy, such as a portal server.

REFERENCE SIGNS LIST 10, 11, 11A, 12, 13 Information management system
100, 100a, 100b, 100c Manufacturer server
101, 101A, 101B History DB control unit
102 Temporary identifier generation unit
103, 103A, 103B, 203, 203A, 203B Certificate generation unit
104, 204, 204A Certificate verification unit
105, 303 History DB
106 Device control instruction unit
107 Device control information DB
108, 108A, 205, 205A, 304, 304A Communication unit
111 Cryptographic processor unit
121, 321 Anonymizer unit
200, 200b, 200c Portal server
201, 201A, 201B Proposal information generation unit
202 Proposal information DB
211 Anonymization rule generation unit
300, 300b, 300c, 300d, 300e Service provider server
301, 301A, 301B History DB control unit
302 Temporary identifier generation unit
311 Cryptographic processor unit
312 Certificate verification unit
313 Certificate generation unit
400 Device
500 User terminal

The invention claimed is:
1. An information management method executed by an information management apparatus which manages information, the information management apparatus including a non-transitory memory storing a program and a hardware processor that executes the program so as to perform the information management method, the information management method comprising:
receiving, from a first server via a network, device history information and first anonymized user information, the device history information indicating a history of an operation of a device used by a first user, and the first anonymized user information being generated by anonymizing, according to a predetermined rule, first user information including attribute information which allows identification of the first user and attribute information which does not allow identification of the first user, by deleting and truncating information which allows identification of the first user based on the predetermined rule;
receiving, from a second server, via the network, service history information and second anonymized user information different from the first anonymized user information, the service history information indicating a history of service used by a second user, the second anonymized user information being generated by anonymizing, according to the predetermined rule, second user information including attribute information which allows identification of the second user and attribute information which does not allow identification of the first user, by deleting and truncating information which allows identification of the first user based on the predetermined rule, and the second server being different from the first server;

associating the device history information and the service history information with each other and managing, as composite information, the device history information and the service history information associated with each other, when the first user identified using the first anonymized user information and the second user identified using the second anonymized user information are determined to be similar, based on commonality between attribute information which is not anonymized, does not allow identification of the first user, and is included in the first anonymized user information and attribute information which is not anonymized, does not allow identification of the second user, and is included in the second anonymized user information;

generating proposal information indicating a first proposal of service to the first user and a second proposal of service to the second user, based on the composite information; and providing the generated proposal information including the first proposal to the first user via the first server and providing the generated proposal information including the second proposal to the second user via the second server.

2. The information management method according to claim 1, wherein the predetermined rule is determined based on a combination of a type of the operation indicated by the device history information stored in the first server and a type of the service indicated by the service history information stored in the second server.

3. The information management method according to claim 1, wherein the predetermined rule specifies an attribute information item to be deleted or abstracted among one or more items of the attribute information included in the first user information and the second user information.

4. The information management method according to claim 1, wherein the first anonymized user information includes, as an item of the attribute information, at least one of a gender, an age, an age range, an address, and an occupation of the first user, and the second anonymized user information includes, as an item of the attribute information, at least one of a gender, an age, an age range, an address, and an occupation of the second user.

5. The information management method according to claim 1, wherein the proposal information includes a control program for controlling the device.

6. The information management method according to claim 1, comprising:

generating proposal information indicating a proposal of service to the second user, based on the composite information; and providing the generated proposal information to the second user via the second server.

7. The information management method according to claim 1, wherein the first user and the second user are a same user.

8. The information management method according to claim 1, wherein the first user and the second user are different users.

9. The information management method according to claim 1, wherein the service history information is information including a history of health management service used by the second user, the health management service including medical care.

10. The information management method according to claim 1, wherein the service history information is information including a history of educational service used by the second user.

11. The information management method according to claim 1, wherein the service history information is information including a history of transportation service used by the second user.

12. The information management method according to claim 1, further comprising transmitting the predetermined rule to the first server and the second server via the network.

13. The information management method according to claim 1, wherein the first anonymized user information received from the first server includes a temporary identifier for identifying a user ID for identification of the first user, and the second anonymized user information received from the second server includes a temporary identifier for identifying a user ID for identification of the second user.

14. An information management system comprising:

an information management apparatus which manages information;

a first server which stores device history information indicating a history of an operation of a device used by a first user and first user information including attribute information which allows identification of the first user; and a second server which stores service history information indicating a history of service used by a second user and second user information including attribute information which allows identification of the second user, wherein the information management apparatus includes a non-transitory memory storing a program and a hardware processor that executes the program so as to:

receive, from a first server via a network, the device history information and first anonymized user information which is generated by anonymizing, according to a predetermined rule, the first user information with attribute information which does not allow identification of the first user, by deleting and truncating information which allows identification of the first user based on the predetermined rule;

receive, from a second server via the network, the service history information and second anonymized user information different from the first anonymized user information which is generated by anonymizing, according to the predetermined rule, the second user information with attribute information which does not allow identification of the first user, by deleting and truncating information which allows identification of the first user based on the predetermined rule;

when the information management apparatus determines that the first user identified using the first anonymized user information and the second user identified using the second anonymized user information are similar, based on commonality between attribute information which is not anonymized, does not allow identification of the first user, and is included in the first anonymized user information and attribute information which is not anonymized, does not allow identification of the second user, and is included in the second anonymized user information, the information management apparatus associates the device history information and the service history information with each other and manages, as composite information, the device history information and the service history information associated with each other, generate proposal information indicating a first proposal of service to the first user and a second proposal of service to the second user, based on the composite information, and provide the generated proposal information including the first proposal to the first user via the first server and provide the generated proposal information including the second proposal to the second user via the second server.

15. The information management system according to claim 14,
wherein the information management apparatus further transmits the predetermined rule to the first server and the second server via the network, the first server generates the first anonymized user information from the first user information by anonymizing, according to the predetermined rule, the first user information stored in the first server, and transmits the device history information stored in the first server and the generated first anonymized user information to the information management apparatus, and the second server generates the second anonymized user information from the second user information by anonymizing, according to the predetermined rule, the second user information stored in the second server, and transmits the service history information stored in the second server and the generated second anonymized user information to the information management apparatus.

* * * * *